United States Patent
Pleshek et al.

(10) Patent No.: US 8,018,943 B1
(45) Date of Patent: Sep. 13, 2011

(54) AUTOMATIC FILTER OVERLAP PROCESSING AND RELATED SYSTEMS AND METHODS

(75) Inventors: Ronald A. Pleshek, Austin, TX (US);
Charles A. Webb, III, Austin, TX (US);
Keith E. Cheney, Austin, TX (US);
Gregory S. Hilton, Austin, TX (US);
Patricia A. Abkowitz, Austin, TX (US);
Arun K. Thakkar, Cedar Park, TX (US); Himanshu M. Thaker, Austin, TX (US)

(73) Assignee: Anue Systems, Inc., Austin, TX (US)

( * ) Notice: Subject to any disclaimer, the term of this patent is extended or adjusted under 35 U.S.C. 154(b) by 183 days.

(21) Appl. No.: 12/462,221

(22) Filed: Jul. 31, 2009

(51) Int. Cl.
*H04L 12/28* (2006.01)
(52) U.S. Cl. ........................ 370/392; 370/254
(58) Field of Classification Search ........................ None
See application file for complete search history.

(56) References Cited

U.S. PATENT DOCUMENTS

| | | | | |
|---|---|---|---|---|
| 5,515,376 | A | 5/1996 | Murthy et al. | 370/85.13 |
| 6,578,147 | B1 | 6/2003 | Shanklin et al. | 713/200 |
| 6,785,286 | B1 | 8/2004 | O'Keeffe et al. | 370/397 |
| 6,839,349 | B2 | 1/2005 | Ambe et al. | 370/390 |
| 6,853,623 | B2 | 2/2005 | Nederveen et al. | 370/250 |
| 6,901,517 | B1 | 5/2005 | Redmore | 713/201 |
| 6,920,112 | B1 | 7/2005 | McCloghrie et al. | 370/252 |
| 6,954,775 | B1 | 10/2005 | Shanklin et al. | 709/105 |
| 6,996,779 | B2 | 2/2006 | Meandzija et al. | 715/736 |
| 7,027,437 | B1 | 4/2006 | Merchant et al. | 370/389 |
| 7,142,518 | B2 | 11/2006 | Mitchell | 370/290 |
| 7,143,196 | B2 | 11/2006 | Rimmer et al. | 709/249 |
| 7,245,620 | B2 | 7/2007 | Shankar | 370/392 |
| 7,254,114 | B1 | 8/2007 | Turner et al. | 370/244 |
| 7,310,306 | B1 | 12/2007 | Cheriton | 370/218 |
| 7,424,018 | B2 | 9/2008 | Gallatin et al. | 370/389 |
| 7,554,984 | B2 | 6/2009 | Kalkunte et al. | 370/392 |
| 7,688,727 | B1 * | 3/2010 | Ferguson et al. | 370/230.1 |
| 7,769,873 | B1 * | 8/2010 | Mackie | 709/229 |
| 7,889,711 | B1 * | 2/2011 | Minei et al. | 370/351 |
| 2001/0022786 | A1 * | 9/2001 | King et al. | 370/412 |
| 2001/0055274 | A1 | 12/2001 | Hegge et al. | 370/229 |

(Continued)

OTHER PUBLICATIONS

S. Edwards, "*Vulnerabilities of Network Intrusion Detection Systems: Realizing and Overcoming the Risks; The Case for Flow Mirroring*," Top Layer Networks, Inc., May 1, 2002.

(Continued)

*Primary Examiner* — Phirin Sam
(74) *Attorney, Agent, or Firm* — O'Keefe, Egan, Peterman & Enders, LLP

(57) ABSTRACT

Systems and methods are disclosed that allow for improved management and control of packet forwarding in network systems. Network devices and tool optimizers and a related systems and methods are disclosed for improved packet forwarding between input ports and output ports. The input ports and output ports are configured to be connected to source devices and destination devices, for example, network sources and destination tools in a network monitoring environment. The network devices and tool optimizers disclosed can use a packet processing system whereby forwarding behavior is governed by matching packets in parallel against multiple user-specified packet filtering criteria, and by performing forwarding actions associated with all such matching filter criteria. The multi-action packet forwarding can be implemented using hardware configured to directly provide multi-action packet forwarding and/or hardware configured to provide single-packet-forwarding that has been subsequently configured using filter engines to provide multi-action packet forwarding.

23 Claims, 22 Drawing Sheets

U.S. PATENT DOCUMENTS

| | | | | |
|---|---|---|---|---|
| 2002/0186259 | A1 | 12/2002 | Meandzija et al. | 345/853 |
| 2003/0046657 | A1 | 3/2003 | White | 717/105 |
| 2004/0003094 | A1 | 1/2004 | See | 709/227 |
| 2004/0042470 | A1* | 3/2004 | Cooper et al. | 370/401 |
| 2004/0107361 | A1 | 6/2004 | Redan et al. | 713/201 |
| 2004/0196841 | A1 | 10/2004 | Tudor et al. | 370/389 |
| 2005/0053073 | A1 | 3/2005 | Kloth et al. | 370/395.41 |
| 2005/0182950 | A1* | 8/2005 | Son et al. | 713/189 |
| 2006/0256788 | A1 | 11/2006 | Donahue | 370/389 |
| 2008/0008202 | A1 | 1/2008 | Terrell et al. | 370/401 |
| 2009/0007021 | A1 | 1/2009 | Hayton | 715/843 |
| 2009/0013052 | A1* | 1/2009 | Robarts et al. | 709/206 |
| 2009/0172148 | A1 | 7/2009 | Underwood | 709/224 |
| 2010/0332618 | A1* | 12/2010 | Norton et al. | 709/219 |

OTHER PUBLICATIONS

A. Esson and J. Mannos, "*Broadcom BCM5600 StrataSwitch; A Highly Integrated Ethernet Switch on a Chip*," Broadcom Corporation, Hot Chips Aug. 17, 1999.

J. Magee, "*The Case for IDS Balancing* vs. *A Switch*," Top Layer Networks, Inc., May 2003.

G. Marshall, SC Magazine Reprint, "*Attack Mitigator*," Aug. 2002.

F. Muhtar, "*Appliances to Boost Network Defence*," CyberSecurity Malaysia, Nov. 26, 2001.

National Information Assurance Partnership, "*Common Criteria Evaluation and Validation Scheme, Validation Report; Top Layer Networks; IDS BalancerTM Version 2.2 Appliance (IDSB3531-CCV1.0, IDSB3532-CCV1.0, IDSB4508-CCV1.0)*," Report No. CCEVS-VR-04-0074, National Institute of Standards and Technology; National Security Agency, Sep. 3, 2004.

Radware, "*Radware's Smart IDS Management; FireProof and Intrusion Detection Systems; Deployment and ROI*," North America Radware, Inc.; International Radware, Ltd., Aug. 21, 2002.

SC Magazine Reprint, "*IDS Balancer 3500 Appliance*," Jul. 2002.

Top Layer Networks, Inc., "*Top Layer Advances Scaleable Intrusion Detection With Industry Leading Multi-Gigabit Offering*," Press Release, Mar. 10, 2003.

Top Layer Networks, Inc., "*Product Enhancements Optimize Existing Network Intrusion Detection and Prevention Environments*," Press Release, Aug. 18, 2003.

Top Layer Networks, "*Case Study—IDS Balancer; Building an Intelligent Monitoring Layer Using the Top Layer IDS Balancer Ensures Full Security Coverage for University of California, Irvine*," www.TopLayer.com; 2003.

Top Layer Networks, Inc., "*IDS Balancer 3.0 Delivers Ultimate Flexibility in Selecting, Filtering and Distributing Network Traffic*," Press Release, Oct. 20, 2004.

Top Layer Networks, Inc., "*IDS Balancer; Aggregation, Filtering, & Load Appliance*," internet advertisement, www.TopLayer.com., 2004.

Top Layer Networks, Inc., "*App Switch 2500; The Original Top Layer Device to Perfect the Art of Network Security*," internet advertisement, www.TopLayer.com.

G. Hilton, et al., "*Filtering Path View Graphical User Interfaces and Related Methods*," U.S. Appl. No. 12/462,222, filed Jul. 31, 2009.

R. Pleshek, et al., "*Automatic Filter Overlap Processing and Related Systems and Methods*," U.S. Appl. No. 12/462,221, filed Jul. 31, 2009.

R. Pleshek, et al., "*Superset Packet Forwarding for Overlapping Filters and Related Systems and Methods*," U.S. Appl. No. 12/462,293, filed Jul. 31, 2009.

Non-Final Office Action Dated Jan. 19, 2011, U.S. Appl. No. 12/462,222, filed Jul. 31, 2009.

Non-Final Office Action Dated Apr. 1, 2011, U.S. Appl. No. 12/462,221, filed Jul. 31, 2009.

Non-Final Office Action Dated May 6, 2011, U.S. Appl. No. 12/462,293, filed Jul. 31, 2009.

\* cited by examiner

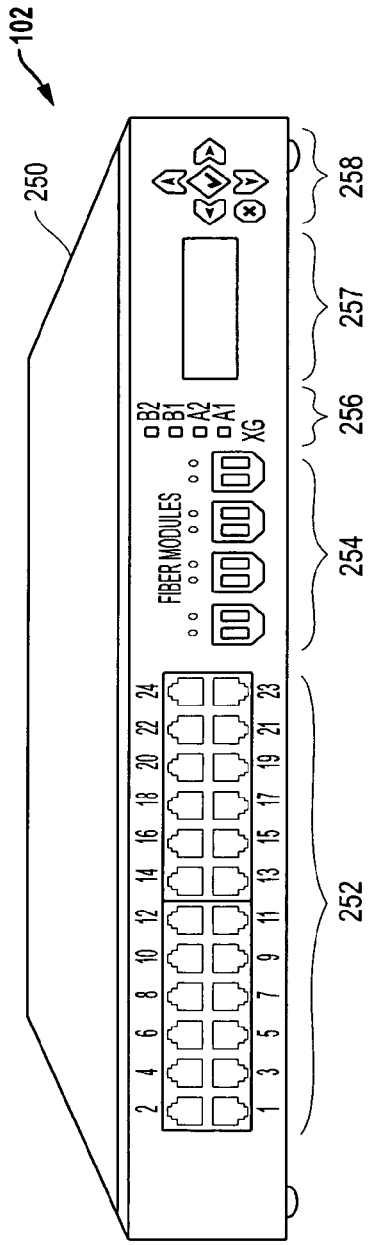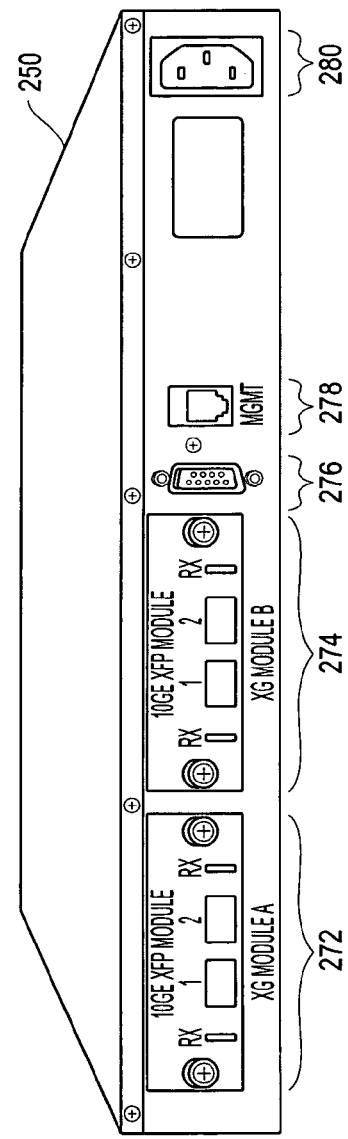
FIG. 2B
FIG. 2C

680

```
COMMAND LINE INTERFACE LISTING source ip 192.168.40.0/24 to destination ip 193.168.40.0/24 using HTTP port 80
    source ip 192.168.40.0/24 to destination ip 193.168.40.0/24 using HTTPS port 443
    source ip 192.168.40.0/24 to destination ip 193.168.50.0/24 using HTTP port 80
    source ip 192.168.40.0/24 to destination ip 193.168.50.0/24 using HTTPS port 443
    source ip 192.168.40.0/24 to destination ip 193.168.60.0/24 using HTTP port 80
    source ip 192.168.40.0/24 to destination ip 193.168.60.0/24 using HTTPS port 443
    source ip 192.168.40.0/24 to destination ip 193.168.70.0/24 using HTTP port 80
    source ip 192.168.40.0/24 to destination ip 193.168.70.0/24 using HTTPS port 443 source ip 192.168.50.0/24 to destination ip 193.168.40.0/24 using HTTP port 80
    source ip 192.168.50.0/24 to destination ip 193.168.40.0/24 using HTTPS port 443
    source ip 192.168.50.0/24 to destination ip 193.168.50.0/24 using HTTP port 80
    source ip 192.168.50.0/24 to destination ip 193.168.50.0/24 using HTTPS port 443
    source ip 192.168.50.0/24 to destination ip 193.168.60.0/24 using HTTP port 80
    source ip 192.168.50.0/24 to destination ip 193.168.60.0/24 using HTTPS port 443
    source ip 192.168.50.0/24 to destination ip 193.168.70.0/24 using HTTP port 80
    source ip 192.168.50.0/24 to destination ip 193.168.70.0/24 using HTTPS port 443 source ip 192.168.60.0/24 to destination ip 193.168.40.0/24 using HTTP port 80
    source ip 192.168.60.0/24 to destination ip 193.168.40.0/24 using HTTPS port 443
    source ip 192.168.60.0/24 to destination ip 193.168.50.0/24 using HTTP port 80
    source ip 192.168.60.0/24 to destination ip 193.168.50.0/24 using HTTPS port 443
    source ip 192.168.60.0/24 to destination ip 193.168.60.0/24 using HTTP port 80
    source ip 192.168.60.0/24 to destination ip 193.168.60.0/24 using HTTPS port 443
    source ip 192.168.60.0/24 to destination ip 193.168.70.0/24 using HTTP port 80
    source ip 192.168.60.0/24 to destination ip 193.168.70.0/24 using HTTPS port 443 source ip 192.168.70.0/24 to destination ip 193.168.40.0/24 using HTTP port 80
    source ip 192.168.70.0/24 to destination ip 193.168.40.0/24 using HTTPS port 443
    source ip 192.168.70.0/24 to destination ip 193.168.50.0/24 using HTTP port 80
    source ip 192.168.70.0/24 to destination ip 193.168.50.0/24 using HTTPS port 443
    source ip 192.168.70.0/24 to destination ip 193.168.60.0/24 using HTTP port 80
    source ip 192.168.70.0/24 to destination ip 193.168.60.0/24 using HTTPS port 443
    source ip 192.168.70.0/24 to destination ip 193.168.70.0/24 using HTTP port 80
    source ip 192.168.70.0/24 to destination ip 193.168.70.0/24 using HTTPS port 443
```

*FIG. 6C*
*(Prior Art)*

AUTOMATIC FILTER OVERLAP PROCESSING AND RELATED SYSTEMS AND METHODS

RELATED APPLICATIONS

This application is related in subject matter to concurrently filed applications: U.S. patent application Ser. No. 12/462,222, entitled "FILTERING PATH VIEW GRAPHICAL USER INTERFACES AND RELATED SYSTEMS AND METHODS," and U.S. patent application Ser. No. 12/462,293, entitled "SUPERSET PACKET FORWARDING FOR OVERLAPPING FILTERS AND RELATED SYSTEMS AND METHODS," each of which is hereby incorporated by reference in its entirety.

TECHNICAL FIELD OF THE INVENTION

This invention relates to network systems and, more particularly, to network monitoring systems that collect and analyze packets associated with network communications.

BACKGROUND

Packet-based data networks continue to grow in importance as the communication mechanism of choice for new applications and services. Examples of this importance include web-based electronic commerce, electronic mail, instant messaging, voice over internet protocol (VoIP), streaming video (e.g., content from current websites such as youtube.com and hulu.com), internet protocol television (IPTV) and precision time protocol (PTP). In order to ensure successful delivery of these new applications and services, it is desirable to monitor both underlying network behavior and overall application performance on an ongoing basis. To meet these new monitoring needs, many new and innovative network monitoring and diagnostic tools have been developed and sold, either as an application that runs on an ordinary computer, or as an integrated hardware appliance.

One problem associated with the use of these network monitoring and diagnostic tools in network environments is the complexity of obtaining data from network sources and providing this data to the tools within the network monitoring system. Network monitoring applications and/or appliances require access to network data to perform their functions. Currently, this data access is typically provided using a network hub, using a network test access port (TAP) or using a switched port analyzer available on network switches. For example, with respect to this latter data source, network switches produced by Cisco Systems include a SPAN port to which traffic on the switch is mirrored. It is also noted that other data access methods may also be used or may become available in future networks.

A network hub essentially operates as a multi-port repeater for Ethernet networks. It is placed in-line with one of the existing links in a network and provides a copy of the data sent through that link to a third port, to which monitoring tools can be connected. The hub forces the monitored network segment to operate in half-duplex mode, which makes the use of network hubs impractical for most situations.

A TAP is placed in series with a network link and provides an exact copy of packets going in each direction on that link. TAPs are similar to network hubs, except that they do not require the network to operate in half-duplex mode. Furthermore, TAPs are generally designed to be failsafe so that they do not interfere with the network being monitored. To accomplish this, TAPs are typically designed so that the network can continue normal operation even if power is lost to the TAP, and so that the monitoring device is prevented from injecting packets back into the network. TAPS can be built-in (i.e., internal) to a network monitoring device, or can be external (i.e., stand alone) devices. Further, TAPs can be either passive or active. Passive TAPs meet the failsafe requirement implicitly while active TAPs often incorporate specific components (such as relays) which restore normal network operations when power is lost to the active TAP.

A SPAN port (also often called a mirror port) provides a copy of the packets within a network switch or router. The main limitation of SPAN ports is that typical switches support only a few SPAN ports per switch or router.

In addition to the foregoing technical limitations for providing access to network data, an additional consideration is the cost associated with hub, TAP and SPAN port enabled devices that can used to provide the data. This significant cost along with the growing need for network access and technical limitations of the common access techniques have led to a shortage of access to network data for monitoring purposes. Because of this limited access, most networks do not have sufficient monitoring points to meet the individual needs of all the network monitoring applications or appliances.

To help alleviate the problem of limited access to networks for monitoring, tool aggregation devices have been developed that allow sharing access to the monitored data. These tool aggregation devices allow users to take data from one or more network monitoring points, such as described above, and forward it to multiple different monitoring tools according to user specified forwarding rules. These tool aggregation devices typically use SPAN ports and TAPs as the predominant method of accessing network data. The tool aggregation devices further provide some filtering capabilities beyond traditional packet switches/routers including the ability to aggregate and filter traffic from multiple network sources and the ability to multicast traffic to multiple ports. Thus, tool aggregation devices enable users to share access to network data for monitoring and somewhat alleviate the problem of access to data. However, the filtering and forwarding capabilities of existing tool aggregation devices are built on single-forwarding-action techniques that are used for traditional packet switches and routers. As a result, existing tool aggregation devices have significant limitations for monitoring applications.

Traditional packet switches and routers are multi-port network devices that receive packets on one port, and forward them out of one or more other ports. The rules governing the behavior of such devices are contained in one or more tables. The forwarding tables may be either statically or dynamically configured, depending on the specific protocols used in the network. When a packet is received, the switch or router examines protocol information in the packet header (such as destination address) and uses that information to look up the one and only one appropriate action in the forwarding table. This characteristic of traditional packet switches and routers is referred to herein as a "single-forwarding-action" behavior or technique.

In short, when a traditional switch or router performs a lookup in a forwarding table, the lookup returns at most one result. This single-forwarding-action behavior is found in all network equipment today. Indeed, it is a fundamental assumption in the design of traditional network switches and routers that there can only be one "answer" that determines what to do with each packet, and thus it is only necessary to perform a "single-forwarding-action" on each packet. This rationale is so deeply engrained in network protocols today that packets cannot have more than one destination address.

Even in multicasting packets or broadcasting packets, a single multicast destination address or a single broadcast action is used, respectively. This single-forwarding-action design has the advantage in networks that it prevents excessive copies of a packet from traveling through a network and unnecessarily consuming bandwidth. However, it has considerable disadvantages with respect to network monitoring systems where it is desirable to forward packets to multiple monitoring tools.

Similar to traditional packet switches/routers, existing tool aggregation devices also continue to be limited to the sequential nature of searching for a single matching rule within a memory such as a TCAM. Forwarding behavior is governed by matching packets against user-specified packet filtering criteria, but the first or highest priority user defined criteria that matches is the one that is acted upon. Subsequent lower priority user specified packet filtering criteria that would have matched the packet do not get acted upon. Users of existing tool aggregation devices that wish to forward packets according to multiple parallel overlapping criteria must know how to determine manually when such situations occur and must take appropriate action to work around this single-forwarding-action limitation. In practice, this means that users must manually provision additional higher priority filtering criteria to handle cases where filter overlaps exist (e.g., different forwarding actions are desired for the same packet based upon different filtering criteria).

Existing tool aggregation devices, therefore, require users to manually define filtering criteria, including prioritizing the order that the filtering criteria are implemented within a TCAM filter stage. When overlaps exist, only the first TCAM entry that matches gets acted upon based on TCAM priority. As such, downstream instruments may not see all the traffic that they are supposed to see when overlaps exist unless users manually account for the overlaps themselves. In attempting to account for these overlaps, however, the burden is on the user to understand the filter overlaps and to create filtering criteria and related forwarding actions for each overlap to guarantee that packets are directed to all the desired instrument ports.

Manually generating the filter criteria, however, particularly to handle overlaps, can quickly become a very difficult task, if not practically impossible. To ensure all filtering criteria is acted upon when overlaps exist, for example, users must configure the overlap intersections and correctly prioritize these intersections relative to one another and to the original filtering criteria. Further, if the user creates these additional intersections to prevent overlap, the user may then need to manually sum the counts in the added forwarding actions to achieve meaningful filter statistics. This manual overlap handling is a difficult task because simple overlaps involving independent fields (e.g., destination address field and VLAN field) may not be obvious to users, and more complex filtering criteria may expand into an enormous number of overlaps. Overlaps, therefore, cannot be readily understood or easily configured/maintained as a manual process. Further, a manual process is a complex and time consuming task having a greater probability of including errors in setting up the filtering criteria and related forwarding actions. Further, manually maintaining the filtering criteria is extremely difficult whenever modifications are desired because a user must go back and determine how these modifications will affect the prior filtering criteria manually set up to forward packets. With existing tool aggregation devices, many users simply ignore overlaps and accept the fact that tools will not receive all desired packets.

In short, there exists a considerable need to improve the ability of users to share network sources among a number of different monitoring tools for purposes of network monitoring. And there exists a considerable need to improve the ability of users to create, view and manage filtering criteria and related forwarding actions for purposes of network monitoring.

SUMMARY OF THE INVENTION

Systems and methods are disclosed that allow for improved management and control of packet forwarding in network systems. Network devices and tool optimizers and a related systems and methods are disclosed for improved packet forwarding between input ports and output ports. The input ports and output ports are configured to be connected to source devices and destination devices, for example, network sources and destination tools in a network monitoring environment. The network devices and tool optimizers disclosed can include graphical user interfaces (GUIs) through which a user can create and modify filters and select associated filter criteria or parameters for forwarding packets from input ports to output ports. The network tools and tool optimizers can also automatically generate filter rules and apply them to the appropriate filter engines so that packets are forwarded as desired by the user. Further, the network devices and tool optimizers can include a packet processing system whereby forwarding behavior is governed by matching packets in parallel against multiple user-specified packet filtering criteria, and by performing forwarding actions associated with all such matching filter criteria. As described herein, this behavior is different from the single-forwarding-action behavior of traditional packet switches and routers, and is also different from existing network switch devices and existing tool aggregation devices. As further described, this multi-action forwarding behavior is particularly advantageous for network monitoring applications to facilitate sharing access to limited monitoring resources in a simple and straightforward way. Other features and variations can be implemented, if desired, and related systems and methods can be utilized, as well.

In one embodiment, a network packet forwarding device having automatic filter overlap processing is disclosed including one or more input ports configured to receive packets from one or more source devices, a plurality of output ports configured to send packets to two or more destination devices, packet forwarding circuitry coupled between the input ports and the output ports and configured to forward packets from the input ports to the output ports, at least one filter engine coupled to the packet forwarding circuitry and configured to use filter rules to control at least in part how packets are forwarded by the packet forwarding circuitry from the input ports to the output ports, a filter interface configured to allow a user to define a plurality of filters representing how packets are desired to be forwarded from input ports to output ports, and a dynamic filter processor. The dynamic filter processor is configured to analyze the user-defined filters, to automatically identify filters having different forwarding actions for packets from a single input port as overlapping filters, to automatically generate filter rules for the filter engine to provide for the different forwarding actions, and to automatically apply the filter rules to the filter engine so that the filter engine is configured to cause packets from the single input port to be forwarded according to the different forwarding actions provided by the overlapping filters.

In one further embodiment, the one filter engine includes a multi-action filter engine configured to directly cause packets from the single input port to be forwarded according to the different forwarding actions provided by the overlapping filters. Further, the multi-action filter engine can include a plurality of individual filter match engines, each configured to provide a least one forwarding action per packet, and a combiner coupled to receive and combine the forwarding actions from the plurality of individual filter match engines so that the multi-action filter engine is configured to directly cause packets from the single input port to be forwarded according to the different forwarding actions provided by the overlapping filters. Still further, the combiner can be configured to combine the forwarding actions received from the individual filter match engines using a Boolean OR operation.

In another embodiment, the filter engine can include at least one ingress filter engine configured to provide a single forwarding action per packet and to use ingress filter rules to determine at least in part how packets are forwarded from input ports to output ports, and at least one egress filter engine configured to use egress filter rules to determine at least in part which packets received by the output ports are actually sent out by the output ports to destination devices. And the dynamic filter processor can be configured to generate ingress and egress filters rules for the ingress and egress filter engines and to apply the ingress and egress filter rules to the ingress and egress filter engines so that the ingress and egress filter engines are configured to cause packets from the single input port to be forwarded according to the different forwarding actions provided by the overlapping filters.

In further embodiments, the dynamic filter processor is configured to automatically generate the filter rules regardless of an order in which a user defines the overlapping filters. The filter interface can be configured to allow a user to define the filters using filter parameters and desired connection paths to input ports and output ports. The dynamic filter processor can be configured to treat a filter connected to N input ports as a set of N filters for purposes of generating the filter rules. The interface can be configured to be accessed through one or more management platforms by a plurality of users at the same time. Still further, the packets can include a plurality of fields, each field having one or more values, and the interface can be configured to allow the user to define filters using filter parameters associated with the fields and values. And the dynamic filter processor can be further configured to identify overlapping filters by determining if two filters have common fields selected by their respective filter parameters and then by determining if values selected by their respective filter parameters are overlapping. In addition, the dynamic filter processor can be configured to implement filter rules for a first overlapping filter without affecting operation of filter rules for a second overlapping filter. The interface can be configured to allow the user to manually adjust filter rules automatically generated for the filter engine. Still further, the source devices can be network monitoring sources, and the destination devices can be network monitoring tools.

In another embodiment, a method for automatic filter overlap processing is disclosed including providing one or more input ports configured to receive packets from one or more source devices, providing a plurality of output ports configured to send packets to two or more destination devices, forwarding packets between the input ports and the output ports using packet forwarding circuitry, controlling the packet forwarding using at least one filter engine configured to use filter rules to control at least in part how packets are forwarded by the packet forwarding circuitry from the input ports to the output ports, allowing a user to define through an interface a plurality of filters representing how packets are desired to be forwarded from input ports to output ports, analyzing the user-defined filters, automatically identifying filters having different forwarding actions for packets from a single input port as overlapping filters, automatically generating filter rules for the filter engine to provide for the different forwarding actions, automatically applying the filter rules to the filter engine so that the filter engine is configured to cause packets from the single input port to be forwarded according to the different forwarding actions provided by the overlapping filters, and forwarding packets according to the user-defined filters.

In one further embodiment, the controlling step can include using a multi-action filter engine to directly cause packets from the single input port to be forwarded according to the different forwarding actions provided by the overlapping filters. And the method can further include providing a plurality of individual filter match engines for the multi-action filter engine, each configured to provide a least one forwarding action per packet, and combining the forwarding actions from the plurality of individual filter match engines so that the multi-action filter engine is configured to directly cause packets from the single input port to be forwarded according to the different forwarding actions provided by the overlapping filters. Still further, the method can include combining the forwarding actions received from the individual filter match engines using a Boolean OR operation.

In another further embodiment, the controlling step can include using at least one ingress filter engine to provide a single forwarding action per packet and to determine at least in part how packets are forwarded from input ports to output ports, using at least one egress filter engine to determine at least in part which packets received by the output ports are actually sent out by the output ports to destination devices, automatically generating ingress and egress filters rules for the ingress and egress filter engines and automatically applying the ingress and egress filter rules to the ingress and egress filter engines so that the ingress and egress filter engines are configured to cause packets from the single input port to be forwarded according to the different forwarding actions provided by the overlapping filters.

In further embodiments, the automatically generating step can include automatically generating the filter rules regardless of an order in which a user defines the overlapping filters. The method can further including treating a filter connected to N source ports as a set of N filters for purposes of generating the filter rules. The allowing step can include allowing a plurality of users to access the interface through one or more management platforms at the same time. The packets can include a plurality of fields, each field having one or more values, and the allowing step can include allowing the user to define filters using filter parameters associated with the fields and values. Further, The automatically identifying step can include identifying overlapping filters by determining if two filters have common fields selected by their respective filter parameters and then by determining if values selected by their respective filter parameters are overlapping. Still further, the method can further include generating and applying filter rules for a first overlapping filter without affecting operation of filter rules for a second overlapping filter.

Other features and variations can be implemented, if desired, and related systems and methods can be utilized, as well.

DESCRIPTION OF THE DRAWINGS

It is noted that the appended drawings illustrate only exemplary embodiments of the invention and are, therefore, not to be considered limiting of its scope, for the invention may admit to other equally effective embodiments.

FIG. 2B is a diagram for front external connections for the network tool optimizer.

FIG. 2C is a diagram for back external connections for the network tool optimizer.

FIG. 6C (Prior Art) is a diagram for the complicated command line interface (CLI) instructions that might be needed in prior systems to implement a similar user-define filter as set forth in FIGS. 6A and 6B.

DETAILED DESCRIPTION OF THE INVENTION

Figure 1:
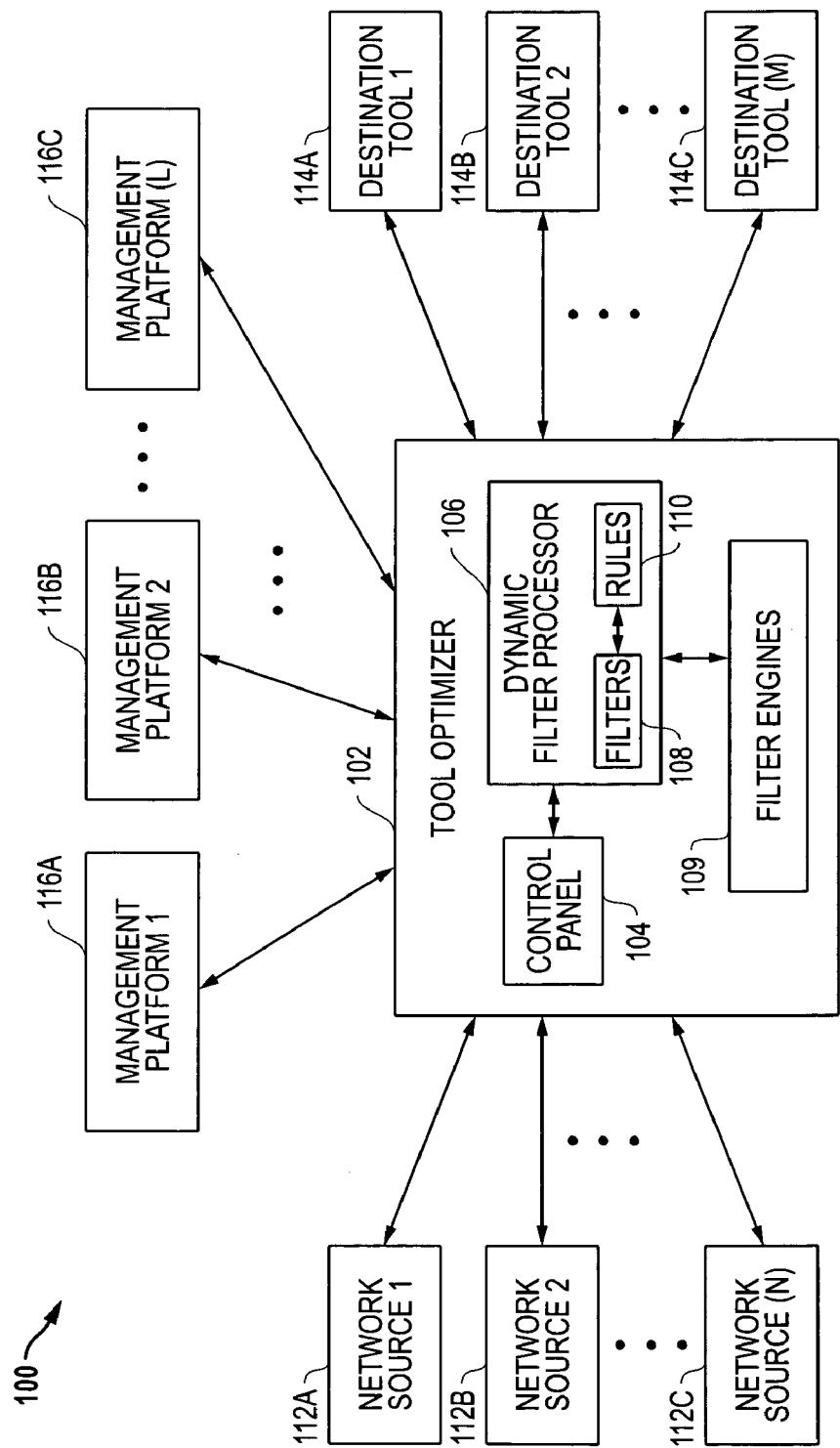
FIG. 1 is a block diagram for a network monitoring system including a network tool optimizer as described herein.

Systems and methods are disclosed that allow for improved management and control of packet forwarding in network systems. Network devices and tool optimizers and a related systems and methods are disclosed for improved packet forwarding between input ports and output ports. The input ports and output ports are configured to be connected to source devices and destination devices, for example, network sources and destination tools in a network monitoring environment. The network devices and tool optimizers disclosed can include graphical user interfaces (GUIs) through which a user can create and modify filters and select associated filter criteria or parameters for forwarding packets from input ports to output ports. The network tools and tool optimizers can also automatically generate filter rules and apply them to the appropriate filter engines so that packets are forwarded as desired by the user. Further, the network devices and tool optimizers can include a packet processing system whereby forwarding behavior is governed by matching packets in parallel against multiple user-specified packet filtering criteria, and by performing forwarding actions associated with all such matching filter criteria. As described herein, this behavior is different from the single-forwarding-action behavior of traditional packet switches and routers, and is also different from existing network switch devices and existing tool aggregation devices. As further described, this multi-action forwarding behavior is particularly advantageous for network monitoring applications to facilitate sharing access to limited monitoring resources in a simple and straightforward way. Other features and variations can be implemented, if desired, and related systems and methods can be utilized, as well.

The embodiments described herein are powerful and easy-to-use solutions for packet filtering and provide, in part, automatic creation of filter rules, automatic handling of filter overlaps, hitless (i.e., without affecting other traffic) filter re-configuration, and a graphical user interface (GUI). These features provide significant advantages over prior implementations because of the time that it saves the end user when learning how to use the system and when creating/updating a configuration. Further, the user is not required to adjust existing filter configurations when new overlapping filters are added to the configuration. The embodiments described herein provide the following advantages, but are not limited to these advantages:

1. Users can define filters (and their connections) abstractly based on the forwarding behavior they want to achieve without needing to understand the underlying details of the filter engine configuration. The dynamic filter processor automatically identifies filter overlaps, calculates the required filter engine configuration, and updates the configuration hitlessly (i.e., without affecting other current traffic).
2. The dynamic filter processor processing does not require that the user generate additional filters to specify and account for filter overlaps, and does not require users to prioritize filters. Rather, users can utilize Boolean logic expressions (e.g., AND, OR, NOT, etc.) to generate desired filtering criteria followed by automated filter rule generation to implement these defined filtering criteria. The multi-action packet forwarding described below can also be used by the dynamic filter processor to accomplish this processing.

3. The dynamic filter processor processing allows for self maintaining solutions. As filters are added, modified, or deleted, overlaps are dynamically recalculated and maintained in real time. The dynamic filter processor helps to ensure that every packet matching a user-defined filter is transmitted out the appropriate egress port regardless of overlaps. Multi-action packet forwarding can be used by the dynamic filter processor to accomplish this processing.

4. Filter match statistics (e.g., packet and byte counters) are automatically aggregated from all of the underlying filter match counts. The filter match statistics accurately count every packet match by taking into account the priority architecture of TCAMs, the interaction between multiple parallel TCAMs and the overlaps with other filters.

Figure 6A:
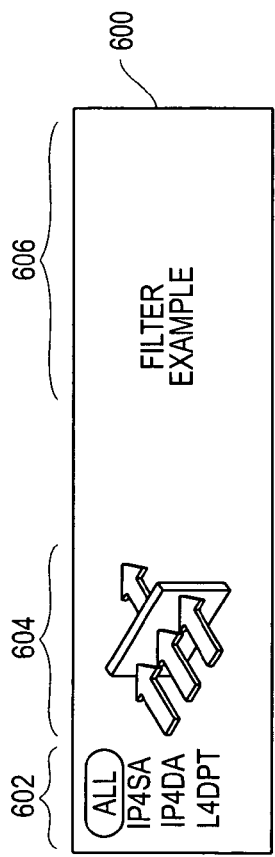
FIG. 6A is a diagram for a graphical representation for an example user-defined filter.
Figure 6B:
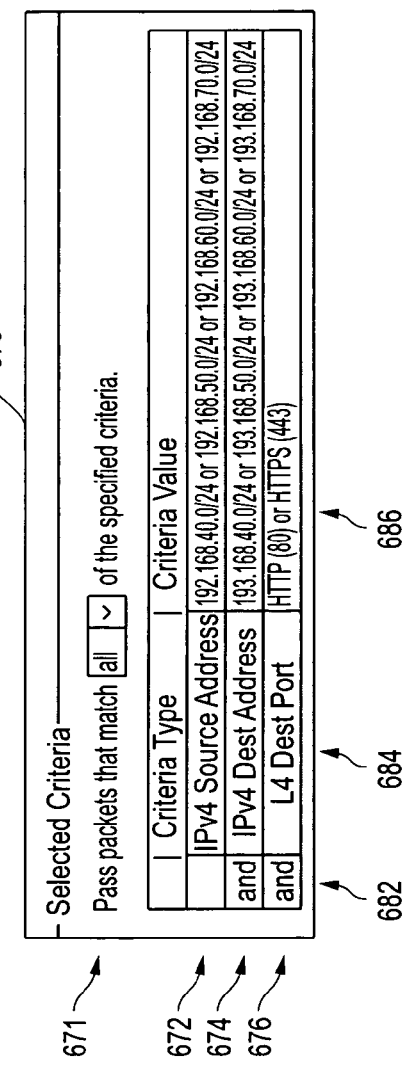
FIG. 6B is diagram for example filter parameter selections and related Boolean logic for the example user-defined filter associated with FIG. 6A.
Figure 7A:
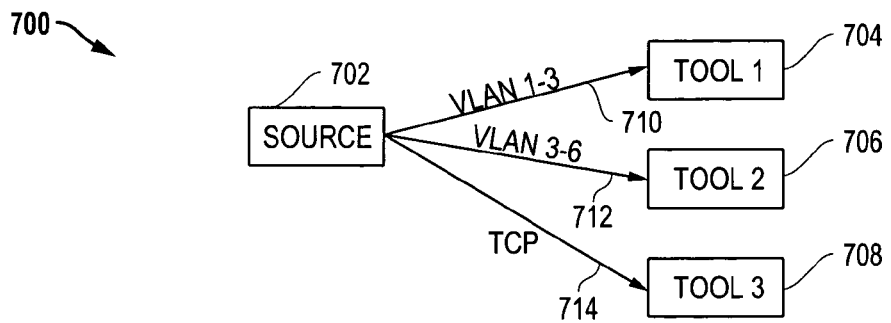
FIG. 7A is a block diagram showing three filters which contain overlapping filter criteria for forwarding network packets from a network source to three destination tools.
Figure 7B:
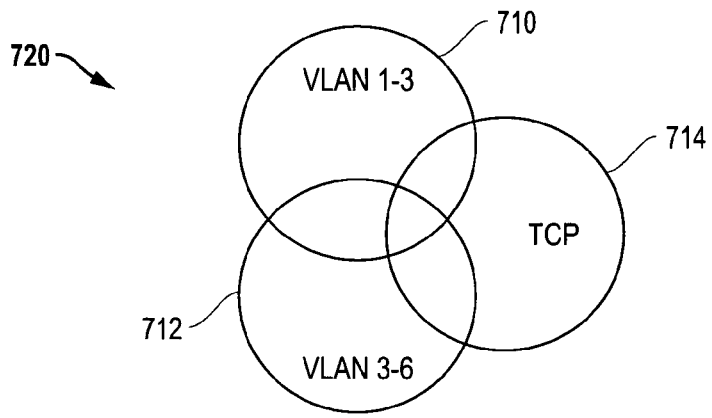
FIG. 7B is a Venn diagram showing potential overlaps for the overlapping filter criteria set forth in FIG. 7A.
Figure 7C:
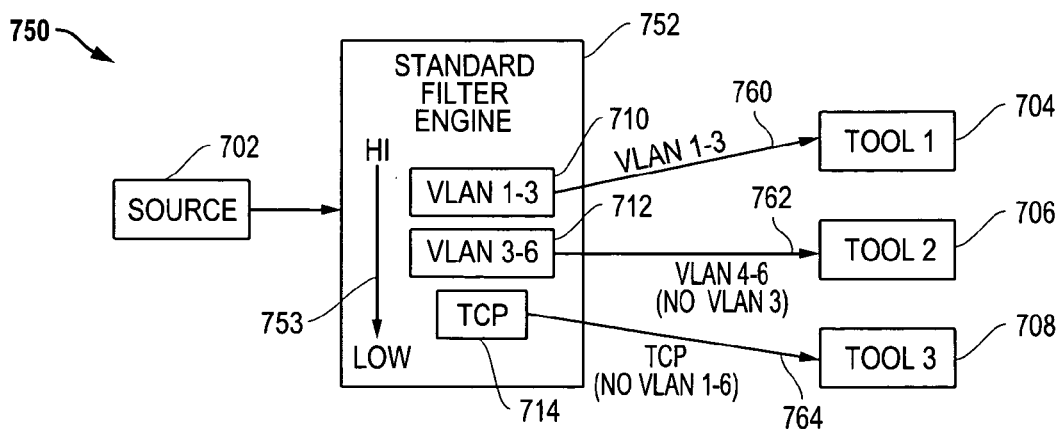
FIG. 7C (Prior Art) is a block diagram showing difficulties in utilizing standard filters (e.g., TCAMs) to implement overlapping filter criteria.
Figure 8:
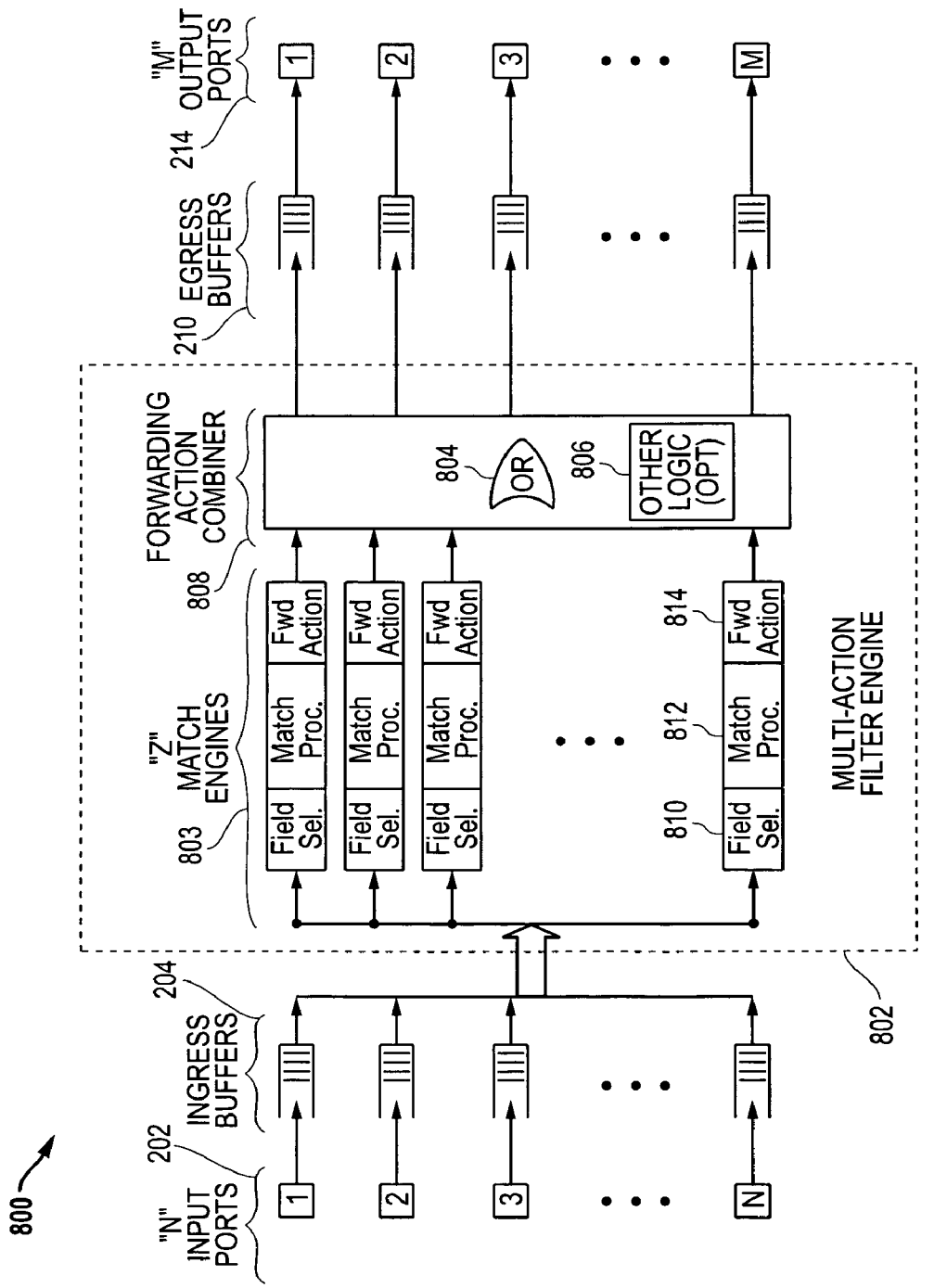
FIG. 8 is a block diagram for a packet processing system whereby the forwarding behavior is governed by matching packets in parallel against multiple user-specified packet filtering criteria, and by performing the forwarding actions associated with all such matching filter criteria.
Figure 9A:
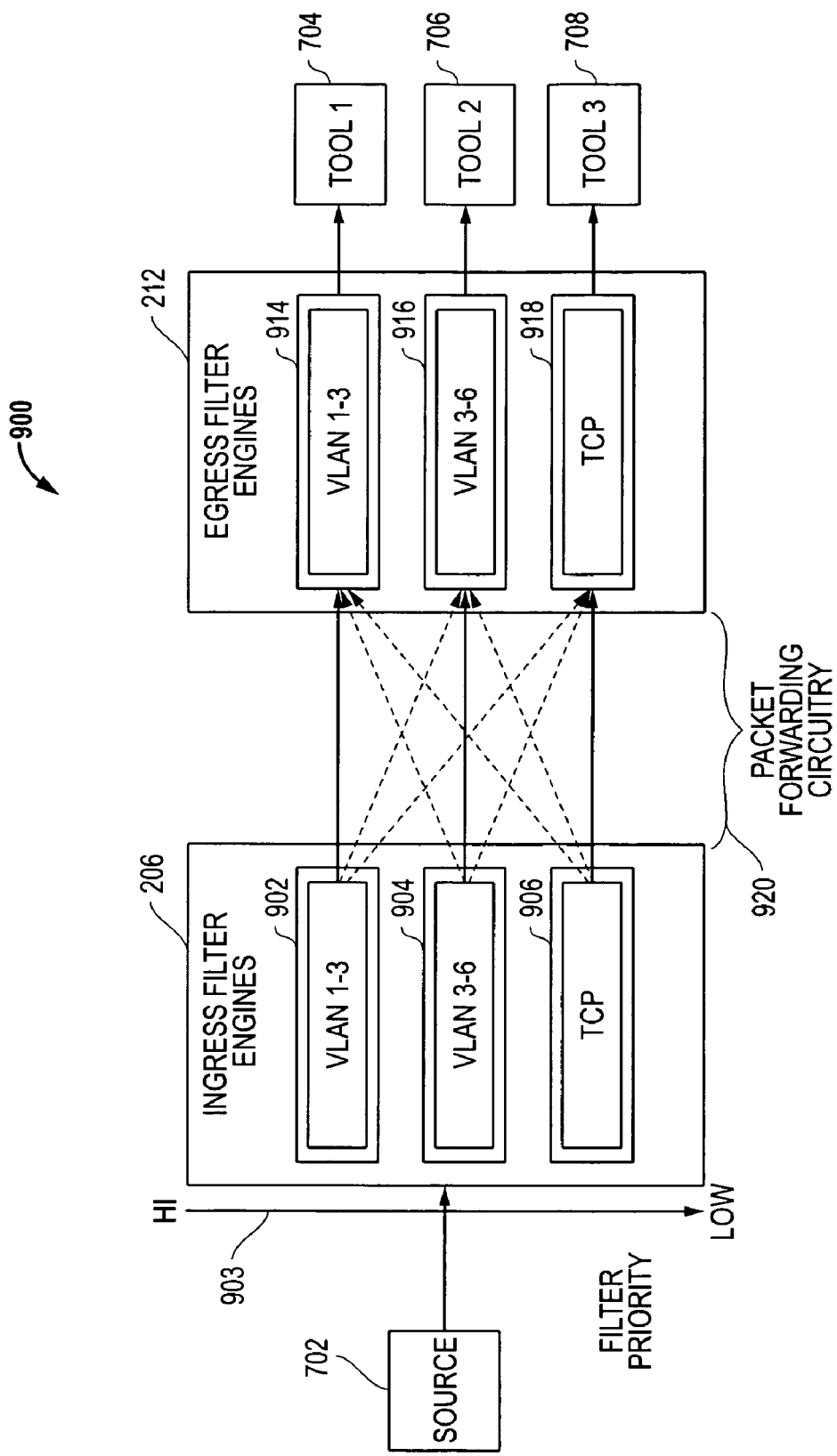
FIG. 9A is a block diagram for using dynamically created ingress filter rules and egress filter rules using superset forwarding to handle overlapping filters.
Figure 9B:
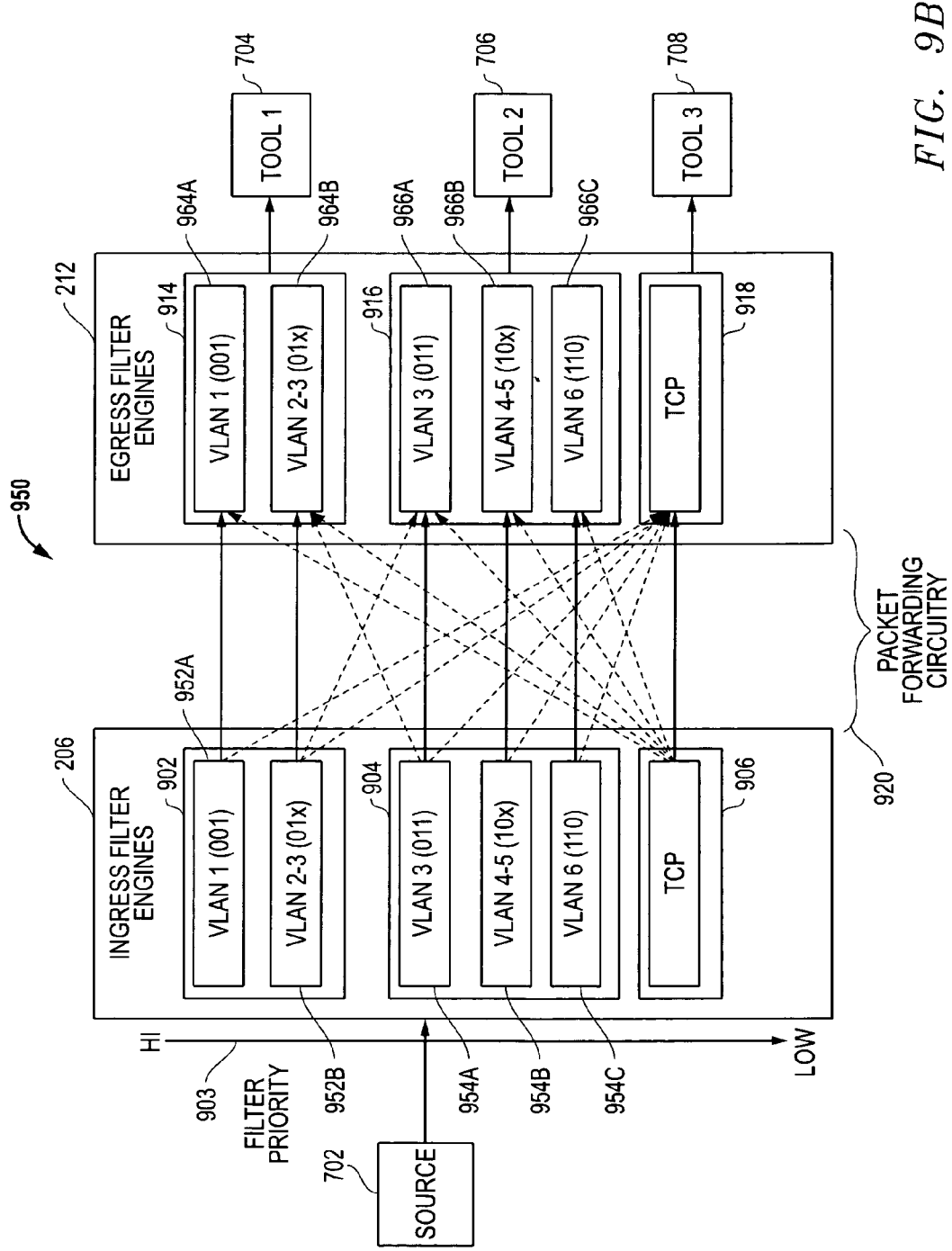
FIG. 9B is a block diagram for using value/mask filter decomposition for the ingress and egress filter rules of FIG. 9A.
Figure 10A:
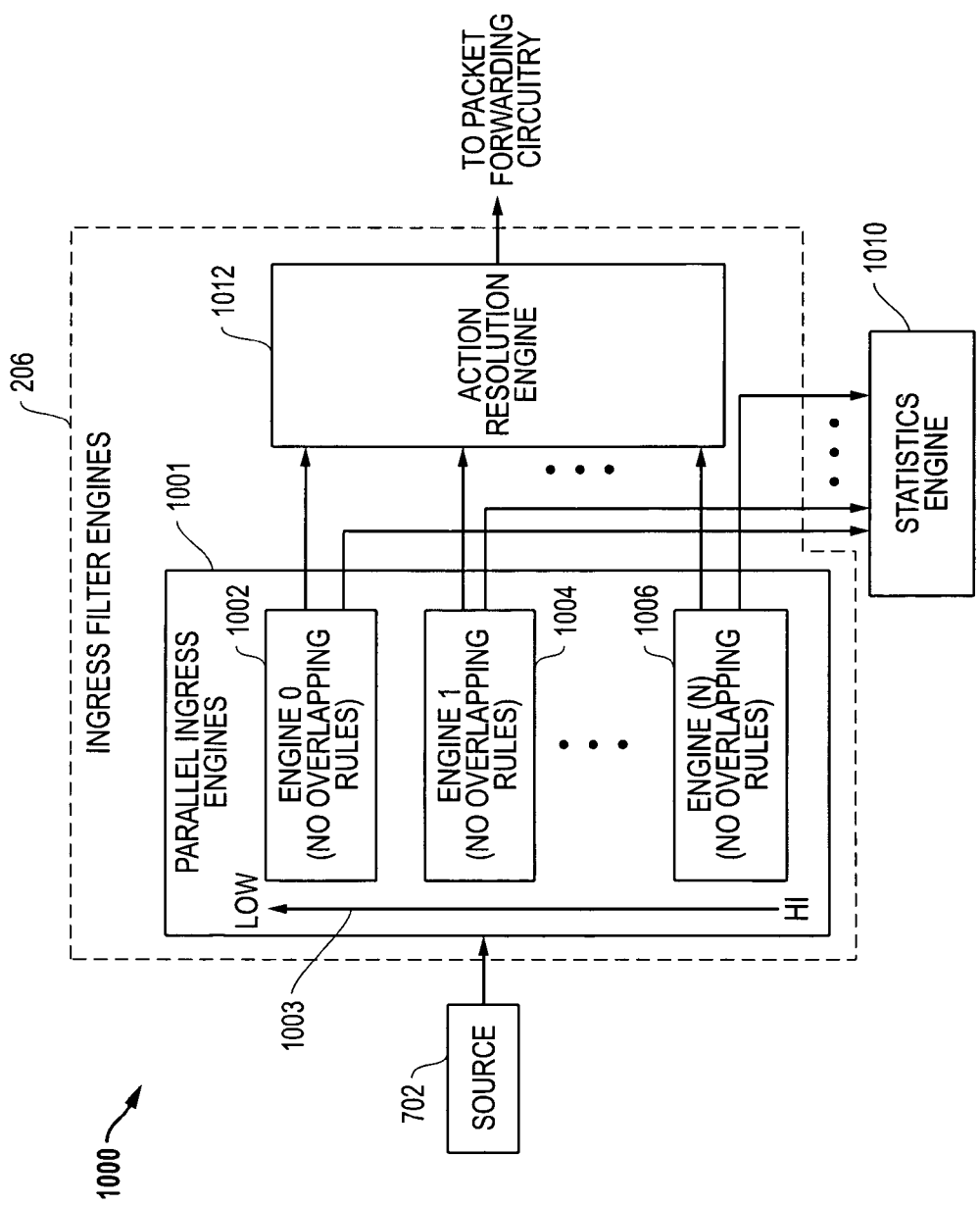
FIG. 10A is block diagram for using multiple ingress filter engines with non-overlapping internal rules in order to improve filter statistics for the tool optimizer as described herein.
Figure 10B:
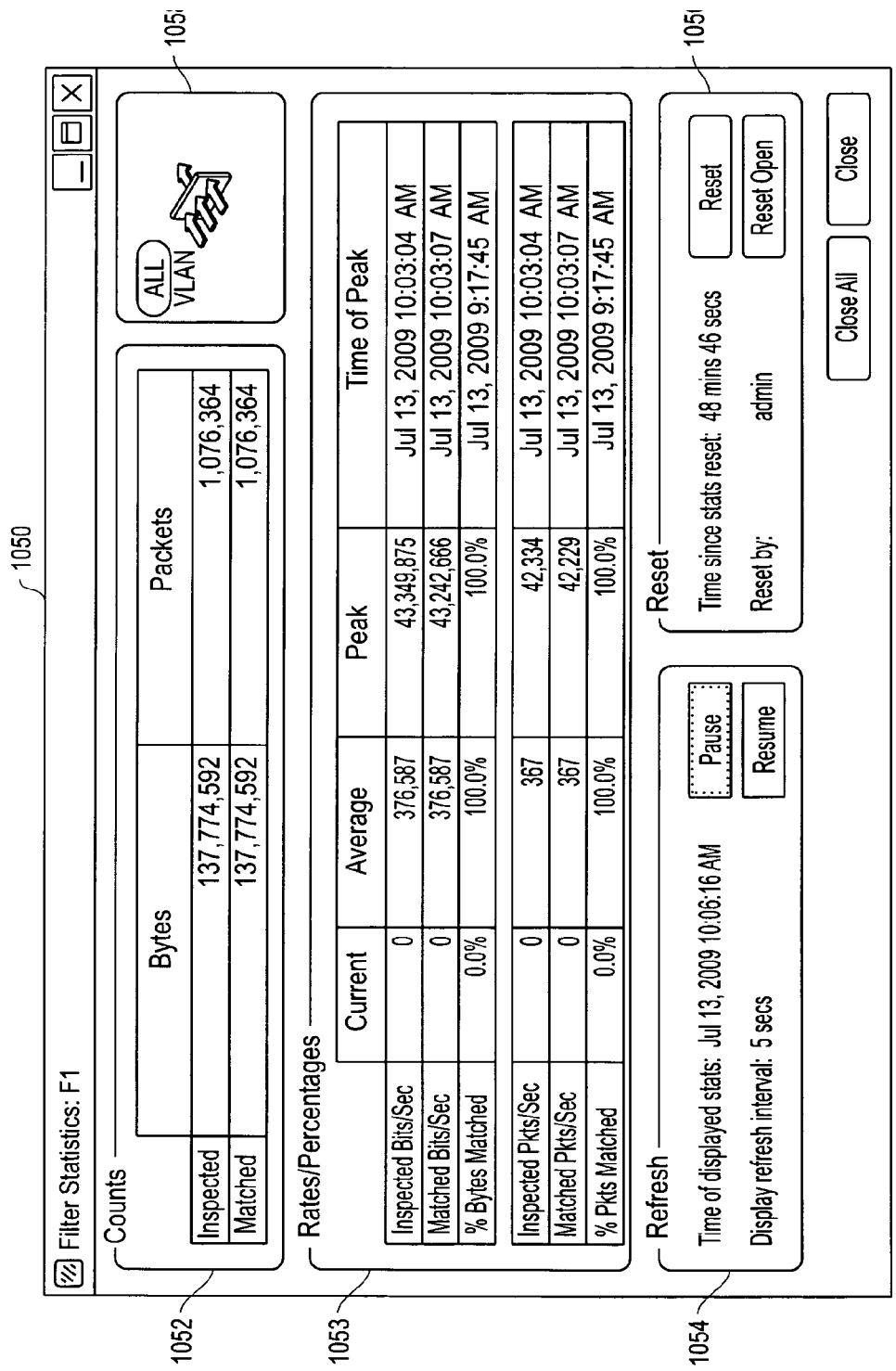
FIG. 10B is a diagram for a graphical user interface providing filter statistics.

Embodiments for tool optimizers for network monitoring systems are described in more detail below with respect to the drawings. FIGS. 1 and 2A-D provide example embodiments for a network monitoring system and the tool optimizer. FIGS. 3A-B, 4 and 5A-B provide example embodiments for a GUI associated with viewing, creating and modifying packet forwarding paths from sources through filters to destinations. FIGS. 6A-B and FIG. 6C (Prior Art) provide a comparison between the GUI-based user-definition of filters, filter parameters and relating Boolean logic, as described herein, as compared to complicated command line interface (CLI) instructions that would be required in a typical prior system. FIGS. 7A-B provide examples for overlapping filters desired by a user. FIG. 7C (Prior Art) provides an example of how destination tools in prior systems would likely not receive the packets desired by the user. FIG. 8 provides an example embodiment using multi-action packet forwarding to implement user-defined filters. FIGS. 9A-B provide example embodiments including the use of action superset egress (ASE) processing to forward packets to a superset of egress filter rules associated with destination tools so that the destination tools receive all desired packets. FIGS. 10A-B provide an example for using multiple ingress filter engines to improve the accuracy of filter statistics and an example for reporting statistics data. FIGS. 11A-D provide example embodiments for optimizing superset packet forwarding by considering priority and expected match rates. FIGS. 12A-C provide a more particular example for optimization associated with the use of Pass All filters.

It is noted that the discussions below focus on tool optimizer embodiments for networking monitoring systems where packets from network sources are filtered and forwarded to one or more destination tools configured to monitor network activities. However, the techniques and capabilities described herein, as well as the advantageous features described above, can be utilized in other network devices, if desired, to facilitate the control and management of packet forwarding in network systems. It is further noted that as used in the example embodiments and the discussions below, network ports, input ports and source ports are each used to refer to ports, for example, on a tool optimizer or other network device, into which packets from network source devices are received. It is further noted that instrument ports, output ports, tool ports and destination ports are each used to refer to ports, for example, on a tool optimizer or other network device, out of which packets are sent to destination devices. It is also noted that input ports and/or the output ports can be configured to operate bi-directionally, such that the physical ports can operate simultaneously as input ports and as output ports. While the following discussions treat ports as input ports or output ports in order to simplify the discussion, a tool optimizer or other network device may have bi-directional ports that simultaneously operate as both input ports (e.g., configured to receive packets) and output ports (e.g., configured to output packets).

Network Monitoring System and Tool Optimizer

FIG. 1 is a block diagram of an example embodiment for a network monitoring system 100 including a network tool optimizer 102 as described herein. The network monitoring system 100 can include any of a wide variety of systems that are connected within a network, for example, in a commercial enterprise. These systems can include server systems, data storage systems, desktop computer systems, portable computer systems, network switches, broadband routers and any other desired system that is connected into a network that can include local area networks and/or wide area networks, as desired. In addition to these systems, network tools can also be connected to the network and/or to systems within the network. Network tools include traffic monitoring devices, packet sniffers, data recorders, voice-over-IP monitors, intrusion detection systems, network security systems, application monitors and/or any other desired network management or security tool device. These network tools can obtain signals or packets from a wide variety of network sources, including network TAPs and monitor ports on network switches and/or any other desired network source. It is further noted that the network communications can be based upon any desired protocol or combination of protocols including Ethernet protocols, multi-protocol label switching (MPLS), FibreChannel (FC) and/or any other desired communication protocol that can be used for network communications.

In the embodiment depicted in FIG. 1, network monitoring system 100 includes a tool optimizer 102 connected to network sources, destination tools and management platforms. In particular, a plurality of network sources 112A (SOURCE 1), 112B (SOURCE 2) . . . 112C (SOURCE (N)) provide data sources for network-based information that is to be monitored and/or analyzed by a plurality of destination tools 114A (TOOL 1), 114B (TOOL 2) . . . 114C (TOOL (M)). As described in more detail below, the tool optimizer 102 includes dynamic filter processor 106 that operates to forward packets from the data sources to the destination tools based upon filter rules 110 applied to filter engines 109. Also as described below, the tool optimizer 102 allows users to view, define and/or manage user-defined filters 108, and the tool optimizer 102 automatically generates the filter rules 110 based upon these user-defined filters 108 for properly forwarding packets based upon the desired forwarding set forth in the user-defined filters 108. Once generated, these filter rules are then applied by the dynamic filter processor 106 to filter engines 109 that are used to determine how packets are forwarded by the tool optimizer 102 from the network sources 112A, 112B . . . 112C to the destination tools 114A, 114B . . . 114C. The tool optimizer 102 also includes a control panel module 104 that allows one or more management platforms 116A (PLATFORM 1), 116B (PLATFORM 2) . . . 116C (PLATFORM (L)) to connect to tool optimizer 102 and to manage the operation of the tool optimizer 102. For example, using one or more of the management platforms, users can view, create and/or manage the filters 108 which indicated how packets are desired to be forwarded from one or more network sources 112A, 112B . . . 112C is to one or more destination tools 114A, 114B . . . 114C through one or more filters 108. It is further noted that the tool optimizer 102 can provide filter templates that could utilized and modified by the user, if desired, rather than requiring a user to create and define all parameters for a desired filter.

It is noted that the tool optimizer 102 can also be connected to the network, and the management platforms 116A, 116B . . . 116C can access the control panel 104 through a network browser (e.g., MICROSOFT Internet Explorer or MOZILLA Firefox). For example, the tool optimizer 102 can be configured to include a web server that will automatically download a control panel software application to a management platform when a web browser operating on the management platform connects to the IP address for the tool optimizer 102. This download can occur the first time the web browser connects, and the control panel 104 is then stored locally from that point forward by the management platform. The management platforms 116A, 116B . . . 116C can be, for example, personal computer systems running WINDOWS or LINUX operating systems, or some other operating system if desired. The control panel 104 can provide a graphical user interface (GUI) through which the user can manage and control the tool optimizer 102. As described further below, this GUI can include a path view GUI that allows one or more users to view, define and manage packet forwarding paths from network sources to destination tools and allows one or more users to view, define and manage filters for these paths using a GUI-based filter creation tool. Further, the control panel 104 can in part be downloaded to the management platforms 116A, 116B . . . 116C for execution thereon, such as through JAVA-based software code or modules pushed to the management platforms 116A, 116B . . . 116C.

It is also noted that many network tools monitor and/or analyze data packets that are transmitted over the network. As such, the discussion below primarily focuses on packet-based communications. These packets will typically include a link layer header (L2), a network layer header (L3), a transport layer header (L4) and a payload. Information pertinent to forwarding the packet, such as source ID and destination ID and protocol type, is usually found in the packet headers. These packets may also have various other fields and information within them, such as fields including error check information, virtual local area network (VLAN) addresses, and/or other information that may be matched and used for filtering. Further, information representing the source device may include items such as the IP address of the source device or the MAC (Media Access Control) address of the source device. Similarly, information representing the destination device may be included within the packet such as the IP address of the destination device. It is seen, therefore, that a wide variety of source and destination identifying information may be included within the data packets, as well as other packet related information along with the data included within the payload of the packet. While the tool optimizer described herein is primarily described with respect to packet-based communications and utilizing the information within these packets to forward the packets, the tool optimizer can be configured to operate with respect to other types of communication protocols and is not limited to packet-based networks.

Figure 2A:
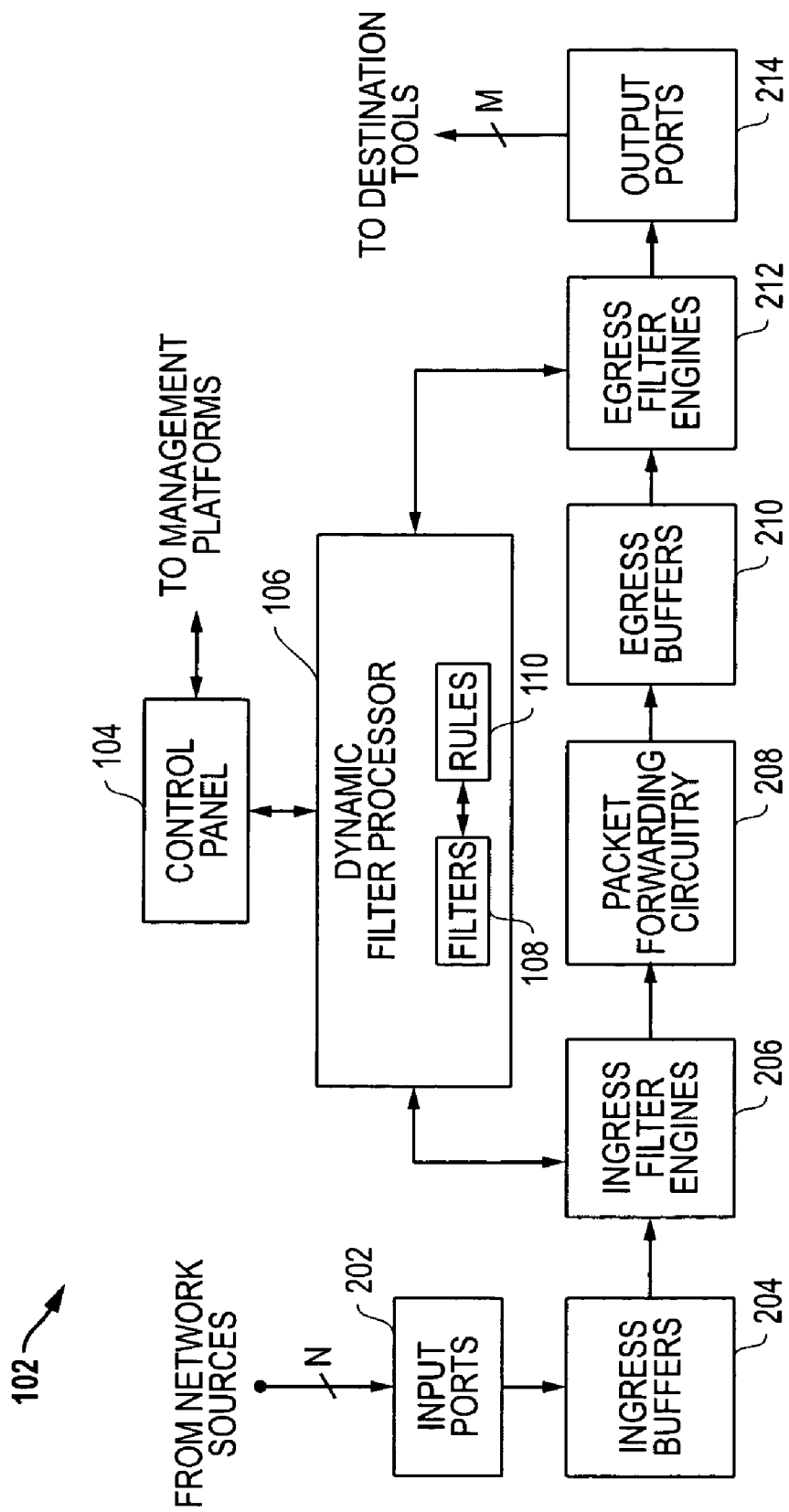
FIG. 2A is a block diagram for a network tool optimizer as described herein.

FIG. 2A is a block diagram for an example embodiment for network tool optimizer 102 as described herein. As described with respect to FIG. 1, the tool optimizer 102 includes a control panel module 104 that provides management access to one or more management platforms. The control panel module 104 in part provides an interface through which users can manage and control the operation of the optimizer 102 and, more particularly, the operation of the dynamic filter processor 106 by selecting and defining filters 108 that are used by the dynamic filter processor 106 to determine how packets are to be forwarded from network sources to destination tools. As described in more detail below, the dynamic filter processor 106 automatically generates and applies filter rules 110 based upon the user-defined filters 108 to filter engines, such as ingress filter engines 206 and egress filter engines 212, that determine how packets are forwarded from source ports to destination ports within the tool optimizer 102. Further, as described in detail below, action superset egress (ASE) processing can be used by the dynamic filter processor 106 to automatically generate rules 110 that will provide superset packet forwarding based upon the filters 108 and various optimization techniques can be utilized as well, if desired. As a user selects overlapping filters for packet forwarding, the complexity greatly increases for the filter rules that must be set up within the filter engines to properly forward the packets. The superset packet forwarding facilitates the handling of these overlapping filters, and by automatically generating the proper rules within filter engines, the user is freed from having to manually set up these filters rules.

As depicted, the tool optimizer 102 includes packet forwarding circuitry 208 that forwards packets between input ports 202 and output ports 214 based upon rules set up in filter engines such as the ingress filter engines 206 and egress filter engines 212. In operation, packets from N network sources are received at the input ports 202. These packets are then stored in ingress queues or buffers 204 prior to being processed by ingress filter engines 206. Based upon ingress filter rules within the ingress filter engines 206, the packet forwarding circuitry 208 forwards packets to the appropriate output ports 214. However, prior to being sent out the output ports 214, the outgoing packets are first stored in egress queues or buffers 210 and then processed by egress filter engines 212. Based upon egress filter rules within the egress filter engines 212, the egress filter engines 212 forward the appropriate data packets to the output ports 214. The output ports 214 are connected to M destination tools, which ultimately receive the data packets. The dynamic filter processor 106 communicates with the ingress filter engines 206 and egress filter engines 212 to apply the filter rules 110 so that these filter engines will provide the packet forwarding desired by the user. Thus, the ingress filter engines 206 and egress filter engines 212 provide a mechanism for the tool optimizer 102 to control how packets are forwarded from the input ports 202 to the output ports 214 according to the filter rules 110 dynamically generated based upon the user-defined filters 108. It is noted that the user can generate and modify the desired packet forwarding through a GUI, as described in more detail below. However, if desired, a command line interface can also be provided to the user for the user to manually create or modify filter rules.

It is noted that the network tool optimizer 102 can be implemented using currently available network packet switch integrated circuits (ICs). These integrated circuits include input port circuitry, ingress buffer circuitry, ingress filter engine circuitry, packet switch fabric circuitry, egress buffer circuitry, egress filter engine circuitry, output port circuitry, internal processors and/or other desired circuitry. Further these integrated circuits can include control and management interfaces through which they can be programmed to provide desired forwarding and control. As such, the dynamic filter processor 106 can program the network packet switch integrated circuit with appropriate filter rules 110. The filter rules 110 that are generated by the dynamic filter processor 106, for example, from the user-defined filters 108, are then applied to the ingress filter engines 206 and the egress filter engines 212 to control the flow of packets through the tool optimizer 102. The tool optimizer 102 can also include other circuitry and components, as desired. For example, tool optimizer 102 can include one or more printed circuit boards (PCBs) upon which the network packet switch IC is mounted, power supply circuitry, signal lines coupled to external connections, and a variety of external connectors, such as Ethernet connectors, fiber optic connectors or other connectors, as desired. It is further noted that the tool optimizer 102 including the dynamic filter processor 106 can be implemented using one or more processors running software code. For example, the network packet switch ICs can be controlled and operated using an internal processor or microcontroller that is programmed to control these integrated circuits to implement desired functionality. It is further noted that software used for the tool optimizer 102 and/or its components, such as dynamic filter processor 106 and the control panel 104, can be implemented as software embodied in a computer-readable medium (e.g., memory storage devices, FLASH memory, DRAM memory, reprogrammable storage devices, hard drives, floppy disks, DVDs, CD-ROMs, etc.) including instructions that cause computer systems and/or processors used by the tool optimizer 102 and/or management platforms 116 to perform the processes, functions and capabilities described herein.

In one embodiment for the tool optimizer 102, a PCB can be configured to include a processor and memory separate from the network packet switch IC. The dynamic filter processor 106 can then be configured to operate on this separate processor, and this separate processor can interface with an application programming interface (API) provided by the network packet switch vendor for the network packet switch IC. This API provides an abstracted programmatic interface with which to configure filter rules into the network packet switch IC to control how packets are forwarded by the packet switch IC.

As described herein, the tool optimizer 102 automatically implements user-defined filters 108 as one or more filtering rules 110 that are applied to filter engines 109 within a packet switch IC. Filtering rules 110 represent the internal device specific representations that are used to implement the user-defined filters 108. For current packet switch ICs, these device specific representations ultimately require programming or provisioning of filter rules into a filter engine's ternary content-addressable memory (TCAM). Filter rules are also referred to herein simply as rules. A filter rule consists of a predicate and action(s). The predicate is one or more traffic-matching criteria that are logically AND-ed together (i.e., TCAM matching criteria such as VLAN ID or Source IP address). Each predicate compares a key to a value. The key is computed by intelligently selecting fields from packets based on protocol and content of the packet. An action can be defined by the filtering rule and applied when a match occurs. For current TCAMs (and packet switch IC filter engines), actions typically include where to forward the packet, whether to drop the packet, tagging the packet with a Class of Service (CoS), whether to count match statistics, and/or other desired action(s) with respect to the packet. As described above, current TCAM processing engines do not allow multiple matches per packet and provide for only a single forwarding action based upon the highest priority match.

For the tool optimizer 102, the user-defined filters 108 and their connections to input and output ports are configured by users through the management or control panel application 104 provided by the tool optimizer. These user-defined filters 108 are then processed by the dynamic filter processor 106 to generate the actual filter rules 110 that are applied to the filter engines 109 (e.g., ingress filters 206 and egress filters 212) to cause the packet forwarding circuitry 208 to forward packets as desired by the user-defined filters 108. Users configure traffic-matching criteria that specify whether packets, such as Ethernet packets, should be allowed to pass from the filter input to the filter output. Filter inputs can be connected to one or more input ports (source ports) and filter outputs can be connected to one or more output ports (instrument or tool ports). While the discussions herein focus on receipt, filtering and transmission of Ethernet packets, it is again noted that other data types and protocols could be used, as desired, including token ring protocols, FDDI protocols, other LAN protocols and/or other technologies for forwarding packets in networked systems. Advantageously, the tool optimizer described herein automatically generates appropriate filter rules for forwarding packets as desired by the user without requiring the user to manually create or manage these filter rules.

In operation, the user-defined filters 108 set forth how the one or more users desire to conditionally direct traffic from the connected source ports to the connected tool ports. Filters can specify a single traffic-matching criteria or they can involve complex Boolean expressions that logically AND and/or OR various traffic-matching criteria to represent the desired filtering behavior. Further, the various criteria in the filter may include ranges and/or non-contiguous lists of values which effectively allow for a second ($2^{nd}$) level of OR-ing within the filters. In addition, other logic, such as NOT operations, and/or more complicated logic expressions such as source/destination pairs (e.g., '(source OR destination)' involving IP address, MAC address, or TCP port) and bidirectional flows (e.g., '((source A AND destination B) OR (source B AND destination A))') could also be represented in user-defined filters, if desired. A filter specifies which fields in a packet must match which values for an action to be taken. Packets that match a filter can have one or more actions applied to them such as to drop the packets (i.e., discard them) or forward them to one or more connected output ports.

A filter's traffic-matching criteria can be configured as desired. For example, matching criteria can be configured to include values in any ISO (International Standards Organization) layer 2 (L2) through layer 7 (L7) header value or packet content. It is noted that packet-based communications are often discussed in terms of seven communication layers under the ISO model: application layer (L7), presentation layer (L6), session layer (L5), transport layer (L4), network layer (L3), data link layer (L2), and physical layer (L1). Examples of traffic-matching filter criteria for ISO packet-based communications include but are not limited to:

Layer 2 (L2): Source/Destination MAC address, VLAN, Ethertype

Layer 3 (L3): Source/Destination IP address, IP Protocol, Diffserv/TOS

Layer 4 (L4): Source/Destination L4 Port, TCP Control flags

It is noted that these L2-L4 criteria are useful because existing hardware designs for packet switch ICs parse these packet headers. However, packet switch devices can be improved by extending filter capabilities to layers 5-7 (L-5-L7), and this additional filtering criteria can be used by the tool optimizer.

FIG. 2B is a diagram of an example embodiment for front external connections for an example network tool optimizer 102. As depicted, the network tool optimizer 102 includes a housing 250 having external connections for a variety of connector types. For example, Ethernet port connectors 252 can be provided (e.g., Ethernet ports 1-24), and fiber optic connectors 254 can be provided for fiber modules. The Ethernet port connectors 252 can be configured to transmit and/or receive 10/100/1000 megabit per second signals, and the fiber optic connectors 254 can be configured to input and/or output 1 or 10 gigabit per second (1G or 10G) signals, if desired. It is further noted that other port connection speeds could also be used, if desired. Further, indicator lights 256 can be provided for connections on the back of the housing 250, such as for 1 or 10 gigabit per second (1G or 10G) connections (e.g., A1, A2, B1, B2). Further, a display screen, such a back-lit LCD screen 257, can also be included for displaying information related to the network tool optimizer 102. Direct navigation controls 258 can also be included, for example, for navigating management menus displayed in screen 257. It is further noted that circuitry for the network tool optimizer 102, including PCBs and power supply circuitry, can be mounted within the housing 250. In this way, the network tool optimizer 102 as depicted is similar in form, appearance and construction to current network switches or routers, for example, those available from a variety of manufactures for connecting computerized systems into a network.

FIG. 2C is a diagram of an example embodiment for back external connections for an example network tool optimizer 102. As depicted, a first set of 10G connections (A1, A2) are provided through a first connection module (XG MODULE A) 272, and a second set of 10G connections (B1, B2) are provided through a second connection module (XG MODULE B) 274. These 10G connections can be configured also to operate at 1G, if desired. It is further noted that other port connection speeds could also be used, if desired. A power connector 280 can be provided into which a power cord can be connected. Further, a management port (MGMT) 278 can also be provided. The management port (MGMT) 278 can be configured as an Ethernet port to allow the network tool optimizer 102 itself to be connected into the network. For example, the management platforms 116A, 116B . . . 116C described with respect to FIG. 1 can communicate with the network tool optimizer through the network using either a network browser or a local instance of a control panel application (e.g., JAVA-based application downloaded to the management platform) if the tool optimizer 102 is connected to the network through the management port (MGMT) 278. As with many standard network switches or routers, it is understood that the network tool optimizer 102 can be configured to be accessed on the network using an IP address assigned to the tool optimizer 102 and entered into a network browser or the control panel application running on one or more of the management platforms 116A, 116B . . . 116C.

Figure 2D:
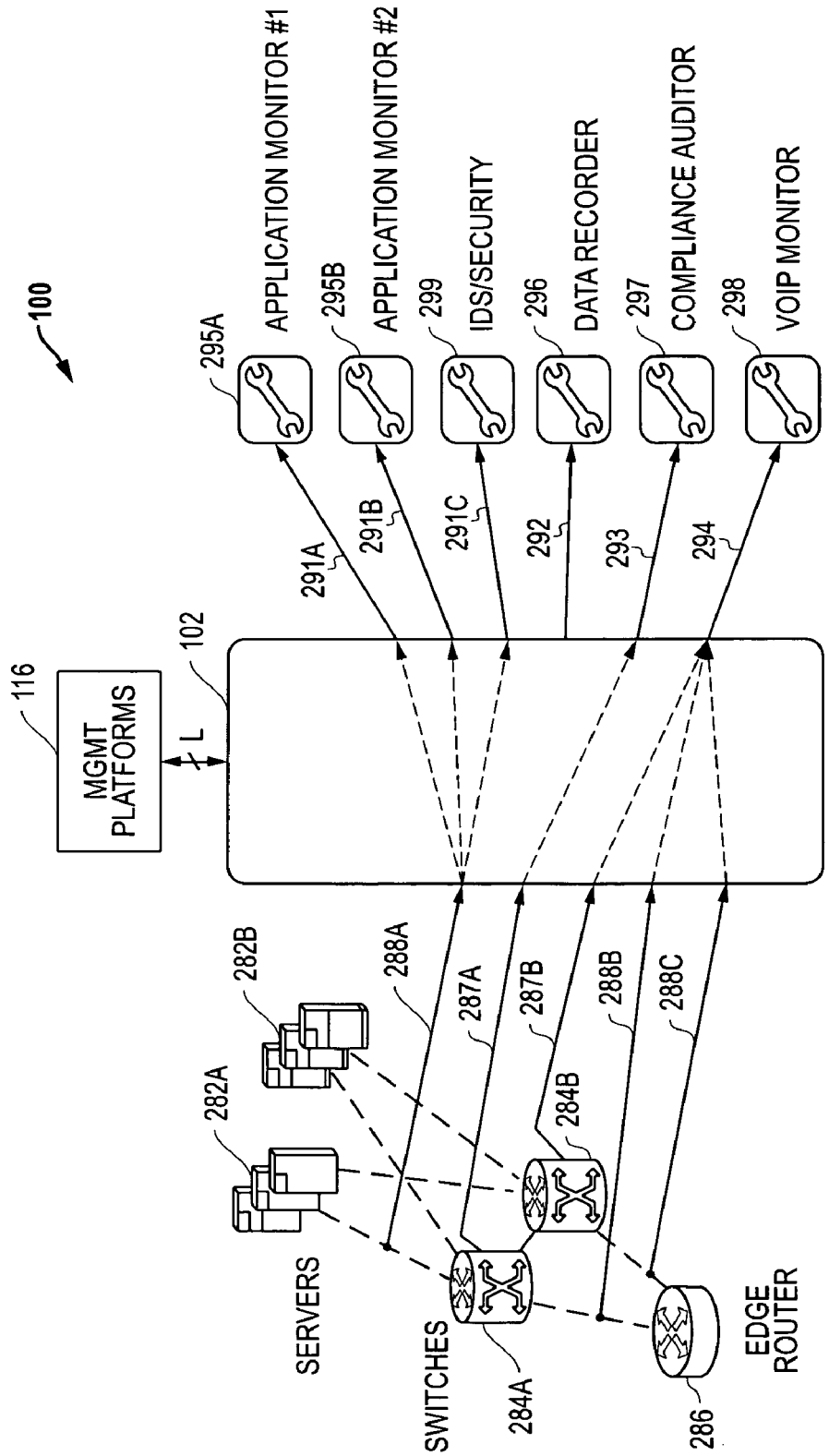
FIG. 2D is a block diagram showing network sources and network destination tools connected through a tool optimizer as described herein.

FIG. 2D is a block diagram of an embodiment for network monitoring system 100 showing network sources and network tools connected through a tool optimizer 102 as described herein. Systems connected to a network in FIG. 2D include servers 282A and 282B, network switches 284A and 284B, and an edge router 286. Network data sources include network traffic TAPs represented by lines 288A, 288B and 288C that pull packets directly from data paths and include switch traffic monitor outputs 287A and 287B, for example, as can be provided from SPAN ports on a network switch. Destination tools include monitors 295A (APPLICATION MONITOR #1) and 295B (APPLICATION MONITOR #2), intrusion detection system (IDS)/security system 299, data recorder 296, compliance auditor systems 297, and voice-over-IP (VOIP) monitor 298. As would be understood; other network-connected systems, network sources and destination tools could also be used in any desired combination based upon the needs of the enterprise at issue.

As described herein, the tool optimizer 102 can provide any desired forwarding of packets from network sources to destination tools based upon filter parameters and paths selected by a user, for example, through one or more management platforms 116 connected to the tool optimizer 102. As depicted in FIG. 2D, for example, the tool optimizer 102 is providing one-to-one pathways, one-to-many pathways, and many-to-one pathways. In particular, packets from the TAP network source 288A are being forwarded by the tool optimizer 102 along paths 291A, 291B and 291C to destination tools 430A, 430B and 430C. Packets from the SPAN port network source 287A is being forwarded by tool optimizer 102 along path 293 to compliance auditor systems 297. And packets from SPAN port network source 287B, TAP network source 288B, and TAP network source 288C are being forwarded along path 294 to VOIP monitor tool 298. Although not depicted, many-to-many pathways could also be used. It is also noted that path 292 to data recorder 296 is currently not being sent any packets.

As described above, when the number of network sources being monitored and/or the number of network tools increase, the complexity of managing the flow of packets for these monitoring activities can increase geometrically. One particular problem with this complexity is the difficulty associated with establishing the filter engine rules for properly controlling how packets are forwarded from one or more network sources to one or more destination tools. Another problem with this complexity is the further difficulty associated with establishing these filter engine rules when users desire to have filters with different overlapping forwarding actions for a given source packet. In operation, the network tool optimizer 102 provides a graphical user interface (GUI) and automatic filter rule generation that helps users, such as IT (information technology) managers for enterprises, to overcome these complexities thereby facilitating the monitoring of network activities.

GUI and Automatic Filter Rule Generation

As described above, the tool optimizer 102 includes a control panel 104 that provides a graphical user interface (GUI) through which the user can manage and control the tool optimizer 102. For example, the control panel 104 can provide access by management platforms 116 to a GUI that allows users to select pathways from network sources to destination tools through filters and that allows users to select filter parameters and relational logic for the filters. It is noted that although a GUI implementation is discussed below for allowing users to define filters, an abstract and high-level command line interface could also be provided to allow users to enter the filters, if desired.

Figure 3A:
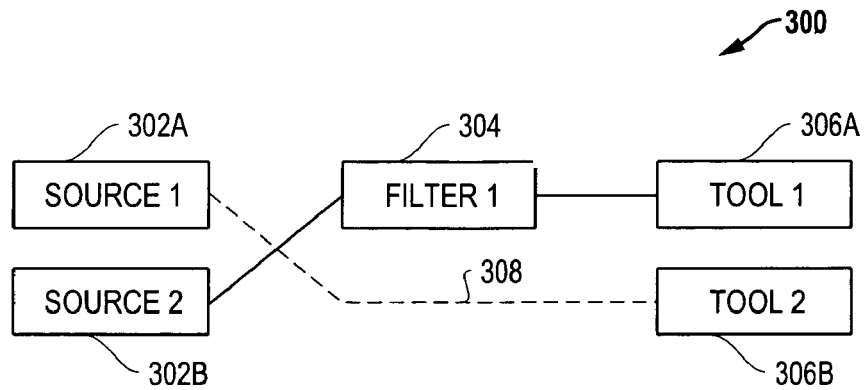
FIG. 3A is a block diagram for a graphical user interface (GUI) in which a user can view, create and manage paths from network source(s) to tool destination(s) through filter(s).

FIG. 3A is a block diagram of an embodiment 300 for a graphical user interface (GUI) in which a user can select a path from a source to a tool destination. As depicted, three columns of representations, such as graphical images and/or text, are displayed to the user. The first column includes representations of network sources. The third column includes representations of destination tools. And the second column includes representations of filters that connect the network sources to the destination tools and that determine what packet matches will be forwarded. In particular, for the embodiment 300 of FIG. 3A, the first column includes network source (SOURCE 1) 302A and network source (SOURCE 2) 302B. The third column includes destination tool (TOOL 1) 306A and destination tool (TOOL 2) 306B. The second column includes a first filter (FILTER 1) 304 previously defined within a path from the second network source (SOURCE 2) 302B to the first destination tool (TOOL 1) 306A. A more detailed embodiment for a path view GUI is provided with respect to FIG. 5 below.

Figure 3B:
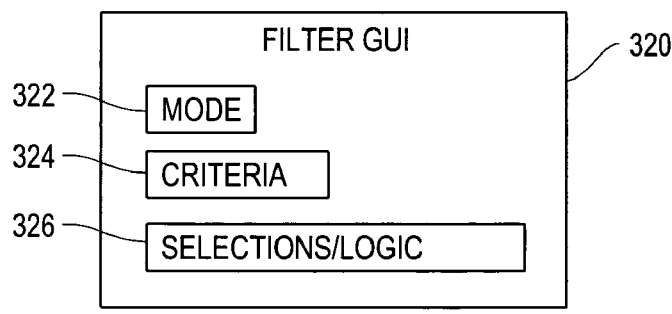
FIG. 3B is a block diagram for a graphical user interface (GUI) associated with filters.

Advantageously, a user can create a new path within the embodiment 300 by selecting a network source and dragging a path line to an existing filter and/or to a destination tool. Similarly, a user can create a new path within the embodiment 300 by selecting a destination tool and dragging a path line to an existing filter and/or to a network source. The dashed line 308 represents a new path that a user has desired to create between the first network source (SOURCE 1) 302A and the second destination tool (TOOL 2) 306B. Once this path has been created, a filter GUI can be displayed to the user to allow the user to select filter criteria that determines what packets are to be forwarded from the selected network source to the selected destination tool. FIG. 3B provides an example block diagram for a filter GUI.

It is further noted that if an existing filter is desired to be used, the user can create a path from a network source and/or a destination tool to the existing filter. For example, in the embodiment 300 of FIG. 3A, if a user desires to forward packets from the first network source (SOURCE 1) 302A using the first filter (FILTER 1) 304, the user can do so by simply creating a path connecting the two. Similarly, if a user desires for packets from the first filter (FILTER 1) 304 to also be provided to the second destination tool (TOOL 2), the user can do so by simply created a path connecting the two. Further, the user can add new network sources, filters and destination tools through a toolbar and/or menus or controls provided in the path view GUI for use by the user. These alternative menus can speed the creation of paths between ports and filters, by allowing users to create multiple paths in a single GUI operation instead of dragging each path line individually.

FIG. 3B is a block diagram of an embodiment for a filter graphical user interface (GUI) 320 associated with the path selected in FIG. 3A. If desired, the filter GUI 320 can be automatically displayed to the user once the user has selected a path between a network source and a destination tool that does not include an existing filter. In addition, the filter GUI 320 can be displayed to a user for an existing filter if the user selects to view or modify an existing filter, such as the first filter (FILTER 1) 304 in FIG. 3A. The filter GUI 320 can include any of a wide variety of filter management and control features, as desired. As depicted in FIG. 3B, filter GUI 320 includes filter mode selection interface 322, a filter criteria selection interface 324 and a filter selection summary and logic interface 326. The filter mode selection interface 322 allows the user to determine what type of filter is to be applied (e.g., pass all, drop all, pass-by-criteria). The criteria selection interface 324 allows the user to determine what criteria is applied by the filter if a pass-by-criteria filter has been selected. And the filter selection summary and logic interface 326 provides a summary for the filter parameters selected by the user and allows the user to define logic relationships between these filter parameters. Other features and display areas can also be provided as desired. By making selections within the filter GUI 320, the user is able to define what packets from connected network sources are desired to be forwarded by this filter to connected destination tools. It is noted that one or more network sources and destination tools can be connected to the same filter. A more detailed example embodiment for a filter GUI 320 will be further described with respect to FIG. 5B below.

Figure 4:
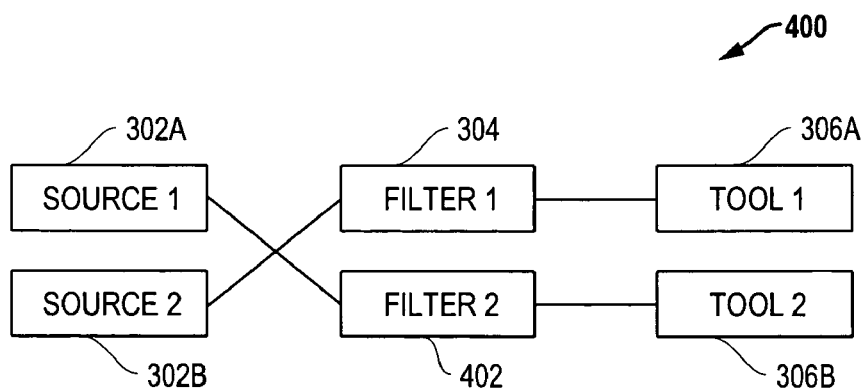
FIG. 4 is a block diagram for a graphical user interface (GUI) after a filter has been created within the forwarding path selected in FIG. 3A

FIG. 4 is a block diagram of an embodiment 400 for a graphical user interface (GUI) after a second filter (FILTER 2) 402 has been created within the path 308 selected in FIG. 3A. As described with respect to FIG. 3B, the second filter (FILTER 2) 402 can be created using the filter GUI 320, which can automatically be displayed to a user after the user has created the desired path 308 shown in FIG. 3A. Once created using the filter GUI 320, the second filter (FILTER 2) 402 is then depicted within the embodiment 350 as a new filter with an input from the first source (SOURCE 1) 302A and an output to the second tool (TOOL 2) 306B. This input and output corresponds to the path 308 selected in FIG. 3A. It is again noted that a new filter can also be created using a toolbar and/or menus provided within the path GUI for use by the user.

Advantageously, once a filter has been created and/or modified by the user through the GUI, the tool optimizer 102 automatically generates the appropriate filter rules 108 for the filter engines 109 (e.g. ingress filter engines 206 and egress filter engines 212) and the packet forwarding circuitry 208 within the tool optimizer 102 to forward packets according to the user selections. Thus, the user can create new paths and associated filters, as well as manage those paths and filters once created, through a graphical user interface (GUI) without having to generate the underlying filter rules, thereby greatly simplifying the management of the packet forwarding desired for a network monitoring system. Significantly, the network tool optimizer 102, as described herein, does not require the user to manually enter command line statements to implement the filters or forwarding paths desired by the user. Rather, the dynamic filter processor 106 automatically generates the needed filter rules based upon the user's selections made through the GUI. Further, as described in more detail below, with respect to overlapping user-defined filters where complexities expand geometrically, the dynamic filter processor 106 can utilize superset packet forwarding to automatically generate filter rules to properly handle the overlapping filters. In short, the GUI represents an abstract view of complex filter parameters that are then reduced by the dynamic filter processor to specific rules for the hardware elements.

Figure 5A:
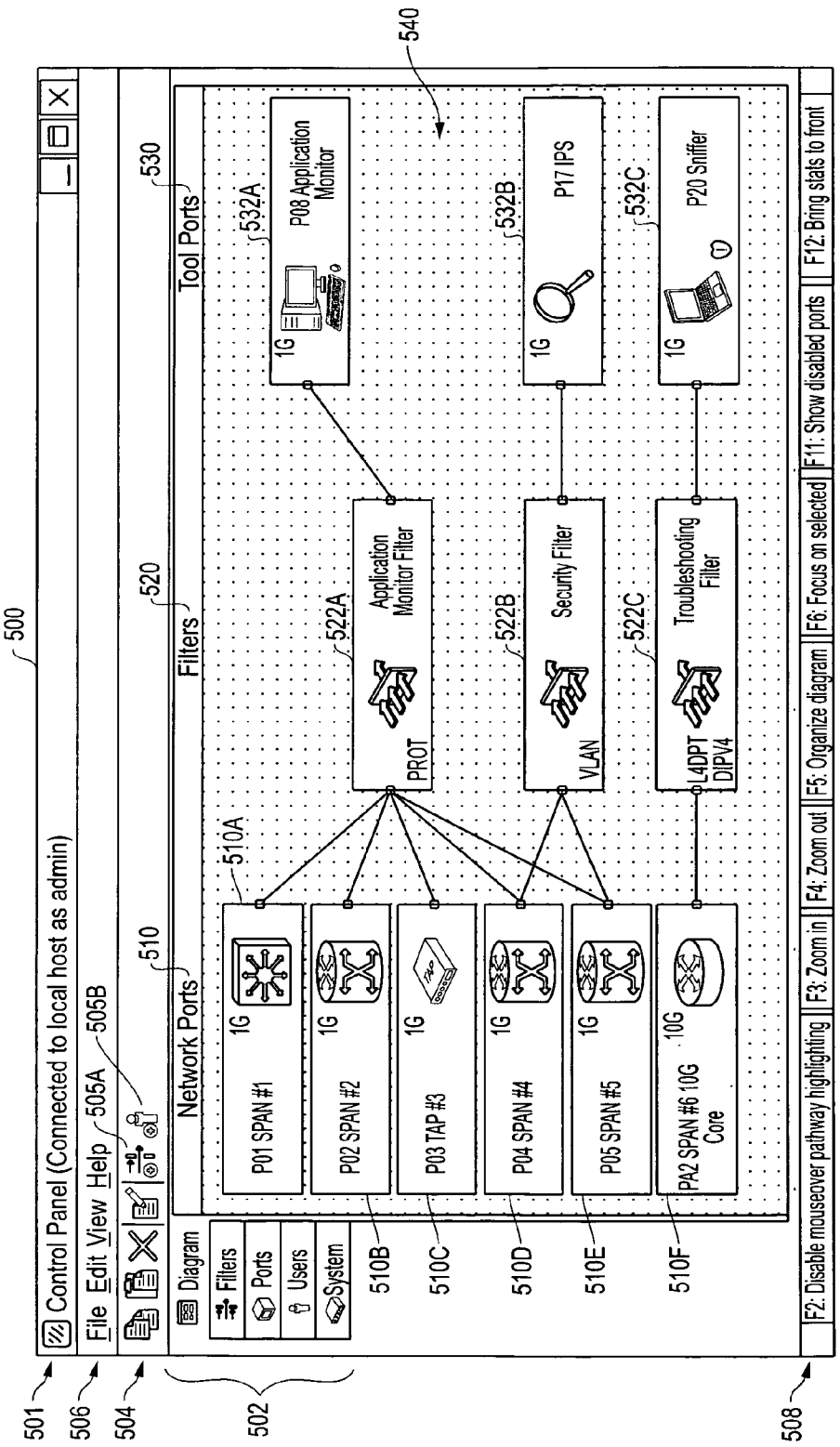
FIG. 5A is a diagram for a graphical user interface (GUI) representing a path view GUI for the tool optimizer including network ports, filters and tool ports.

FIG. 5A is a diagram of an embodiment for a graphical user interface (GUI) representing the tool optimizer including network ports, filters and tool ports. An example embodiment for this GUI is provided with respect to window 500 in FIG. 5A. Advantageously, this GUI provides a pathway diagram area 540 within which a user can create, modify and view forwarding paths among network sources, filters and destination tools. In FIG. 5A, the network sources are identified as network ports 510 and are set forth in a column on the left side of the diagram area 540. The destination tools are identified as tool ports 530 and are set forth in a column on the right side of the diagram area 540. And the filters 520 are set forth in a column in the middle of the diagram area 540. The network sources and destination tools are identified as ports because the tool optimizer is connected to these network sources and destination tools through its ports.

The toolbar 502 provides one-click selection functions that can be used to display various system-wide views. For example, a diagram view can be selected using the first command button (DIAGRAM) which displays the pathway diagram area 540. A filter view can be selected using the second command button (FILTERS). A ports view can be selected using the third command button (PORTS). A users view can be selected using the fourth command button (USERS). And a system view can be selected using the fifth command button (SYSTEM). Other diagram toolbar options and commands can also be provided, as desired. In FIG. 5A, it is noted that the diagram view has been selected so that the pathway diagram area is being displayed within window 500.

As depicted, diagram area 540 includes six network ports, three filters and three tool ports. Each port and filter supports a freeform text name field along with a freeform description field. The name field is displayed in the diagram area next to the port/filter icon. For instance, P01's name has been configured to be Span #1. The description will display in a tooltip when the cursor is hovered above the icon. Ports will also display a system defined ID in addition to the configurable name field, such as P01-P24 to identify 24 front panel ports, PA1-PA2 for XG Module A ports, and PB1-PB2 for XG Module B ports. It is also noted that custom port icons may be configured for each port using either built-in images or user supplied images, providing a more meaningful network representation.

As depicted, tool port 532A represents port eight (P08) of the tool optimizer that is connected to an application monitor tool operating a 1G. Tool port 532A is receiving packets that match filter 522A's criteria, which has been named "Application Monitor Filter," and is provisioned to forward all packets matching one or more configured IP PROTOCOL (PROT) criteria as indicated by the badge located next to the filter icon. More details can be obtained by opening the filter GUI (example shown in FIG. 5B) or by hovering the cursor over the filter icon to view a tooltip. Filter 522A is in turn receiving packets from five different network ports: port one (P01) connected to a SPAN port (SPAN #1) operating at 1G, port two (P02) connected to a SPAN port (SPAN #2) operating at 1G, port three (P03) connected to a network tap (TAP #3) operating at 1G, port four (P04) connected to a SPAN port (SPAN #4) operating at 1G, and port five (P05) connected to a SPAN port (SPAN #5) operating at 1G. Tool port 532B represents port seventeen (P17) of the tool optimizer that is connected to an intrusion protection systems (IPS) operating a 1G.

Tool port 532B is receiving packets that match filter 522B's criteria, which has been named "Security Filter," and is provisioned to forward packets matching the configured virtual LAN (VLAN) criteria as indicated by the badge located next to the filter icon. Filter 522B is in turn receiving packets from two different network ports: port four (P04) connected to a SPAN port (SPAN #4) operating at 1G, and port five (P05) connected to a SPAN port (SPAN #5) operating at 1G. Tool port 532C represents port twenty (P20) of the tool optimizer that is connected to a sniffer tool operating a 1G.

Tool port 532C is receiving packets that match filter 522C's criteria, which has been named "Troubleshooting Filter," and is provisioned to forward all packets matching the configured Layer 4 Destination Port criteria (L4DPT) and/or the configured Destination IPv4 address criteria (DIPV4). Filter 522C is in turn receiving packets from XG Module A port2 (PA2) that is passing packets from a core SPAN port (SPAN #6 10G CORE) operating at 10G.

It is noted that the diagram elements within diagram area 540 provide designations or badges that help the user know details about the elements with the diagram. For example, designations for the port to which the network source and/or destination tool are connected is included with the boxes that represent these connections (e.g., P01, P02, P03, P04, P05, PA2, P08, P17, P20, and PA2). Designations for the speed at which the network source and/or destination tool is operating are also provided (e.g., 1G, 10G). In addition, for the filters, designations are provided that indicate what filter parameters have been selected for that filter (e.g., PROT, VLAN, L4DPT, DIPV4). Further, error state or alert indicators can also be provided such as the exclamation-point-in-a-shield symbol located within the box representing the sniffer tool 532C. This symbol represents that packets have dropped on this tool port. Other symbols and designations could also be used, as desired. For example, a badge could also be added to indicate how multiple filter parameters are related (e.g., filter 522C could include a badge indicating whether the two parameters L4DPT and DIPV4 are ANDed or ORed together).

The window 500 also includes a number of toolbars, icons, buttons and commands. For example, typical window items seen in graphical windowing environments (e.g., MICROSOFT or APPLE windowing operating system environments), such as a title bar 501, a menu bar 506, and a toolbar 504. The title bar includes the name of the window (Control Panel), an indication of who is connected (Connected to localhost as admin), and minimize/maximum/close icons at the far right. The menu bar 506 includes selectable menus such as File, Edit, View and Help. As would be understood, selection of these menu items would lead to other selectable options within the window. The toolbar 504 includes common command buttons for Cut, Paste and Delete. The fourth command button from the left is the edit properties tool, which opens a GUI to allow viewing or editing the selected port or filter. Command button 505A represents a tool that allows a user to add filters within the pathway diagram area 540. The command button 505B represents a tool that allows a user to add users. Other commands and functions, as well as additional toolbars, can also be provided, as desired.

In the window 500 of FIG. 5A, short-cut function key items are also set forth at the bottom the window in portion 508. As depicted, function key 2 (F2) operates to disable mouse-over pathway highlighting. Function key 3 (F3) operates to zoom in. Function key 4 (F4) operates to zoom out. Function key 5 (F5) operates to organize the diagram. Function key 6 (F6) operates to focus on selected item(s) and their paths. Function key 11 (F11) operates to show disabled ports. And function key 12 (F12) operates to bring statistics to the front of the GUI. Other functions can also be provided through function keys on a keyboard, as desired.

It is noted that further details can also provided through the GUI, if desired. For example, port configuration (e.g., port speed, connector type, etc.) and filter configuration information (e.g., filter mode, filter criteria, etc.) can also be selected and displayed in window 500. Operational state information can also be displayed, such as whether each port's link is up/down, negotiated ports speed, whether packets have been dropped, thresholds exceeded, and/or other operational state related information. Port configurations can also be viewed and modified. For example, a port itself can be configured to provide pre-ingress or egress filtering using a view of the port configurations. Further, port connections can be displayed and/or modified within this view of the port configuration. Port statistics and filter statistics can also be selected and viewed, if desired. In addition, if a user right-clicks a mouse while pointing to a representation within path view 500, context sensitive selection menus can be provided to allow various operations by the user, including modifying configurations or mode, viewing or modifying connections, displaying additional information, or any other desired context sensitive action.

The view 500 can also have the further ability to allow a user to focus on a desired aspect of the forwarding paths. For example, a user can choose to focus on a particular filter, network source and/or destination tool. Once making this focus selection, the view is changed so that items not associated with the selected items are not displayed. For example, if a user selects to focus on a particular filter, only network sources and destination tools connected to the filter are then displayed to the user in the window 500. Other focus selections may also be provided, for example, a user can be shown only paths that are they are able to modify based upon their security level in the enterprise. This capability to focus the view can greatly simplify the information being viewed so that a user can more easily see the information the user is primarily interested in at the time.

In addition to the view focus, other view simplifying operations can also be provided. For example, an auto-organize feature can be provided that allows a user to select criteria upon which the path view is organized. For instance, the view can be re-organized to minimize the number of crossed connections in the view or can be organized alphabetically according to the physical port number or logical part name. Other desired organizational parameters may also be provided and selected so that the view is automatically re-organized based upon these user selections to present the view in manner desired by the user.

As described above, the tool optimizer 102 can be accessed by multiple users at the same time through management platforms 116. As such, it is possible that multiple users will be viewing or modifying the same forwarding path information at the same time. When two or more users are logged in and accessing a path view at the same time, the tool optimizer 102 operates to make each user aware of activities of the other that could affect the view. For example, the tool optimizer 102 can be configured to keep users from changing the same objects at the same time. Alternatively, if it is desired to allow simultaneous modifications by multiple users, a user can be notified or warned when another user changes an object that a user is currently accessing. Further, changes made by one user can be automatically broadcast to other users so that their views of the system can be accurate and up to date. Other features to handle multi-user access may also be added if desired. By providing these multi-user control features, a visual, multi-user, drag-and-drop GUI can be provided in which simultaneous users can create and modify pathways that connect source ports to destination ports and define filters for these pathways without interfering with each other.

Figure 5B:
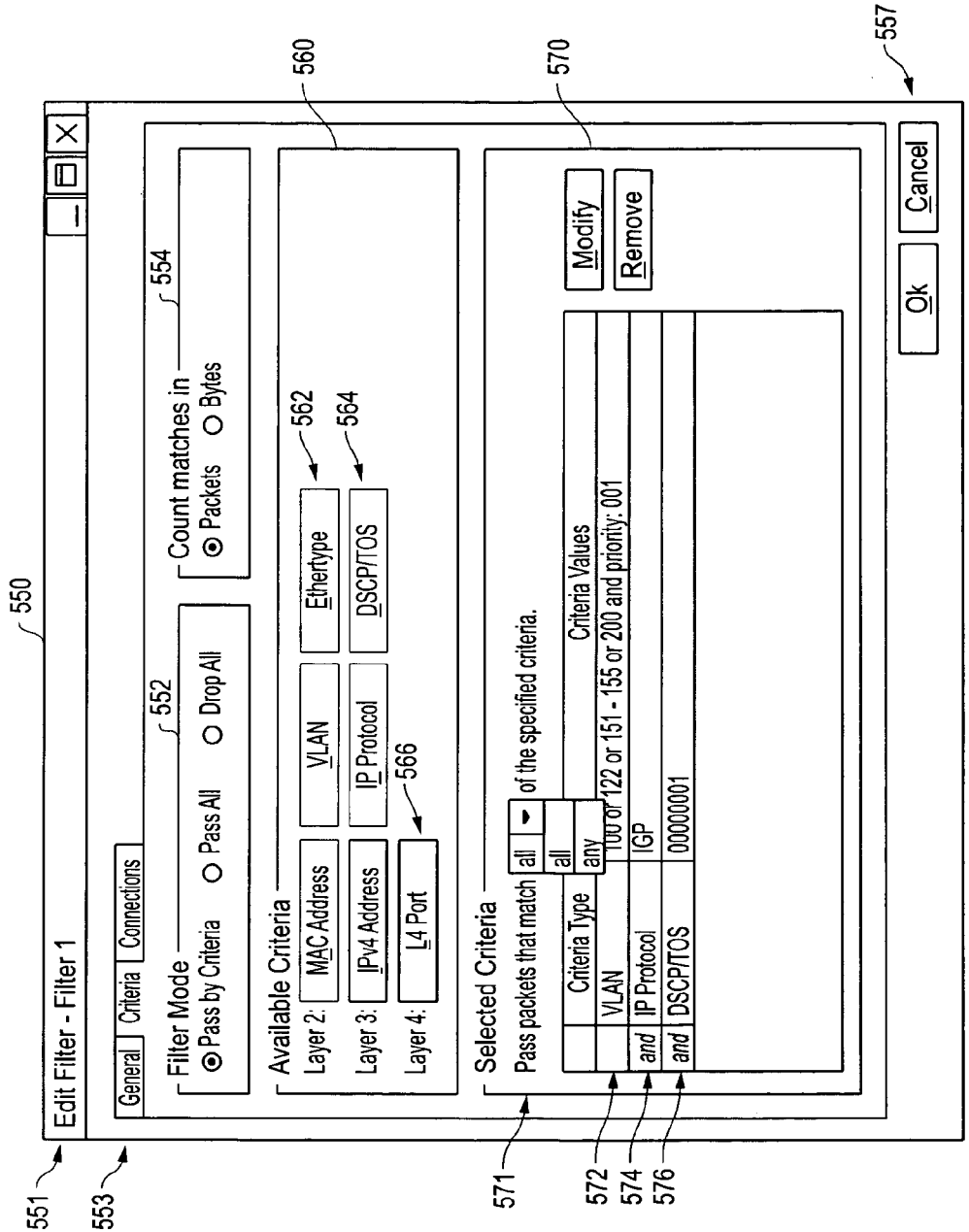
FIG. 5B is a diagram for a graphical user interface (GUI) including a filter GUI for creating and/or modifying a filter.

FIG. 5B is a diagram of an example window 550 for a graphical user interface (GUI) for creating and modifying a filter using the tool optimizer 102. As described above, this filter GUI can be automatically presented to the user when a new path is created between a network source and a destination tool, and this filter GUI can also be presented if a user selects to create, modify or view a filter. This selection to view the filter GUI can be made, for example, by double-clicking a filter within the diagram area 540 or by other user-initiated selection mechanisms, such as through pop-up menus.

The filter GUI can provide any desired information concerning the filter. For example, window 550 in FIG. 5B can include a number of toolbars, icons, buttons and commands that relate to the filter. For example, window 550 includes a title bar 551, selectable tabs 553, and window control buttons 557. The title bar 551 can provide the name of the window (Edit Filter) and identify which filter is being edited (Filter 1). The selectable tabs 603 include a tab (GENERAL) for displaying/modifying general information about the filter, a tab (CRITERIA) for displaying/modifying filter criteria, and a tab (CONNECTIONS) for displaying/modifying the network ports and tool ports connected to the filter. Other tabs and information could be provided as desired.

Advantageously, as described herein, the criteria tab (CRITERIA) depicted in FIG. 5B allows for a user to select filter criteria at a high level without requiring the user to program the appropriate underlying filter rules to forward packets according to the selected criteria. As depicted in the embodiment of FIG. 5B, the criteria tab includes an area 552 where a filter mode is selected, an area 554 where a count type is selected, an area 560 where filter criteria are selected, and an area 570 where a summary of selected criteria and logic relationships are displayed. Other or different areas could also be provided if desired.

The filter mode area 552 allows for a user to select a mode for the filter, such as whether the filter will pass-by-criteria, pass-all or drop-all. If pass-all is selected, then all the packets received by the filter from the network ports will be passed along to the tool ports. If drop-all is selected, none of the packets received by the filter from the network ports will be passed along to the tool ports. If pass-by-criteria is selected, then the filter criteria area 560 will become active and allow the user to select the filter criteria to be applied by the filter in forwarding packets.

The count type area 554 allows the user to select how statistics are gathered with respect to this filter. If "packets" is selected, then the filter counts matches to the filter criteria in terms of packets that match the filter criteria. If "bytes" is selected, then the filter counts matches to the filter criteria in terms of bytes that match the filter criteria. If desired, the tool optimizer can also be configured to simultaneously count bytes and packets. If this latter configuration is used, then there is no need for the user to select whether bytes or packets are counted, as they would both be counted simultaneously by the tool optimizer. Alternatively, a further selection can be provided to the user to allow the user to select counting matches in both bytes and packets.

The criteria area 560 allows the user to select filter criteria from among available filter criteria. For example, as depicted, the filter criteria includes layer 2 (L2) criteria 562, layer 3 (L3) criteria 564, and layer 4 (L4) criteria 566. The L2 criteria 562 can include items such as the source and/or destination MAC address, the VLAN address and/or the Ethertype of the transmitting network source attached to a network port connected to the filter. The L3 criteria 564 can include items such as the source and/or destination IP address (e.g., using Internet Protocol version 4-IPv4, or Internet Protocol version 6-IPv6), the IP protocol and/or DSCP/TOS (differentiated services code point/type of service) field information for the transmitting network source attached to a network port connected to the filter. And the L4 criteria 566 can include items such as the source and/or destination layer four port address (L4 PORT) and/or TCP control flags for the transmitting network source attached to a network port connected to the filter. Depending upon the network source and other selected criteria, one or more of the available criteria within area 560 may be grayed out to represent that they are not currently selectable.

The selected criteria and logic area 570 provides a summary of the criteria selected to the user and allows the user to relate these selected criteria using Boolean logic expressions. In particular, each selected criteria can be listed and can be separately selectable within the area 570. For example, line 572 as depicted provides a summary of a VLAN criteria selection, which is to pass VLAN addresses 100 or 122 or 151-155 or 200 having a priority level of 001. Line 574 represents an IP Protocol criteria selection, which is to pass packets using IGP (internet gateway protocol). And line 576 represents a DSCP/TOS selection criteria, which is to pass packets having a service type of 00000001. Once selected, these criteria can be modified or removed by selecting the MODIFY or REMOVE buttons at the right side of selected criteria area 570. It is further noted that other techniques for displaying this criteria could also be used as desired.

Advantageously, the area 570 also provides the user a mechanism to define Boolean logic expressions that determine how the selected criteria are treated together by the filter. For example, match "All" or "Any" selection line 571 allows for a selection by the user to determine whether the filter will pass packets that match all or any of the specified criteria. This logic essentially allows the user to select whether the criteria are AND-ed together or OR-ed together to determine what packets are passed along to the destination tool. When criteria values are configured with ranges or disjoint lists of values, these values are OR-ed together, as shown with respect to line 572. Thus, in addition to allowing Boolean expressions to relate different criteria types, Boolean expressions are also allowed to relate criteria values selected for a given criteria type. More complex Boolean logic relating the selected criteria could also be provided if desired.

Significantly, once this criteria is created or modified, the dynamic filter processor 106 within the tool optimizer 102 operates to automatically create and/or modify the filter rules 108 so that the filter engines 109 within the tool optimizer 102 will properly forward packets from the network sources to the destination tools based upon the selected criteria. This automatic rule generation and modification greatly improves on prior solutions that would require a user to enter appropriate commands in a command line interface (CLI) to create and/or modify filter rules to appropriately forward packets.

FIGS. 6A-B and FIG. 6C (Prior Art) provide a comparison between the GUI-based user-definition of filters, filter parameters and relating Boolean logic, as described herein, as compared to complicated command line interface (CLD instructions that would be required in a typical prior system. In particular, FIG. 6A is a diagram for a graphical representation for an example user-defined filter. FIG. 6B is diagram for example filter parameter selections and related Boolean logic for the example user-defined filter associated with FIG. 6A. And FIG. 6C (Prior Art) is a diagram for the complicated command line interface (CLI) instructions that would likely be needed in prior solutions to implement a similar user-defined filter as set forth in FIGS. 6A and 6B.

Looking first to FIG. 6A, graphical representation 600 represents a user-defined filter. Within this graphical representation 600, filter parameter information 602, filter icon 604 and filter name 606 are provided. As depicted, this filter parameter information 602 includes designations or badges representing various criteria selections for the filter. The "ALL" designation represents that the filter has been configured to only pass packets matching all the selected criteria. The "IP4SA" designation represents that the filter has been configured to pass packets from sources matching IP4 source address criteria. The "IP4DA" designation represents that the filter has been configured to send packets to destinations matching IP4 destination address criteria. And the "L4DPT" designation represents that the filter has been configured to pass packets having port destinations matching L4 destination port criteria. The icon 604 is an icon indicating that the object is a filter. And the name 606 is "Filter Example."

FIG. 6B provides a selected criteria area 670 for the filter represented in FIG. 6A. As shown, the filter has been configured to only pass packets matching "all" the selected criteria as set forth in line 671. The filter has also been configured with three criteria types as set forth in column 684. These criteria types are IPv4 source address in line 674, IPv4 destination address in line 674, and L4 destination port criteria in line 676. The column 682 provides an indication of how these criteria types have been related logically. In particular, because the match "all" selection has been made in line 671, these criteria types are AND-ed together. The filter criteria types also have criteria values as set forth in column 686. As depicted, the first source address criteria in line 672 is set forth as IP addresses 192.168.40.0/24 or 192.168.50.0/24 or 192.168.60.0/24 or 192.168.70.0/24. The second destination address criteria in line 674 is set forth as EP addresses 192.168.40.0/24 or 192.168.50.0/24 or 192.168.60.0/24 or 192.168.70.0/24. And the third port criteria in line 676 is set forth as HTTP port 80 or HTTPS port 443. It is noted that within each of these criteria values the values are related by Boolean logic. In these examples, each value is OR-ed with respect to each other. It is noted that more complex Boolean expressions could also be utilized, if desired (e.g., combinations of ANDs, ORs, or other logic expressions).

Advantageously, as described above, the network tool optimizer 102 automatically generates the filter rules needed for the filter engines to carry out the filter selections made by the user. In particular, the tool optimizer 102 analyzes the filter criteria and criteria values along with the Boolean expressions that relate these together and then generates the filters rules to implement this higher level expression of the desired filter. In this way, the tool optimizer 102 allows the user to define filters at a high level using Boolean logic expressions and does not require the user to manually write more complicated filter rules or single line commands to represent the desired filter operation.

FIG. 6C (Prior Art) provides an example of complicated command line interface (CLI) instruction listing 680 that might be needed in prior solutions to implement a similar user-define filter as set forth in FIGS. 6A and 6B. As shown, each line in the CLI listing 680 represents a desired match for forwarding a packet. For the selected filter criteria in FIG. 6B, there are 4 possible source addresses, 4 possible destination addresses and two possible destination port addresses. As such, these create 32 different possible combinations (i.e., 4×4×2) that are each represented by a CLI instruction. As can be readily seen, if a user is required to manually generate criteria selections using command line instructions for desired matches, the complexity to the user is quite significant, and the possibility for user error increases. By allowing users to define filters using selectable filter parameters related by Boolean expressions and by automatically generating the filter rules from these higher level expressions, the tool optimizer 102 described herein provides a significant improvement over prior solutions.

It is noted that the examples in FIGS. 6A-B represent relatively simple desired filters. There is only one filter that has been configured to have source, destination and port match criteria. When users desire to have many filters and/or filters that include overlapping forwarding actions, the complexity of handling these filters increases significantly.

Overlapping Filters and Multi-Action Packet Forwarding

Two filters are said to overlap if it is possible for a packet to match both filters. In other words, two filters overlap if they are not mutually exclusive. Take for example two filters A and B. Because the filters are independent, whether or not a given packet matches filter A is independent of whether or not it matches filter B. There are four separate match cases for a given packet P:

(1) P matches neither filter A nor filter B;
(2) P matches only filter A (but not filter B);
(3) P matches only filter B (but not filter A); or
(4) P matches both filter A and filter B.

If the fourth case above is possible, then the filters are said to overlap. If the fourth case is not possible, then the filters are non-overlapping.

FIG. 7A is a block diagram for an embodiment 700 showing overlapping filters for forwarding network packets from a source 702. For the embodiment 700 depicted, a user desires to forward different packets from source 702 to three different tools 704, 706 and 708. In particular, packets having VLAN 1-3 addresses are to be forwarded by filter 710 to the first tool (TOOL 1) 704. Packets having VLAN 3-6 addresses are to be forwarded by filter 712 to the second tool (TOOL 2) 706. And packets using TCP (transmission control protocol) are to be forwarded by filter 714 to the third tool (TOOL 3) 708.

FIG. 7B is a Venn diagram 720 showing the potential overlaps for the three filters set forth in FIG. 7A. The first filter 710, which forwards VLAN 1-3, overlaps with the second filter 712, which forwards VLAN 3-6, because VLAN 3 addresses are to go to both the first and second tools 704 and 706. Also, the third filter 714, which forwards packets using TCP, overlaps with both the first filter 710 and the second filter 712 because any packets having VLAN 1-6 addresses could also be using TCP. As shown in the Venn diagram 720, therefore, filters 710, 712 and 714 overlap with each other and have different forwarding actions for their respective matched packets.

These overlaps are often difficult for a user to handle accurately. This difficulty is in part due to the type of filter memories used in current packet switch integrated circuits (ICs). As described above, the prevalent form of filter memory used in packet switch ICs is ternary content-addressable memory (TCAM). TCAMs operate at high speed and perform lookups in constant time, but are much more complex than ordinary static or dynamic memories. Consequently, TCAMs are usually small, having only hundreds or thousands of entries as opposed to the millions of entries in standard static or dynamic memories. Larger TCAM structures can be formed by placing multiple smaller TCAMs in parallel. The space limitation in TCAMs makes it important to use the entries in a TCAM efficiently. TCAMs are also priority ordered memories in packet switch ICs. As such, only one TCAM entry will determine how a packet is forwarded. The highest priority matching entry in the TCAM "wins" if there is more than one match for a packet. Further, existing TCAMs provide for logical AND-ing of match criteria for a single entry in the TCAM. The highest priority matching entry can apply one or more actions to the packet such as dropping the packet (DROP), passing the packet to output ports (PASS), assigning a priority to the packet, and/or other desired actions.

Many of the commercially available packet switch ICs are ASICs (application specific integrated circuits) or FPGA (field programmable gate array) devices, and many of these devices support multiple parallel TCAMs at various stages of the data pipeline (e.g., at ingress, egress, etc). Each TCAM operates independently, with its own search mechanism (e.g., key lookup) that identifies matches, creates actions, and updates counters. When multiple parallel TCAM engines are supported, each engine has a priority associated with it relative to the other engines. If more than one TCAM matches on the same packet, actions are prioritized and an effort is made to take all possible actions. If a conflict occurs, the action from the higher priority TCAM is taken. Different forwarding actions for the same packet always conflict, so the end result is that the TCAM engines allow for only a single-forwarding-action per packet. Counter updates are an example of actions that do not conflict. As such, in some commercial packet switch devices a single packet will cause counters to increment on multiple parallel TCAM entries.

As TCAMs are operated, keys are matched against classification rules stored in entries of a TCAM's classification database. With ingress TCAMs, the ingress port is typically included as part of the key. With egress TCAMs, the ingress and egress ports are typically included as part of the key. As stated above, packet switch devices typically include ISO layer 2 (L2) through layer 4 (L4) header fields or content as part of the key. A TCAM allows data search words (entries) comprised of ternary digits, each of which can assume the values 0, 1 and "don't care (x)." Ternary digits can be decomposed into two binary bits: one for value, and one for mask. TCAM rule entry R can be represented as {V,M} where V is the value and M is the mask. A mask bit of "1" means that the corresponding value bit matters for comparison purposes, and a mask bit of "0" means that the corresponding value bit is a "don't care" for comparison purposes. Packet P matches rule R if each of P's K key fields matches the corresponding field of R. If a rule's digits are all "don't care" then it matches all packets. TCAMs take a W-bit key and perform a lookup for the first matching entry.

The TCAM's priority ordered memory is well suited for matching packets when there are no overlapping filters, because in that case only one forwarding action should be taken. However, the TCAM's single-forwarding-action per packet behavior does not handle filter overlaps well, because filter overlaps require multiple forwarding actions per packet. In particular, filter rules for overlapping filters, such as those described with respect to FIGS. 7A and 7B, will have different forwarding actions for matched packets. Because filter engines within packet switch ICs use priority ordered TCAMs, the highest priority filter rule encountered that matches a packet will determine how that packet is forwarded. As such, different forwarding actions will mean that certain packets will not be forwarded as desired depending upon the priority of the filter rules.

FIG. 7C (Prior Art) is a block diagram showing an embodiment 750 that illustrates this difficulty in utilizing standard TCAMs to implement the overlapping filters discussed with respect to FIGS. 7A and 7B. As depicted, a standard filter engine 752 is provided in which arrow 753 represents the filter priority order from high (HI) to low (LOW) priority. As such, the rule for filter 710 is processed first and forwards packets with VLAN 1-3 addresses along path 760 to the first tool (TOOL 1) 704. The rule for filter 712 is processed second and attempts to forward packets with VLAN 3-6 addresses along path 762 to the second tool (TOOL 2) 706. However, because VLAN 3 packets have already been forwarded by the rule for filter 710, the packets forwarded along path 762 only include VLAN 4-6 packets, and no VLAN 3 packets will be forwarded to the second tool (TOOL 2) 706. The rule for filter 714 is processed last and attempts to forward packets using TCP along path 764 to the third tool (TOOL 3) 708. However, because VLAN 1-6 packets have already been forwarded by the rules for filter 710 and filter 712 to the first and second tools 704 and 706, the packets forwarded along path 764 will not include any VLAN 1-6 packets.

With respect to FIG. 5A discussed above, it is noted that filters 522A and 522B are potentially overlapping filters because they potentially provide different forwarding actions for packets from the same network source. As depicted, filter 522A and filter 522B both receive packets from sources 510D and 510E, and they desire to send matching packets to different destinations. In particular, filter 522A desires to send packets from sources 510D and 510E that match its filter parameters to destination port 532A, and filter 522B desires to send packets from sources 510D and 510E that match its filter parameters to destination port 532B. Filters 522A and 522B, therefore, represent potentially overlapping filters because a packet from source 510D or source 510E that match both filter 522A and 522B would need to be forwarded to destination ports 532A and 532B to satisfy filters 522A and 522B.

In addition to this problem with the processing overlapping filters and different forwarding actions, the complexity of handling filter overlaps increases rapidly as the number of fields and criteria values increase. In particular, as the number of traffic-matching criteria fields and the number of values specified in each criteria gets larger, the number of filter overlaps explodes rapidly per the following formula.

$$O(C, N) = \sum_{i=2}^{C} N^i \frac{C!}{i!(C-i)!}$$

In this formula, O(C,N) predicts the maximum possible number of overlaps for a set of C*N filters, where there are C criteria fields (i.e., VLAN, IP destination, destination port), and there are N disjoint values for each criteria. The following represent examples for values of C and N in this formula:

O(2, 1) = 1
O(2, 2) = 4
O(2, 3) = 9
O(2, 4) = 16
O(2, 5) = 25
O(2, 6) = 36
O(2, 7) = 49
O(2, 8) = 64
O(2, 9) = 81
O(2, 10) = 100
O(2, 11) = 121
O(2, 12) = 144
O(2, 13) = 169
O(2, 14) = 196
O(2, 15) = 225
O(2, 16) = 256
O(2, 17) = 289
O(2, 18) = 324
O(2, 19) = 361
O(3, 1) = 4
O(3, 2) = 20
O(3, 3) = 54
O(3, 4) = 112
O(3, 5) = 200
O(3, 6) = 324
O(3, 7) = 490
O(3, 8) = 704
O(3, 9) = 972
O(3, 10) = 1300
O(3, 11) = 1694
O(3, 12) = 2160
O(3, 13) = 2704
O(3, 14) = 3332
O(3, 15) = 4050
O(3, 16) = 4864
O(3, 17) = 5780
O(3, 18) = 6804
O(3, 19) = 7942
O(4, 1) = 11
O(4, 2) = 72
O(4, 3) = 243
O(4, 4) = 608
O(4, 5) = 1275
O(4, 6) = 2376
O(4, 7) = 4067
O(4, 8) = 6528
O(4, 9) = 9963
O(4, 10) = 14600
O(4, 11) = 20691
O(4, 12) = 28512
O(4, 13) = 38363
O(4, 14) = 50568
O(4, 15) = 65475
O(4, 16) = 83456
O(4, 17) = 104907
O(4, 18) = 130248

-continued

O(4, 19) = 159923
O(5, 1) = 26
O(5, 2) = 232
O(5, 3) = 1008
O(5, 4) = 3104
O(5, 5) = 7750
O(5, 6) = 16776
O(5, 7) = 32732
O(5, 8) = 59008
O(5, 9) = 99954
O(5, 10) = 161000
O(5, 11) = 248776
O(5, 12) = 371232
O(5, 13) = 537758
O(5, 14) = 759304
O(5, 15) = 1048500
O(5, 16) = 1419776
O(5, 17) = 1889482
O(5, 18) = 2476008
O(5, 19) = 3199904

Just to point out a few examples from the data above, for three criteria fields with five disjoint values for each criteria, there are 200 possible overlaps. If the number of disjoint values for each criteria is doubled to ten, then there are 1300 possible overlaps. Increase the number of criteria fields to five with ten disjoint values per field, and the possible overlaps jumps to 1,610,000 possible overlaps. As is evident from this potential overlap explosion, as the number of filters, criteria fields and disjoint values rises, the complexity of identifying overlaps and handling overlaps increases significantly.

To solve this problem with filter overlaps, the tool optimizer disclosed herein can utilize a packet processing system whereby the packet forwarding behavior is governed by matching packets in parallel against multiple user-specified packet filtering criteria and then by performing forwarding actions associated with all such matching filter criteria. As described herein, this multi-action packet forwarding behavior is different from traditional packet switches and routers, as well as existing tool aggregation devices that provide single-forwarding-action operation based upon currently available packet switching ICs. The multi-action packet forwarding behavior described herein is particularly advantageous for network monitoring applications to facilitate sharing access to limited monitoring resources in a simple and straightforward way. However, it is noted that this multi-action packet forwarding could also be utilized in other applications and environments, if desired.

Multi-action packet forwarding can be achieved, for example, by generating filter rules for filter engines within existing TCAM-based network packet switch ICs so that multi-action packet forwarding is provided without losing packets. Examples for such a solution are described in more detail below with respect to FIGS. 9A and 9B below.

In addition, multi-action packet forwarding can be achieved more directly using a hardware system with multiple parallel filter engines and a forwarding action combiner so that each of the filter engines are configured to contribute to the forwarding actions for any given packet. This parallel filtering technique followed by an action combiner automatically handles situations where filters overlap. An example embodiment for such a solution is now described in more detail with respect to FIG. 8.

FIG. 8 is a block diagram for a packet processing system 800 whereby the packet forwarding behavior is governed by matching packets in parallel against multiple user-specified packet filtering criteria and by performing the forwarding actions associated with all such matching filter criteria. Similar to FIG. 2A, a plurality "N" input ports 202 (1, 2, 3 ... N) provide source packets to ingress queues or buffers 204 (e.g., one buffer per input port). The ingress buffers 204 then provide these source packets to multi-action filter engine 802. The multi-action filter engine 802 includes a plurality "Z" match engines 803 that receive the source packets from the input buffers 204. Each match engine includes a field selector 810, a match processor 812 and a forwarding action processor 814. The field selector 810 obtains values within the fields associated with the filter criteria selected by a user. The match processor 812 compares the field values with the desired match values to determine if a match has occurred with an incoming packet. The forwarding action processor 814 then determines the desired forwarding action for a matched packet. As described above, the operation of the match engines 803 can be controlled by filter rules automatically generated from user-defined filters, if desired. The forwarding actions from each of the "Z" match engines 803 are then fed to the forwarding action combiner 808, which can be configured to combine these forwarding actions using a Boolean OR operation 804. If desired, other optional (OPT) logic 806 could also provide more complex logical operations and expression in addition to the OR'ing of the forwarding actions together. After processing the incoming source packets, the multi-action filter engine 802 sends packets to the appropriate destination ports. In particular, packets to be forwarded to each of the "M" output ports 214 (1, 2, 3 ... M) are provided to a respective egress queue or buffer within the egress buffers 210. And the egress buffers 210 then send packets to their respective output ports 214 (1, 2, 3 ... M). It is noted that the multi-action filter engine 802 can be used instead of the ingress filter engines 202 and the egress filter engines 212 within the embodiment for tool port optimizer 102 depicted in FIG. 2A, and the dynamic filter processor 106 can be configured to automatically generate and provide filter rules 110 for the multi-action filter engine 802 based upon user-define filters 108.

By combining the forwarding actions provided by all of the "Z" match engines 803, the forwarding action combiner 808 allows for each of these forwarding actions to be acted upon. In other words, multiple different forwarding actions can be provided for any given incoming source packet. This multi-action packet forwarding is in contrast to prior solutions where priority-ordered TCAMs and action resolution engines are design to allow only a single forwarding action per packet. Thus, in these prior systems, only the forwarding action for the highest priority match gets acted upon by the system, and different forwarding actions associated with any lower priority match do not get acted upon. It is further noted that the match engines 803 themselves may each be configured internally to allow multiple different forwarding actions per match so that multiple different forwarding actions can be provided to the forwarding action combiner 808 for each packet from each match engine. Alternatively, the match engines 803 may be configured to allow only a single forwarding action per packet so that the forwarding action combiner 808 receives only one forwarding action for each packet from any particular match engine. Other variations and techniques could also be provided, if desired, while still taking advantage of the multi-action packet forwarding described herein.

FIGS. 9A and 9B will now be discussed. FIGS. 9A and 9B provide solutions that achieve multi-action packet forwarding by generating filter rules for filter engines within existing TCAM-based network packet switch ICs. As described above, the dynamic filter processor 106 automatically identifies overlapping filters and determines the low-level filter rules for the packet switch to achieve the desired high-level forwarding behavior. If desired, the dynamic filter processor 106 can use action superset egress (ASE) processing to efficiently handle overlapping filters by applying filter rules to ingress and egress filter engines so that packets are forwarded to supersets of egress ports associated with overlapping filters associated with different destination tools.

Action superset egress (ASE) processing, as described herein, provides an advantageous technique for addressing filter overlaps and the complexity created by larger numbers of fields and criteria values. As with the multi-action filter engine 802, the ASE processing matches packets in parallel against multiple user-specified packet filtering criteria, and performs the forwarding actions associated with all such matching filter criteria by using packet superset forwarding. The ASE processing uses two TCAM filtering stages with multiple parallel TCAMs at the ingress stage to implement the packet filtering rules required to represent a user defined filter. This two stage approach handles overlaps correctly and efficiently. In particular, the ASE processing places filter rules for overlapping user-defined filters into unique ingress TCAM engines. The ASE processing then forwards the ingress filter matches from each TCAM to all egress ports that are directly connected to the user-defined filter. The ASE processing also forwards the ingress filter matches from each TCAM to the egress ports connected to overlapping filters. This additional forwarding action causes packets to be processed by egress filter rules associated with the superset of output ports connected to the overlapping filters. It is noted, however, that when a packet is configured to be forwarded by multiple ingress filter engines to the same egress port, the packet may be forwarded only once so as not to overload the egress buffer. This packet superset forwarding ensures that packets matching higher priority TCAM filter rules are still delivered to the egress filter rules associated with lower priority overlapping TCAM filter rules, given that commercially available integrated circuits for packet switching and routing are only able to implement a single forwarding action per packet even in parallel TCAM architectures. As such, the ASE processing ensures that packets matching multiple filters are forwarded to the appropriate egress ports, and the port's associated egress filters make the final determination of what packets are actually forwarded on to the destination tool. While superset forwarding increases the data traffic to the egress filter engines relative to forwarding only to directly connected output ports, the ASE processing allows for significantly faster processing and accurate handling of overlapping filters and allows for automated handling of overlapping filters created and/or modified by users through an interface as described above.

In applying the ASE processing, the dynamic filter processor 106 first determines whether or not there are overlapping filters that have been selected or defined by the user. By performing logical operations on the filtering criteria, it is possible for the tool optimizer 102 and the dynamic filter processor 106 to determine whether or not an overlap is possible between any two filters and thereby determine whether an overlap condition exists. One technique for making this overlap determination is to first check the filters to see if they both examine one or more common fields within the same source packet. Then, within the set of common fields, the matching criteria can be compared for overlapping conditions. For example, if filters A and B both have a selected criteria for the destination address of the packet, then the destination address is a common field. Within this common field, if a filter A and filter B identify overlapping match conditions, then the filters overlap. Using a more specific example, assume that filter A specifies in part a matching criteria where the destination address is in a range from 1-100, and assume that filter B specifies in part a matching criteria where the destination address is in the range 50-200. If so, then these two match criteria for filter A and filter B overlap because packets with destination addresses in the range 50-100 would match the criteria for the common destination address field in both filters A and B. In short, when comparing required filter match criteria for two filters A and B, if there exists at least one common field for which the required matching criteria is non-overlapping, then filters A and B are non-overlapping. Otherwise the filters overlap. It is noted that other techniques could also be applied, if desired, to determine potentially overlapping filters.

Once overlapping filters are identified, the dynamic filter processor 106 can utilize ASE processing to effectively handle the overlapping filters. The ASE processing implements filters rules using a combination of ingress filter engines and egress filter engines to effectively handle overlapping filters. In effect, ASE converts overlapping user-defined filters into filter rules useable with single-forwarding-action per packet switching ICs by specifying ingress match actions that forward to a superset of egress filter rules involved in implementing the overlapping user-defined filters. The dynamic filter processor can also be configured not to modify matching criteria for pre-existing filters when overlapping filters are added or removed by the user, which reduces or eliminates the possibility of missing packet matches while reconfiguring filters. The dynamic filter processor simply re-evaluates the overlaps and updates filter forwarding actions to account for the revised overlaps, which can be configured in commercially available packet switching/routing ICs hitlessly (without dropping packets for current traffic). Then the ASE processing uses egress filter engines to pass only those packets actually desired at the destination tool. Significantly, the dynamic filter processor automatically generates the appropriate ingress and egress filter rules to implement packet forwarding based upon selections made by a user without requiring the user to manually determine overlaps and filter rule configurations.

Looking now to FIG. 9A, a block diagram is provided for using dynamically created ingress filter rules and egress filter rules and superset packet forwarding to handle overlapping user-defined filters. It is noted that the same desired filters discussed with respect to FIGS. 7A and 7B are being applied in FIG. 9A to forward packets from source 702 to destination tool (TOOL 1) 704, destination tool (TOOL 2) 706 and destination tool (TOOL 3) 708. According to the ASE processing, filters rules are set up in the ingress filter engines 206 so that filter packet matches are sent through packet forwarding circuitry 920 to the superset of all egress ports connected to overlapping filters. This superset packet forwarding allows the egress filter rules for each of the egress ports to further filter all possible desired packets for a particular egress/destination port. Thus, the egress filter rules 914, 916 and 918 are used to pass only those packets actually desired at the destination tools 704, 706 and 708.

It is noted that both ingress and egress filter rules contain criteria reflecting the corresponding user-defined filter. Ingress filter rule criteria contain source port information and have actions identifying destination ports. Egress filter rule criteria contain information identifying one or more source port(s) and one or more destination port(s). The ingress filter engines 206 forward packets to egress or destination ports identified in the ingress filter rules, and these packets are stored in egress buffers associated with the egress/destination ports. The egress filter engines 212 then further filter these forwarded packets according to the egress filter rules. As such, egress filter rules associated with the destination port for the forwarded superset packet will potentially filter that packet, thereby potentially passing any superset packet along to the destination tool. Thus, egress filter rules relating to destination ports/tools associated with overlapping filters will further filter the superset packet and potentially pass along that superset packet to the desired destination tool, while egress filter rules not relating to overlapping filters will not pass the superset packet. It is further noted that egress filter engines, as with ingress filter engines, can have a filter priority with respect to individual egress filter rules and with respect to egress filter engines where there are multiple parallel egress filter engines.

In FIG. 9A, solid lines represent packet forwarding to the destination ports directly-connected to the filter rule for which the packets are being forwarding. The dashed lines represent packet forwarding to additional destination ports that are directly-connected to filter rules that overlap with the filter rules for which packets are being forwarded. Thus, the dashed lines represent additional packet forwarding due to filter overlaps, and identify the egress filter rules which have the possibility of matching. It should be again noted that packets are forwarded to destination ports, and egress filter rules then further filter these packets before they are actually passed on to the destination tools. The egress filter rule criteria include destination port information to ensure that only desired packets will match and be passed along. These same solid line and dashed line representations are also used in FIGS. 9B, 11A-D and 12A-C for indicating packet forwarding to directly-connected destination ports and packet forwarding to additional destination ports due to filter overlaps.

As shown in FIG. 9A, ingress filter engines 206 have been configured with filter rules 902, 904 and 906 representing three overlapping filters (VLAN 1-3, VLAN 3-6, TCP), and egress filter engines 212 have been configured with filter rules 914, 916 and 918 to determine output packets (VLAN 1-3, VLAN 3-6, TCP) actually sent to the destination tools 704, 706 and 708. Rule 902 is set up in the ingress filter engines 206 to forward VLAN 1-3 packets through the packet forwarding circuitry 920 to an egress/destination port associated with destination tool 704. In addition, rule 902 is also configured to forward matching packets to egress/destination ports associated with destination tools 706 and 708 in order to account for filter overlaps. Rule 904 is set up in the ingress filter engines 206 to forward VLAN 3-6 packets through the packet forwarding circuitry 920 to an egress/destination port associated with destination tool 706. In addition, rule 904 is also configured to forward matching packets to egress/destination ports associated with destination tools 704 and 708 in order to account for filter overlaps. Rule 906 is set up in the ingress filter engines 206 to forward TCP packets through the packet forwarding circuitry 920 to an egress/destination port associated with destination tool 708. In addition, rule 906 is also configured to forward matching packets to egress/destination ports associated with destination tools 704 and 706 in order to account for filter overlaps. As described above, the ingress filter rules 902, 904 and 906 will be processed in priority order 903 from high (HI) to low (LOW). As such, packets matched and forwarded by one rule are not available for forwarding by a later rule according to standard TCAM operation. However, because the ingress filter rules 902, 904 and 906 have been set up to provide packet forwarding to supersets of egress ports, all possible packets desired to be received by destination tools 704, 706 and 708 are nevertheless received by egress ports for these destination tools so that egress filters 914, 916 and 918 can further filter those superset packets to determine which packets are actually sent out to destination tools 704, 706 and 708.

As stated above, egress filter engines 212 have been configured with filter rules 914, 916 and 918 that represent three desired output criteria (VLAN 1-3, VLAN 3-6, TCP) for the destination tools. Egress filter rule 914 further filters packets from rules 902, 904 and 906 and passes only VLAN 1-3 packets from the appropriate source port to the destination tool (TOOL 1) 704. Egress filter rule 916 further filters packets from rules 902, 904 and 906 and passes only VLAN 3-6 packets from the appropriate source port to the second tool (TOOL 2) 706. And egress filter rule 918 further filters packets from rules 902, 904 and 906 and passes only TCP packets from the appropriate source port to the third destination tool (TOOL 3) 708.

The examples thus far have assumed that filter criteria values (e.g., disjoint lists, ranges, or combinations of the two), such as VLAN 1-3, can be expressed in a single rule. However, packet switching/routing ICs are currently limited in terms of the complexity of values their filter engines can accept in a single rule. Commercially available packet switching/routing integrated circuits include hardware support for specifying filter rules using binary value/mask pairs to define criteria values. As a consequence, filters can be broken into multiple TCAM filter rules, each of which representing a portion of the range or list, such as defining rules for VLAN 1 and VLAN 2-3 instead of a single rule for VLAN 1-3. With this level of hardware support, using binary value/mask pairs to specify multiple ports (source or destination) and/or multiple filter criteria values can reduce the amount of filter memory needed to specify filter rules as compared to specifying a single rule for each value in a range.

Contiguous ranges can be expanded automatically by the dynamic filter processor 106 into the minimal number of value/masks that represent the range. Likewise, disjoint lists of values can be collapsed automatically into the fewest set of value/masks to represent the list. For instance, for the following disjoint lists of port numbers, the following binary value/masks can be set:

Ports 1, 3, 5, 7, 9, 11, 13, 15=0xxx1
Ports 2, 3, 10, 11, 18, 19, 26, 27=xx01x
Ports 16, 20=10x00

And a VLAN range 100-200 can be expressed using the following value/masks:

VLAN 100-103=00000011001xx
VLAN 104-111=0000001101xxx
VLAN 112-127=000000111xxxx
VLAN 128-191=0000010xxxxxx
VLAN 192-199=0000011000xxx
VLAN 200=0000011001000

It is noted that for these representations, binary values are used, and an "x" represents that either a "1" or a "0" can will match that bit value.

The ASE processing described herein can be configured to support whatever level of hardware support is available in the packet switch IC to represent contiguous ranges and non-contiguous or disjoint lists within filter rules, including user-defined groups whereby a limited number of ranges or lists are supported for a limited number of criteria fields. In cases where support is limited to value/mask pairs, the dynamic filter processor can be configured to automatically decompose a user-defined filter into the minimal number of value/mask paired rules needed to represent the filter, as illustrated by the example set forth in FIG. 9B.

FIG. 9B is a block diagram of an embodiment 950 for using value/mask filter decomposition for the ingress and egress filter rules of FIG. 9A. Rule 902 that forwards VLAN 1-3 packets has been decomposed into two value/mask rules: (1) VLAN 1 value/mask rule 952A represented by value/mask 001, and (2) VLAN 2-3 value/mask rule 952B represented by value/mask 01x. Because only the VLAN 2-3 value/mask rule 952B could overlap with rule 904 that forwards VLAN 3-6 packets, only packets matching the VLAN 2-3 value/mask rule 952B are also forwarded to the egress/destination port corresponding to destination tool 706 (TOOL 2) according to the ASE superset packet forwarding technique, noting that egress filter rules 916 are associated with egress port/tool 706. Because the VLAN 1 value/mask rule 952A and the VLAN 2-3 value/mask rule 952B could overlap with rule 906 that forwards TCP packets, packets matching the VLAN 1 value/mask rule 952A and the VLAN 2-3 value/mask rule 952B are also forwarded to the egress/destination port corresponding to destination tool 708 (TOOL 3) according to the ASE superset packet forwarding technique, noting that egress filter rules 918 are associated with egress port/tool 708.

Similarly, rule 904 that forwards VLAN 3-6 packets has been decomposed into three value/mask rules: (1) VLAN 3 value/mask rule 954A represented by value/mask 011, (2) VLAN 4-5 value/mask rule 954B represented by value/mask 10x, and (3) VLAN 6 value/mask rule 954C represented by value/mask 110. Because only the VLAN 3 value/mask rule 954A could overlap with rule 902 that forwards VLAN 1-3 packets, only packets matching the VLAN 3 value/mask rule 954A are also forwarded to the egress/destination port corresponding to destination tool 704 (TOOL 1) according to the ASE superset packet forwarding technique, noting that egress filter rules 914 are associated with egress port/tool 704. Because the VLAN 3 value/mask rule 954A, the VLAN 4-5 value/mask rule 954B and the VLAN 6 value/mask rule 954C could overlap with rule 906 that forwards TCP packets, packets matching each of these value/masks rules are also forwarded to the egress/destination port corresponding to destination tool 708 (TOOL 3) according to the ASE superset packet forwarding technique, noting that egress filter rules 918 are associated with the egress port/tool 708.

With respect to rule 906, because all packets using TCP could also match rule 902 that forwards VLAN 1-3 packets or rule 904 that forwards VLAN 3-6 packets, all packets matching rule 906 are forwarded to the egress/destination ports corresponding to destination tools 704 (TOOL 1) and 706 (TOOL 2) according to the ASE superset packet forwarding technique, noting that egress filter rules 914 are associated with egress port/tool 704 and that egress filter rules 916 are associated with egress port/tool 706.

As with the ingress filter rules, the egress filter rules have also been decomposed into value/mask based rules in FIG. 9B. Rule 914 that passes only VLAN 1-3 packets to destination tool 704 has been decomposed into two value/mask based rules: (1) VLAN 1 value/mask rule 964A represented by value/mask 001, and (2) VLAN 2-3 value/mask rule 964B represented by value/mask 01x. Rule 916 that forwards VLAN 3-6 packets has been decomposed into three value/mask rules: (1) VLAN 3 value/mask rule 966A represented by value/mask 011, (2) VLAN 4-5 value/mask rule 966B represented by value/mask 10x, and (3) VLAN 6 value/mask rule 966C represented by value/mask 110. Once decomposed, the specific egress filter rules associated with potential overlaps further filter packets subject to the superset packet forwarding and allow matching packets to pass on to their connected tool ports. As such, VLAN 3 (011) value/mask rule 966A further filters the superset packets from the VLAN 2-3 (01x) value/mask rule 904, allowing matching packets to pass. VLAN 2-3 (01x) value/mask rule 964B further filters the superset packets from the VLAN 3 (011) value/mask rule 954A, allowing matching packets to pass. Rule 918 further filters superset packets from all of the ingress filter rules (i.e., rules 952A, 952B, 954A, 954B, 954C, 906), allowing matching packets to pass.

As shown in FIG. 9B, because the ASE processing can determine overlaps at the decomposed rule granularity, several of the decomposed rules will no longer overlap as compared to the non-decomposed filter rules of FIG. 9A. Each decomposed ingress filter rule is still shown as directly connected to the corresponding egress/destination port and associated egress filter rule. The overlaps, however, are calculated at the decomposed rule level. Thus, the only overlaps between VLAN 1-3 filter and VLAN 3-6 filter are for VLAN 2-3 and VLAN 3 decomposed rules, as described above. It is also noted that the decomposed rules that no longer overlap can be located in lower priority filter memory than the decomposed rules that do overlap, if desired. It is also noted that in cases where hardware supports specification of user friendly ranges and lists within a single rule, there may situations when it is beneficial to decompose the filters into more rule granularity in order to favor fewer overlaps, even though this optimization would require more filter rules.

ASE Processing and Example Scenarios

As stated above, action superset egress (ASE) processing converts parallel filter rules into a form useable with single-forwarding-action per packet switching ICs by forwarding ingress rule matches to a superset of egress filter rules involved in overlapping user-defined filters. As such, the egress filter rules receive all possible packets to be forwarded to the destination tool. The egress filter rules then drop those packets that are not wanted at the destination tool and pass only those desired to be received by the destination tools. This ASE processing greatly simplifies the rules that must be set up in the filter engines, improves the speed with which users are able to initially configure the tool optimizer, and overcomes problems associated with overlapping filters implemented using standard TCAMs in switching integrated circuits, such as those described above.

More detailed examples of ASE processing are now described with respect to Example 1 and Example 2 below. In these example embodiments, the ASE filter processing utilizes filters that either pass their matches (e.g., pass all or pass-by-criteria) or drop their matches. In addition, for the embodiments described, the ASE filter processing uses ingress and egress TCAM filtering stages to implement the packet filtering rules required to represent a user-defined filter. As stated above, the ASE processing automatically decomposes the user defined filters into the required filtering rules. The ASE processing then provisions the ingress and egress TCAM settings as necessary to implement the filtering rules regardless of whether the rules overlap with other filter rules. In this way, the ASE processing automatically ensures that all overlaps are handled correctly and that the rules are implemented hitlessly (i.e., without affecting other user traffic) so that every destination tool can receive the packets it is supposed to receive. Further, as set forth below, by intelligently managing how rules are implemented in the ingress filter engines, the ingress filter engines can provide accurate packet and byte match statistics for the filter, for example, by aggregating individual filter rule match counts into an overall set of filter statistics.

As stated above, the embodiments described herein primarily focus on packet communications. These packets may include L2-L4 fields. The filter rules implemented herein include explicit match criteria on L2-L4 fields within a packet. In addition, every filter rule can also include a field to associate it with a single input port in order to substantially reduce the possibility of overlapping rules. If a filter has two input ports connected to it, then each rule for the filter appears twice in the ingress TCAM—once for each input port.

In operation, the ASE processing uses ingress TCAM engines to pre-filter packets matching any of the filtering rules that result from the user defined filters. Packets that match the ingress rules are forwarded to every destination port (DP) that is directly connected to the filter and every DP that is connected to an overlapping rule. The ASE processing then configures the egress TCAM engines to allow only those packets matching the user-defined filtering criteria to egress to the instrument port. In other words, the egress filter rules are configured to discard all packets that do not match any of the user defined filtering criteria associated with that instrument port. In the embodiment depicted herein, the ASE processing supports pass-by-criteria (i.e., pass upon filter match), pass all, and drop all filters. While the examples below do not use drop-by-criteria rules (i.e., deny rules), other implementations could be made that utilize drop-by-criteria rules.

The examples below also assume that the packet switch ICs include multiple independent TCAM engines operating in parallel at each filtering stage and that each TCAM engine has an internal priority relative to the other TCAM engines. Each parallel engine matches packets to rules independently of the other engines and maintains its own match statistics. The highest priority TCAM engine match overrides any other matches with regard to packet forwarding. The ASE processing described herein utilizes this ingress/egress TCAM architecture to simplify handling of overlapping filters and can also utilize the parallel TCAM processing to improve performance of filter statistics.

When there are multiple parallel TCAM matching engines for ingress filtering, that parallelism can be exploited to ensure that packet match statistics (byte and packet counts) are not corrupted by filter overlaps. With ASE processing, filter rules are provisioned into an ingress engine that does not already contain an overlapping rule, available space permitting. This is possible as long as the maximum number of overlaps for any filter is less than the number of ingress TCAM engines, and there is enough available space to provision the rule in at least one TCAM engine that does not contain an overlapping rule. As long as no overlapping filter rules are provisioned in the same TCAM engine, the statistics are accurate. These accurate statistics are significant in that most users desire accurate statistics and accurate statistics are difficult to obtain with overlapping rules. This use of multiple ingress engines and placing non-overlapping filter rules in these ingress engines to improve filter statistics is described in more detail with respect to FIG. 10A below.

Ordering of rules for a particular filter within an ingress engine is typically unimportant as long as the rules in an engine are configured not to overlap. However, if a rule does need to be added to an engine that contains an overlapping rule, then all existing rules in the engine can first be compressed to help ensure that the new rule is added into lower priority memory than the existing overlapping rules. This preserves the accuracy of existing rules, and ensures that any inaccuracy is associated with the new filter rule. Further, a "Drop All" rule can be placed as the last entry in the lowest priority ingress TCAM engine to ensure that packets that do not match any rule are dropped. This "Drop All" rule will only be matched if no other rules match. In other words, all packets that are not desired to be forwarded to a destination port are dropped by the ingress filter engines. As described below, engine 0 will be considered the lowest priority engine. Thus, being the last entry in ingress engine 0 makes it the lowest priority entry within all ingress engines.

Egress engine rules allow filter matches to pass through. Egress rules preferably include input port information to prevent false matches. Egress rules also include the destination port address. The input port and destination port can use value/masks or port groups (if supported by the packet switch integrated circuit) to specify multiple ports which will utilize rules more efficiently. Egress TCAM rule ordering is unimportant except that a "Drop All" rule is again typically included as the last entry in the lowest priority egress engine (e.g., engine 0) to ensure that traffic that does not match any rule is dropped.

As described herein, the dynamic filter processor provides hitless operation with respect to modifications and changes to filter configurations. Hitless operation ensures that packets are not incorrectly dropped or passed through when configuration changes and filter re-compilations occur. Significantly, modify/delete operations on a filter do not affect any other filter's traffic. However, modifying a filter can be optionally configured to cause the statistics for that filter to be reset.

The ASE processing is now further described with respect to the two example overlap scenarios below. The first scenario addresses a simple overlap scenario with two input ports. The second scenario addresses a more complex overlap scenario with one input port.

Example 1

Overlap Scenario with Two Input Ports

In the following simple overlap scenario, a user has connected two overlapping filters to Source Port 1 (SP1). Source port 2 (SP2) is connected to one of the filters. Each filter has a list of outgoing ports to send (multicast) its matches. The user wants both filters to send every matching packet to the intended tool ports. The user has set up filtering criteria concerning VLAN addresses and source IP (SIP) addresses to particular outgoing destination ports. The destination ports are represented by "DP#," and destination ports on another tool optimizer are represented by "B#DP#" (e.g., B2DP1 represents port 1 on box 2). As noted herein, one tool optimizer (box) can be connected to another. For this example, the user has set up the following desired packet forwarding paths:

Connection 1—SP1 packets matching VLAN 5,8 passed to DP4 and B2DP1
Connection 2—SP1 packets matching SIP address range *.*.030.* passed to DP6,7
Connection 3—SP2 packets matching VLAN 5,8 passed to DP4 and B2DP1

It is noted that the first two connections involve overlapping filters because SP1 packets having VLAN 5 or 8 addresses can also have a source IP address within the range *.*.030.*.

The ASE processing described herein, therefore, recognizes these filtering criteria as representing two overlapping SP1 filters and one SP2 non-overlapping filter. The VLAN 5,8 criteria is implemented as four ingress filter rules—two for each source port. Including the source port in individual rules limits the scope of the overlaps—in this case it prevents SP2 packets matching VLAN 5 or 8 from being directed to DP6 and DP7. If there are parallel ingress engines, the ASE processing will also attempt to co-locate both Connection 3 filter rules in any one of the ingress TCAM engines because those filter rules do not overlap. To help ensure accurate filter statistics, where there are parallel ingress engines, the rules for the VLAN filter for Connection 1 and the rules for the SIP filter for Connection 2 are provisioned into different TCAM engines because they will potentially overlap. In this way, packets matching a SP1 rule get directed by the ingress TCAM to only those outgoing ports that are in actual overlapping rules.

With respect to the egress filter engines, the egress filter rules can be provisioned into any egress TCAM engine. Each egress filter rule, however, will include a SP and DP.

The following represents an example of rules that can be set up to handle this first example scenario. The first table provides example ingress filter engine settings. The second table provides example egress filter engine settings. It is further noted that there are parallel ingress processing engines. It is also noted that a "*" designation indicates that all values match the criteria.

| Example 1 - Ingress Filter Engines | | |
| --- | --- | --- |
| Engine | filter Rule | Forwarding Action |
| Engine 1 | SP1, SIP *.*.030.* | DP4, 6, 7 B2DP1 |
| Engine 0 | SP2, VLAN 8 | DP4, B2DP1 |
| Engine 0 | SP1, VLAN 8 | DP4, 6, 7, B2DP1 |
| Engine 0 | SP2, VLAN 5 | DP4, B2DP1 |
| Engine 0 | SP1, VLAN 5 | DP4, 6, 7, B2DP1 |
| Engine 0 | DROP ALL | N/A |

| Example 1 - Egress filter Engines | | |
| --- | --- | --- |
| Engine | Filter Rule | Action |
| Any | SP1, DP7, SIP *.*.030.* | PASS |
| Any | SP1, DP6, SIP *.*.030.* | PASS |
| Any | SP1, DP4, VLAN 5 | PASS |
| Any | SP2, DP4, VLAN 5 | PASS |
| Any | SP1, B2DP1, VLAN 5 | PASS |
| Any | SP2, B2DP1, VLAN 5 | PASS |
| Any | SP1, DP4, VLAN 8 | PASS |
| Any | SP2, DP4, VLAN 8 | PASS |
| Any | SP1, B2DP1, VLAN 8 | PASS |
| Any | SP2, B2DP1, VLAN 8 | PASS |
| Any | * | DROP ALL |

Example 1 assumes that engine 0 is the lowest priority engine. Being the last entry in ingress engine 0 makes the DROP ALL rule the lowest priority entry within all ingress engines. It is also noted that the rules in the tables above are pass-by-criteria rules, except for the DROP ALL rule in the ingress filter engine and the egress filter engine. It is further noted that the statistics from each of SP1/SP2 filter rules can be aggregated for use in displaying filter statistics.

If desired, the egress filter rules can be optimized, if possible, by consolidating SPs and DPs using either value/masks or port groups. The example below shows an egress rule reduction by consolidating SP1 and SP2 rules into a single rule. The DPs in this example could not be consolidated in this example.

| Example 1 - Egress filter Engines - Optimized | | |
| --- | --- | --- |
| Engine | Filter Rule | Action |
| Any | SP1, DP7, SIP *.*.030.* | PASS |
| Any | SP1, DP6, SIP *.*.030.* | PASS |
| Any | SP1-2, DP4, VLAN 5 | PASS |

| Example 1 - Egress filter Engines - Optimized | | |
|---|---|---|
| Engine | Filter Rule | Action |
| Any | SP1-2, B2DP1, VLAN 5 | PASS |
| Any | SP1-2, DP4, VLAN 8 | PASS |
| Any | SP1-2, B2DP1, VLAN 8 | PASS |
| Any | * | DROP ALL |

Example 2

Complex Overlap Scenario with One Input Port

In the following complex overlap scenario, a user has connected five filters to an incoming port (SP1), and each filter has a list of outgoing destination ports to send (multicast) its matches. The user wants all the filters to send every matching packet to the intended instrument ports. As with the first example above, the desired packet forwarding utilizes VLAN and source IP (SIP) traffic-matching criteria. More particularly, for this example, the user has set up the following desired packet forwarding:

Connection 1—SP1 packets matching VLAN 1-4 passed to DP4 and B2DP1
Connection 2—SP1 packets matching VLAN 3-8 passed to DP5,6
Connection 3—SP1 packets matching SIP address range *.*.030.* passed to DP6,7
Connection 4—SP1 packets matching VLAN 9 passed to DP3, 6, 8, 9
Connection 5—SP1 packets matching VLAN 10 passed to DP4

It is noted that the first two connections are overlapping because VLAN 3 and 4 would match both filter criteria. It is also noted that connections 1, 2, 4 and 5 overlap with connection 3 because packets having VLAN 1-10 addresses can also have a source IP address within the range *.*.030.*.

The ASE processing described herein automatically accounts for these overlaps and sets up the needed forwarding actions using ingress/egress engines to direct all desired packets to the destination ports. Because all of the VLAN criteria above overlap with the SIP criteria, matches from the SIP filter rules are sent to all VLAN criteria destination ports, and vice versa. In addition, because VLAN 1-4 and VLAN 3-8 filtering criteria overlap, their matches are also sent to each other's destination ports. No other filter criteria overlap, so no other forwarding takes place.

The ASE processing automatically determines which of an incoming port's rules actually overlap. In order to maintain accurate statistics, as described further below, the ASE processing provisions each of the incoming port's rules (SP1 in this case) into an ingress TCAM engine that does not contain overlapping rules. Packets matching a SP1 rule get directed by the ingress TCAM to every destination port (DP) that is directly connected to the filter rule and every DP that is connected to an overlapping filter rule. If an SP1 rule does not overlap, its DPs are not included in the action superset of packets forwarded to potentially overlapping DPs.

The following represents an example of rules that can be set up to handle this second example scenario. The first table provides example ingress filter engine settings. The second table provides example egress filter engine settings. It is further noted that in the example below, there are parallel ingress processing engines.

| Example 2 - Ingress Filter Engines | | |
|---|---|---|
| Engine | Filter Rule | Forwarding Action |
| Engine 2 | SP1, SIP *.*.030.* | DP3-9 B2DP1 |
| Engine 1 | SP1, VLAN 3-8 | DP4-7, B2DP1 |
| Engine 0 | SP1, VLAN 1-4 | DP4-7, B2DP1 |
| Engine 0 | SP1, VLAN 9 | DP3, 6-9 |
| Engine 0 | SP1, VLAN 10 | DP4, 6, 7 |
| Engine 0 | * | DROP ALL |

| Example 2 - Egress Filter Engines | | |
|---|---|---|
| Engine | Filter Rule | Action |
| Any | SP1, DP5, VLAN 3-8 | PASS |
| Any | SP1, DP7, SIP *.*.030.* | PASS |
| Any | SP1, DP6, VLAN 3-8 | PASS |
| Any | SP1, DP6, SIP *.*.030.* | PASS |
| Any | SP1, DP4, VLAN 1-4 | PASS |
| Any | SP1, B2DP1, VLAN 1-4 | PASS |
| Any | SP1, DP3, VLAN 9 | PASS |
| Any | SP1, DP6, VLAN 9 | PASS |
| Any | SP1, DP8, VLAN 9 | PASS |
| Any | SP1, DP9, VLAN 9 | PASS |
| Any | SP1, DP4, VLAN 10 | PASS |
| Any | * | DROP ALL |

As with Example 1 above, the egress rules can be simplified using value/masks or port groups (if supported by the packet switch IC) to specify source and destination ports, if desired.

Accurate Filter Statistics Using Multiple Ingress Filter Engines

Users expect that accurate statistics will be maintained for each user-defined filter, including counts for the number of data packets and/or the total number of bytes that match each filter's criteria. As noted earlier, each user-defined filter may be defined using Boolean logic to specify complex filter match criteria which may include ranges and/or disjoint lists of values, resulting in an implementation that requires many filter engine rules, each rule generating its own statistics. As part of the processing described herein, rule statistics can be automatically aggregated from all of the underlying filter rule match counts in order to present meaningful filter statistics to the user.

One further problem that can occur with overlapping filters, however, is that these match statistics can be inaccurate. For example, looking at FIG. 9A, if rules for each filter are located in the same ingress filter engine and rules 902 and 904 have higher priority, statistics associated with rule 906 that forwards TCP packets would likely be inaccurate because rule 906 does not receive any packets associated with VLAN 1-6.

As described herein, this problem with inaccurate statistics caused by filter overlaps can be resolved by taking advantage of multiple different ingress filter engines that are available in packet switch integrated circuits. Each engine "matches" independently of the other parallel engines and maintains its own match statistics. When multiple parallel TCAM matching engines are available for ingress filtering, this parallelism can be used to help ensure that packet match statistics (e.g., byte and/or packet counts) are not corrupted by rule overlaps. In particular, filter rules for a user-defined filter are provisioned into an ingress engine that does not contain filter rules for an overlapping filter, available space permitting. Space will be available as long as the maximum number of filter overlaps for any filter is less than the number of parallel ingress TCAM engines, and there is enough available space to provision the filter in at least one engine that does not contain an overlapping rule. As long as no overlapping filter rules are provisioned in the same TCAM engine, the statistics are accurate. This ability to provide accurate filter statistics and do so through automatic generation of filter rules and automatic application of those filter rules to appropriate ingress filter engines, even if there are overlapping user-defined filters and filter rules, is a significant advantage that is not provided by prior systems.

FIG. 10A is a block diagram of an embodiment 1000 for using multiple parallel ingress filter engines 1001 and an action resolution engine 1012 to implement the ingress filter engines 206 and provide accurate statistics. As depicted, 1002, 1004 . . . 1006 each include non-overlapping internal filters rules in order to maintain accurate filter statistics for the tool optimizer 102 as described herein. As depicted, ingress filter engines 206 include multiple different ingress filter engines (ENGINE 0) 1002, (ENGINE 1) 1004 . . . (ENGINE (n)) 1006 that each provide actions such as "FORWARD" or 'DROP' to the action resolution engine 1012. As described above, the action resolution engine 1012 for current network switch ICs will provide a single forwarding action for any given packet based upon priority, and this forwarding action will be provided to the packet forwarding circuitry. The multiple different ingress filter engines (ENGINE 0) 1002, (ENGINE 1) 1004 . . . (ENGINE (n)) 1006 also provide statistics to the statistics engine 1010. In operation, source 702 provides packets to each of the different ingress filter engines (ENGINE 0) 1002, (ENGINE 1) 1004 . . . (ENGINE (n)) 1006. As described above, the different ingress filters will be processed according to their priority with ENGINE 0 1002 being processed last as indicated by line 1003.

Advantageously, the dynamic filter processor described herein allocates rules to each filter engine such that no overlapping rules are contained in a single engine. Because each engine receives the data packets from source 702 and each engine does not include overlapping rules, the statistics data output by the different ingress filter engines (ENGINE 0) 1002, (ENGINE 1) 1004 . . . (ENGINE (n)) 1006 to the statistics engine 1010 do not suffer from the problem of mis-reported packet matches. In other words, the packets that match each rule within each filter engine will be accurately reported to the statistics engine 1010. The tool optimizer described herein, therefore, can provide accurate statistics for user defined filters and achieve precision in these statistics that have not achieved by prior solutions.

FIG. 10B is a diagram for a graphical user interface (GUI) providing filter statistics. As depicted, a window 1050 is providing filter statistics using VLAN address criteria. A variety of statistics related information can be kept for a filter and provided to the user through a GUI such as window 1050. As depicted, statistics related information for a filter is provided in a counts area 1052, a rates/percentages area 1053, a refresh area 1054, and a reset area 1056. The graphical image 1058 provides a representation of the filter for which filter statistics are being provided. As depicted, the graphical image 1058 includes information showing that the filter has been configured as a match "ALL" filter including VLAN filter criteria.

The counts area 1052 provides statistics information concerning the number of bytes and packets that have been inspected by the filter and that have matched the filter criteria. The rates/percentages area 1053 provide statistics information for inspected bits/second, matched bits/second and percentage bytes matched. The rates/percentages area 1053 also provide statistics information for inspected packets/second, matched packets/second and percentage packets matched. In addition, for each of these items, the rates/percentages section 1053 provides current information, average information, peak information and time of peak information. The refresh area 1054 provides an indication of the time of the displayed statistics and the display refresh interval. In addition, PAUSE and RESUME command buttons can be provided within the refresh area 1054. The PAUSE button pauses statistics collection, and the RESUME button resumes statistics collection once paused. The reset area 1056 provides an indication of the amount of time since the statistics were last reset and who caused the last reset. In addition, RESET and RESET OPEN command buttons can be included within the reset area 1056. The RESET command button resets statistics for the currently active window, and the RESET OPEN button resets statistics for all open statistics windows (e.g., when a user has selected to view statistics for multiple filters and ports and has left the statistics windows open). The RESET OPEN command button is useful because a user may have multiple windows open at the same time, and the user may wish to reset all of them simultaneously. The window 1050 may also have a CLOSE command button that closes the currently active window and a CLOSE ALL command button that closes all open statistics windows.

It is noted that inspected packets, bits and/or bytes refers to the number of packets, bits or bytes that are input into a user-defined filter. Matched packets, bits and/or bytes refers to the number of packets, bits or bytes that match the user defined filter. Typically, the matched packets will be fewer than the inspected packets, although the inspected/matched numbers provided in FIG. 10B are the same. The numbers provided in the rates/percentages area 1053 for inspected packets/bytes represent an aggregation of the packets/bytes that were received by source ports connected to the filter minus any packets that were discarded by earlier stage source port filters. The current information within rates/percentages area 1053 represent the number of packets/bits inspected/matched in the last second. Average rate is the average number of packets/bits inspected each second since stats were last reset. Counts provided within the counts area 1052 represent the sum of the count statistics for the number of packets/bytes inspected or matched since statistics were last reset.

ASE Processing Optimization Techniques

In currently available packet switch ICs, the egress buffer 210 situated prior to the egress filter cannot process traffic that exceeds the line rate of the egress port without overflowing and dropping packets. The ASE processing architecture forwards packets matching a filter rule on to all directly connected destination ports. ASE will also forward matches from overlapping filter rules to this destination even if the filter rule is not directly connected to this destination port. This potentially increases the amount of traffic to the buffer(s) associated with the egress filter rules supplying packets to the destination ports, as compared to alternative single stage architectures that do not account for overlapping filters. If this combined traffic rate exceeds the destination port line rate, then the egress buffer will overflow and packets will be dropped. This prevents the possibility of egress filter engines receiving packets at a rate that exceeds line rate. Since ASE processing uses egress filter rules to discard overlapping filter matches that do not also match the directly connected filters, the usable bandwidth of the egress port may be less than line rate. As more traffic is discarded by the egress filter rule, less usable transmit bandwidth is available on that egress port. For instance, if because of the overlapping filters the egress filter rule is overloaded and discards on average half of the packets it receives, then the instrument port will on average only transmit at half of its configured line rate. And with current packet switch ICs, there is no way to discern whether packets dropped at the egress buffer would have matched an egress filter rule or not.

A solution to help alleviate the buffer overflow issue and potentially increase usable transmit bandwidth of egress ports is to reduce the number of packets that are being forwarded to the egress filter rules. For example, priority optimized filter rule placement and packet rate optimized filter rule placement can be utilized, as described below, to help alleviate the number of packets being directed to egress filter rules due to potential overlaps. FIGS. 11A-D provide examples for such solutions that utilize the same filters as discussed with respect to FIGS. 9A and 9B.

Priority optimized ASE techniques help alleviate the buffer overflow issue and increase usable transmit bandwidth of egress ports. Priority optimized ASE techniques significantly reduce the number of packets that are being forwarded by taking advantage of commercial packet switch integrated circuits with multiple independent ingress filtering engines operating in parallel. In these devices, as described above, each filtering engine has an internal priority relative to the others. Each parallel engine "matches" independently of the other engines and maintains its own match statistics. The highest priority TCAM engine match overrides any other matches. The priority optimization algorithm relies on this parallel TCAM architecture.

Figure 11A:
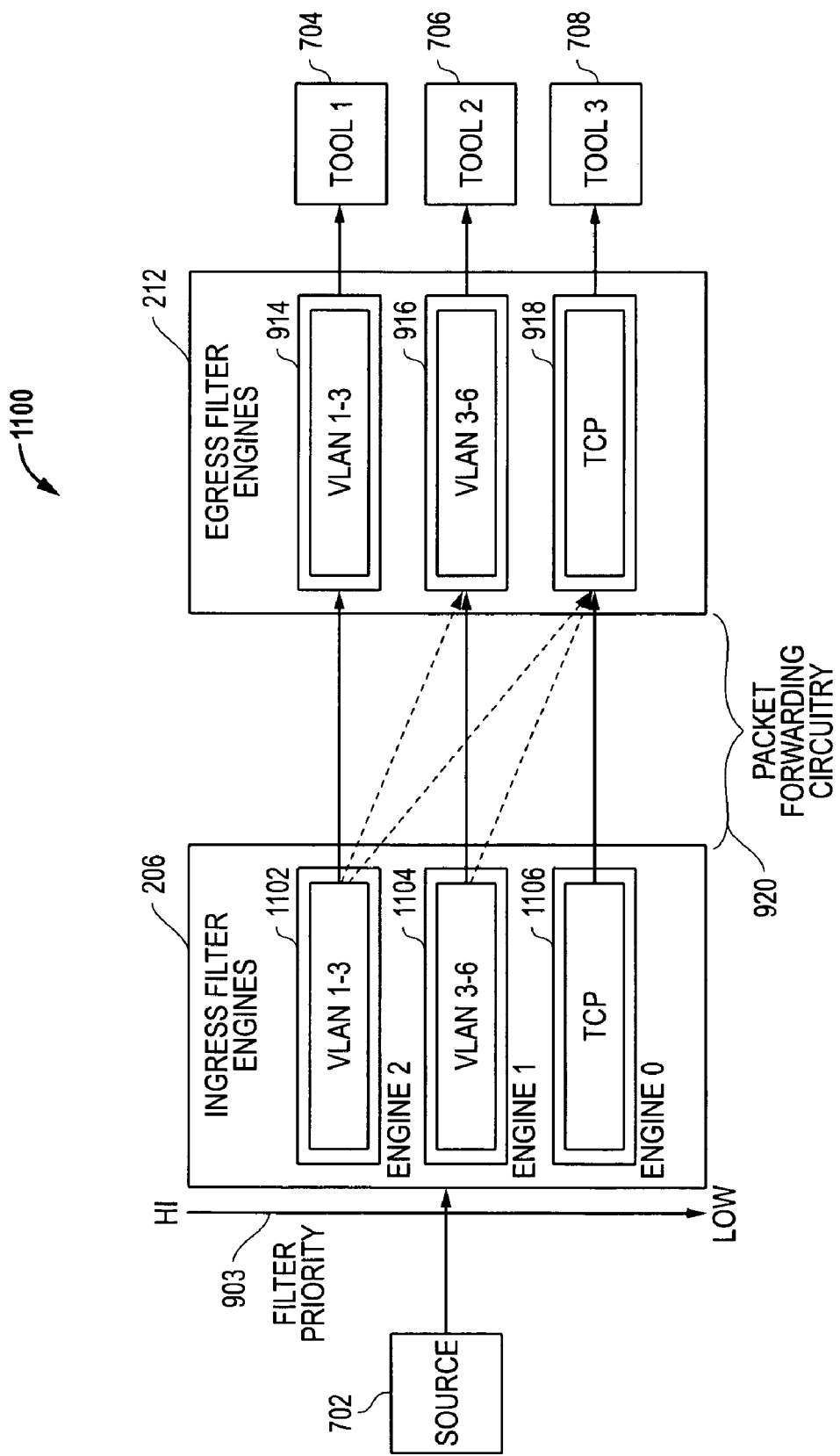
FIG. 11A is a block diagram for priority optimization associated with the superset forwarding set forth in FIG. 9A.
Figure 12A:
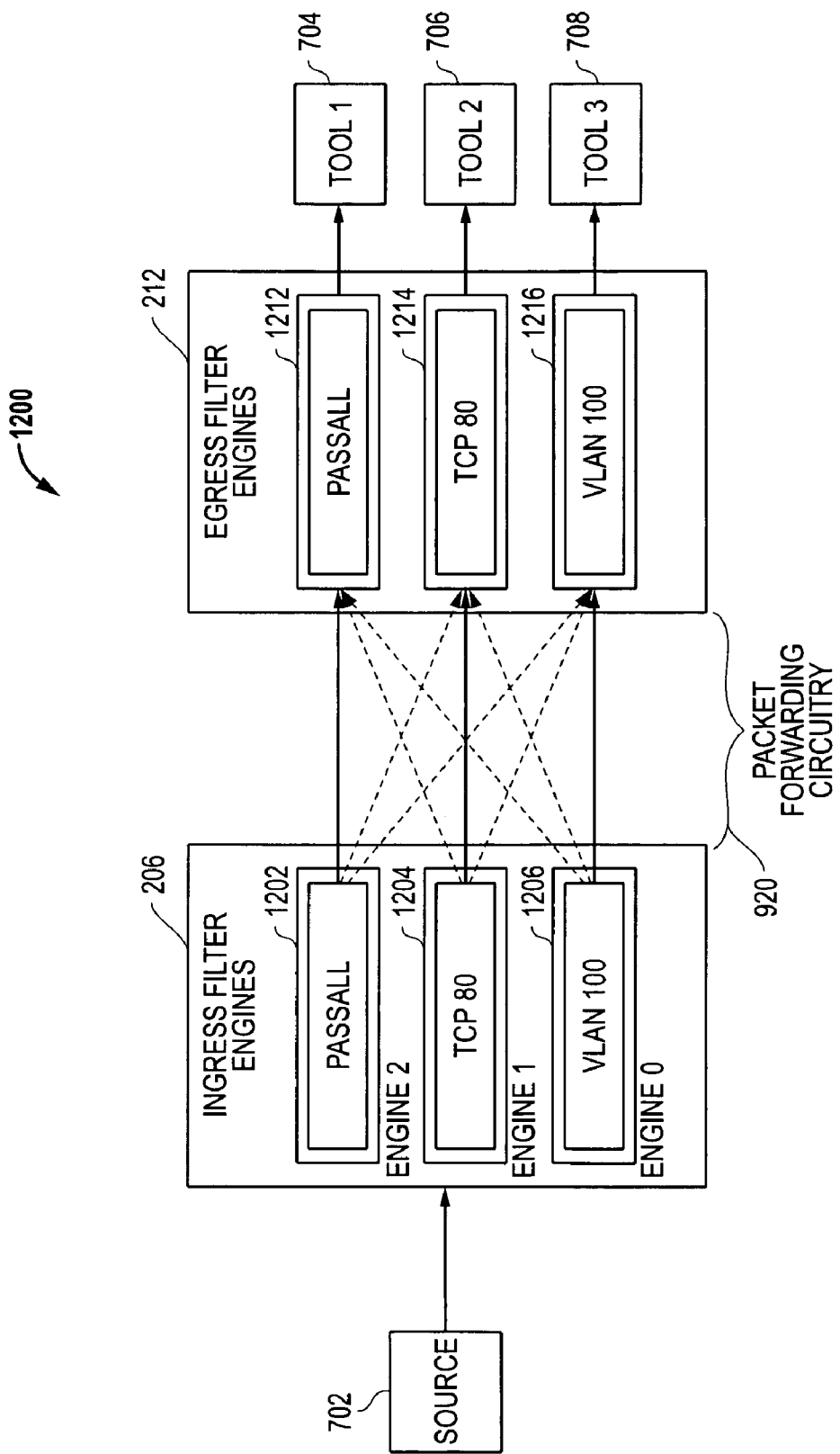
FIG. 12A is block diagram including a Pass All filter and superset forwarding.
Figure 12B:
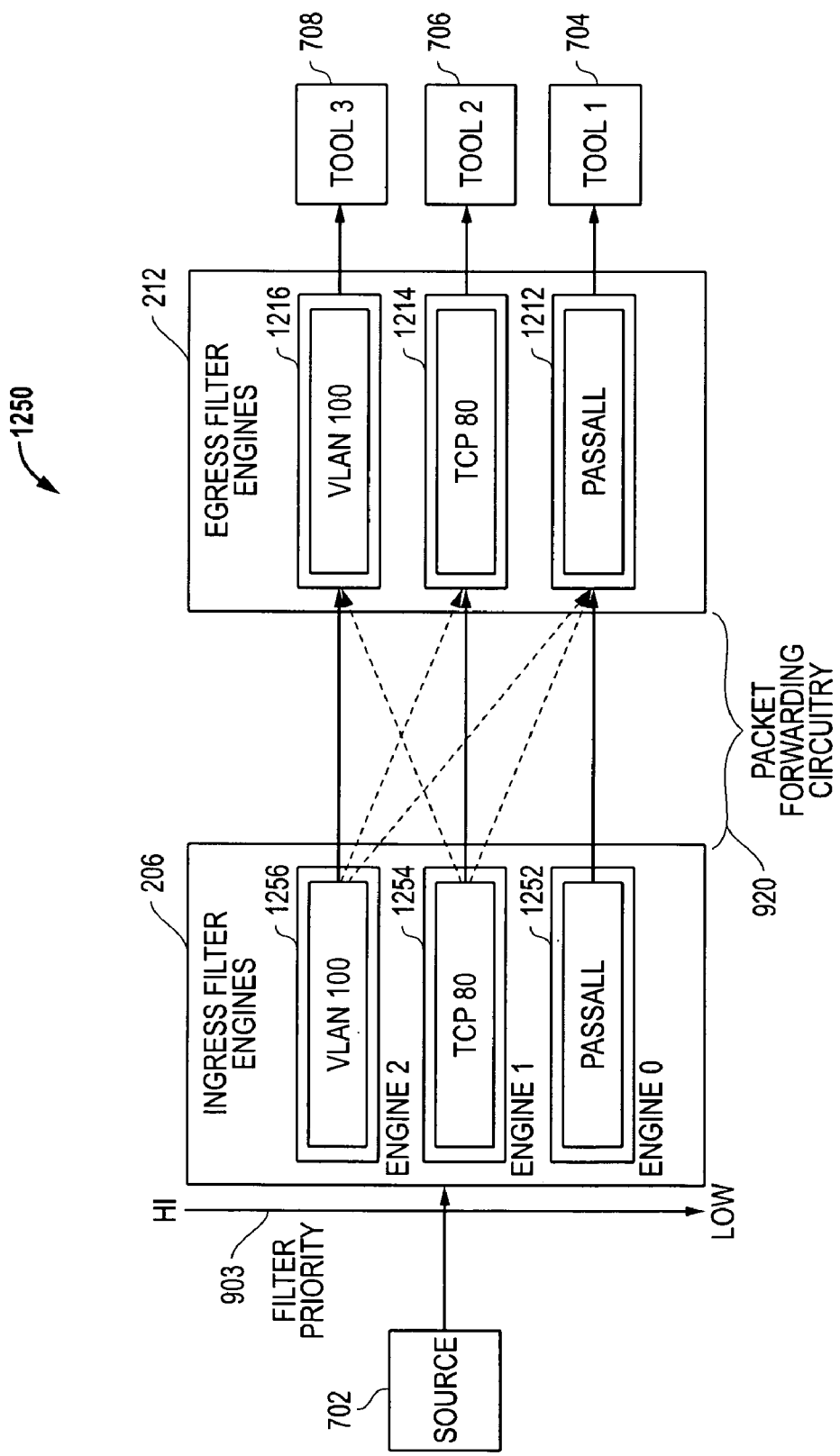
FIG. 12B is block diagram for Pass All filter optimization associated with the superset forwarding set forth in FIG. 12A.
Figure 12C:
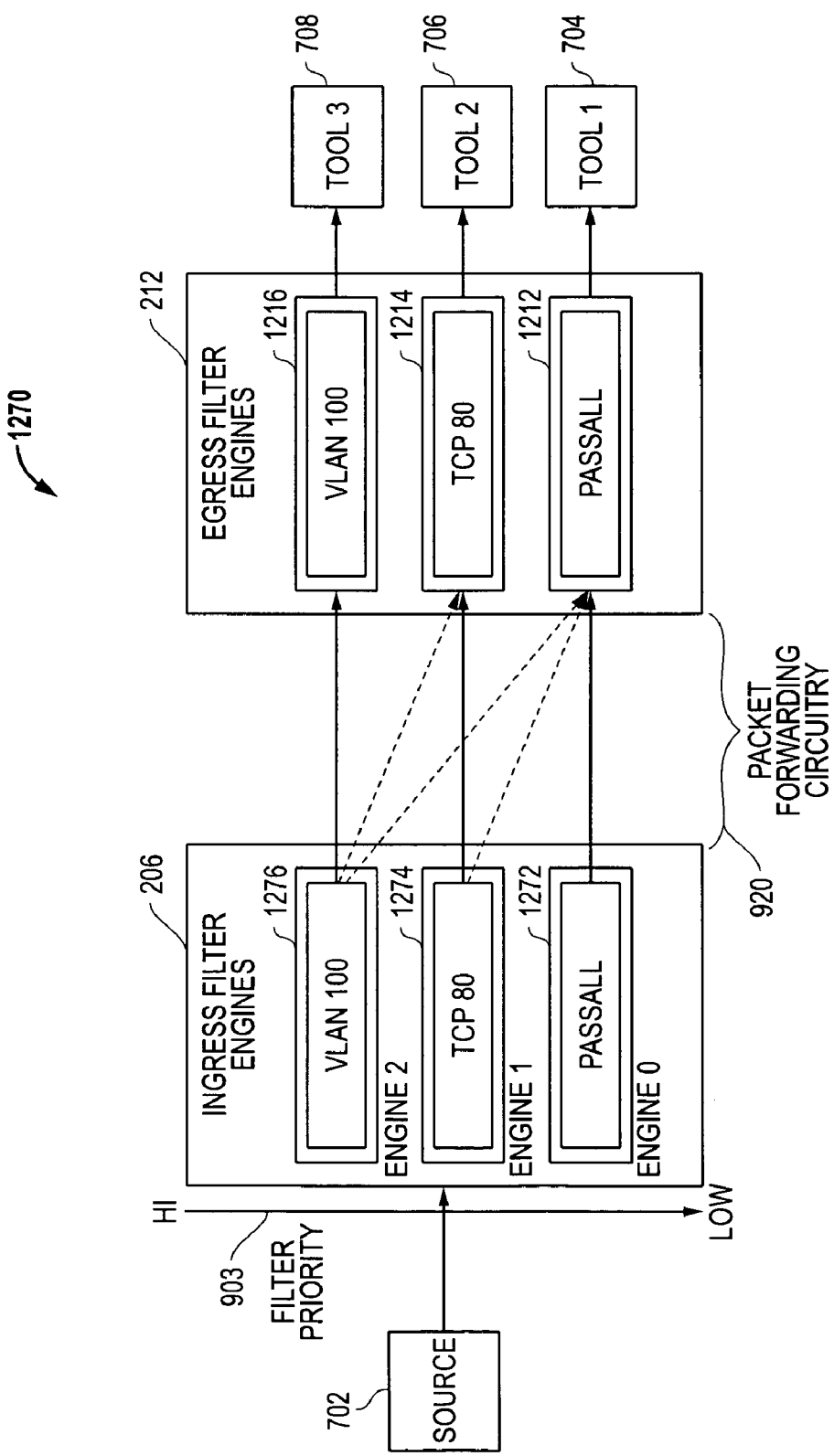
FIG. 12C is a block diagram for priority optimization of other filters in addition to the Pass All optimization.

FIG. 11A is a block diagram for an embodiment 1100 for priority optimized superset packet forwarding. Comparing FIG. 11A to FIG. 9A, it is seen that the number of directed packets for purposes of handling filter overlaps (i.e., dashed lines) is significantly reduced. In particular, the priority optimized implementation of FIG. 11A eliminates half of the forwarding actions as compared to FIG. 9A. Each parallel filter's rules are grouped such that each filter rule occupies a different priority of TCAM filter memory, relative to the other parallel filter rules. In order to ensure that tools do not miss any packets that are matched by higher priority TCAM filter rules, each ingress filter rule forwards its ingress matches on to the egress ports associated with any destination tool that is connected to a lower priority overlapping user defined filter. However the converse (lower priority ingress filter rules forwarding their matches on to higher priority filter rule destinations) is not required. The highest priority ingress filter rule already matches on every packet it needs, and its forwarding actions always "win." Some of the packets matching that ingress filter rule, however, may also match the lower priority overlapping ingress filter rules, which is why the higher priority filter rules forward their matches to the egress ports associated with the lower priority ingress filter rules.

FIG. 11A is now considered in more detail. The filter priority is provided by line 903 from high (HI) to low (LOW) priority for three ingress filter engines: ENGINE 2, ENGINE 1 and ENGINE 0. Filter rule 1102 for the filter to forward VLAN 1-3 packets to destination tool (TOOL 1) 704 is placed in the highest priority filter engine, ENGINE 2. The filter rule 1102 primarily forwards packets to destination port/tool 704 (TOOL 1) which are further filtered by egress filter rule 914. In addition, however, because this filter rule 1102 is in the highest priority filter engine, packets are also forwarded by filter rule 1102 to destination ports connected to overlapping filters defined in lower priority ingress filter engines, which are in this example destination ports for tools 706 (TOOL 2) and 708 (TOOL 3) associated with egress filter rules 916 and 918, as represented by the dashed lines. The filter rule 1104 for the filter to forward VLAN 3-6 packets to destination tool (TOOL 2) 706 are placed in the next highest priority filter engine, ENGINE 1. The filter rule 1104 primarily forwards packets to egress filter rule 916. In addition, because the filter rule 1104 is in the second priority filter engine, packets are also forwarded by filter rule 1104 to the destination port for tool 708 (TOOL 3) associated with egress filter rule 918, as shown by the dashed line. However, packets are not forwarded by filter rule 1104 to the destination port for tool 704 (TOOL 2) associated with egress filter rule 914. Finally, the filter rule 1106 for the filter to forward TCP packets to destination tool (TOOL 3) 708 is placed in the lowest priority filter engine, ENGINE 0. The filter rule 1106 forwards packets only to the destination port for tool 708 (TOOL 3) associated with egress filter rule 918. Because there are no overlapping filter rules defined in lower priority ingress filter engines, the filter rule 1106 does not forward packets to other destination ports. It is further noted that rather than use the three lowest priority engines, as depicted in FIG. 11A, it may be advantageous to allocate rules in engines beginning with the highest priority engine in order to ensure that rules for newly created overlapping filters do not risk causing egress buffer overload (i.e., dropped packets) on tool ports connected to previously established filter rules. As such, applying this high-to-low priority filter engine usage, the top priority ingress filter engine available would be utilized first to hold the filter rules.

Figure 11B:
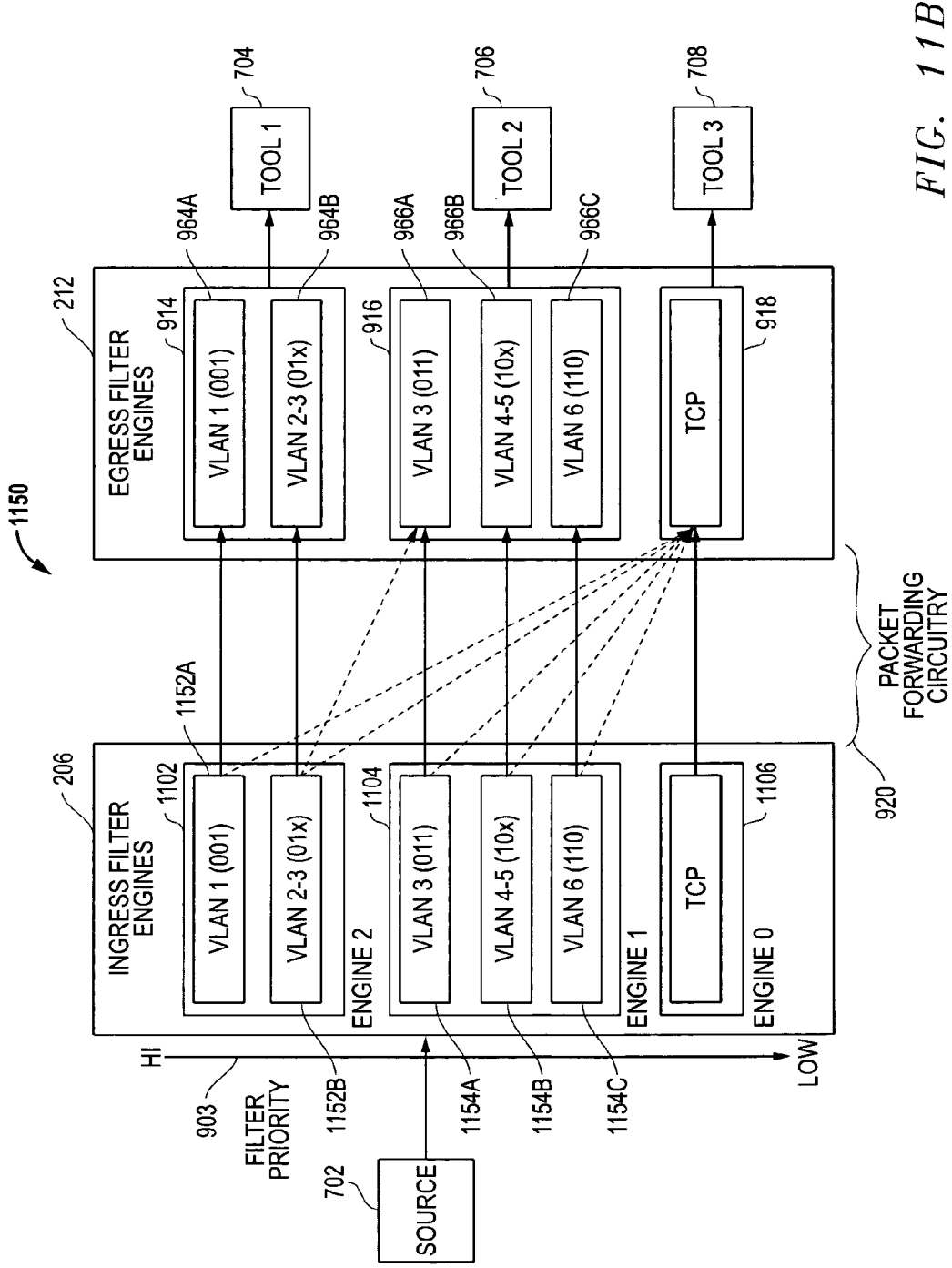
FIG. 11B is a block diagram using value/mask filter decomposition for the ingress and egress filter rules of FIG. 11A.

FIG. 11B is a block diagram using value/mask filter decomposition for the ingress and egress filter rules of FIG. 11A. Similar to FIG. 9B, rule 1102 for forwarding VLAN 1-3 has been decomposed into rules 1152A and 1152B, and rule 1104 for forwarding VLAN 3-6 has been decomposed into rules 1154A, 1154B and 1154C. As with FIG. 11A, however, packets are only forwarded for overlap purposes with respect to rules in ingress filter engines having lower priority. As such, compared to FIG. 9B, the egress filter rule 918 still further filters superset packets from all decomposed ingress rules 1152A, 1152B, 1154A, 1154B, 1154C and 1106. The egress filter rule 966A now further processes superset packets from rule 1152B matching VLAN 2-3 but not from rule 1106 because rule 1106 does not forward to the egress/destination port corresponding TOOL 2. And egress filter rules 964A/ 964B further filter packets only from ingress filter rules 1152A and 1152B. Comparing FIG. 11B with FIG. 11A, it is seen that the number of directed packets for purposes of handling filter overlaps (i.e., dashed lines) is significantly reduced. In short, FIG. 11B illustrates that the priority optimized ASE implementation will also benefit from automatically decomposing a filter into the minimal number of value/ mask paired rules needed to represent the filter, similar to the example described in FIG. 9B.

Figure 11C:
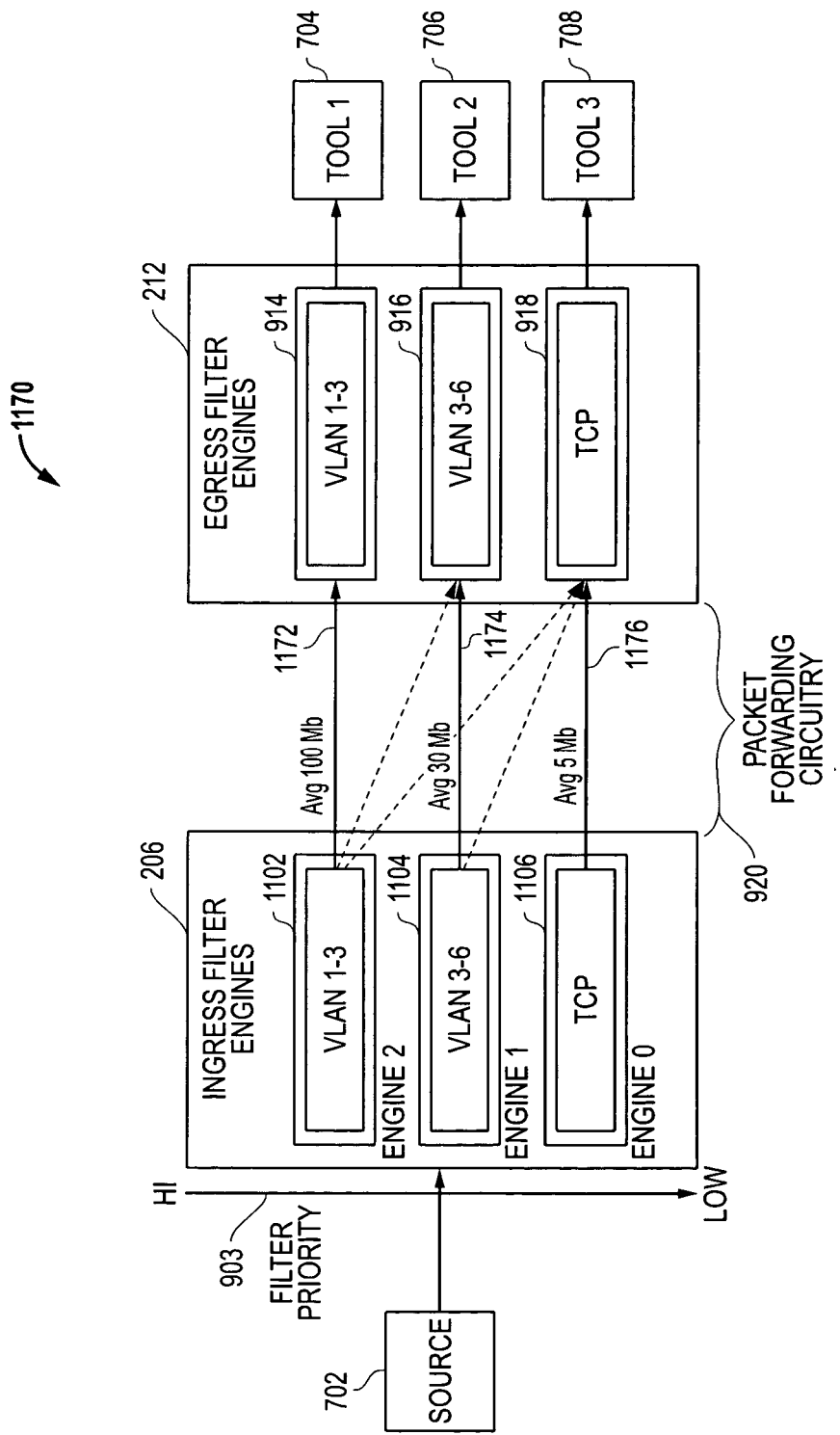
FIG. 11C is a block diagram for non-ideal overlapping packet rates based upon priority ordering associated with the embodiment of FIG. 9A.

FIG. 11C is a block diagram of an embodiment 1170 for non-ideal overlapping packet match rates based upon priority ordering associated with the embodiment of FIG. 9A. FIG. 11C is similar to priority optimized ASE implementation in FIG. 11A, but adds detail showing the average projected match rate (e.g., mega bits/sec) of each ingress filter rule. This illustrates that overlapping ingress filter rules forward actual bandwidth to egress/destination ports related to overlapping filter rules. Each egress buffer in commercially available packet switching ICs can handle sustained bandwidth equal to the line rate of the connected tool port before tool port drops occur. So it is advantageous to minimize the overlapping filter packet matches forwarded to non-directly connected tool ports due to superset packet forwarding. FIG. 11C shows a worst case scenario, namely that the filter rules with the most matching bandwidth are located in descending priority order within the ingress filter engines 206, so the highest bandwidth matches are being forwarded to the most tool ports. In this example, the egress/destination port buffer related to destination tool 708 and located prior to TCP egress filter rule 918 is receiving between 100-130 Mb per second of additional traffic due to superset packet forwarding.

More particularly, for the embodiment 1170, it is assumed that the average (avg) match rate for packets from rule 1102 is 100 mega bits per second as indicated by line 1172. The dashed lines from rule 1102 to rules 916 and 918 would have the same line match rate. The average match rate for packets from rule 1104 is 30 mega bits per second as indicated by line 1174, and the dashed line from rule 1104 to rule 918 would have the same line rate. Finally, the average rate for packets from rule 1106 is 5 mega bits per second as indicated by line 1176. Under these assumptions, it is seen that the filter rule 1102 placed in the highest priority ingress filter engine has the highest match rate which corresponds to the most superset packets being forwarding (i.e., dashed lines).

Figure 11D:
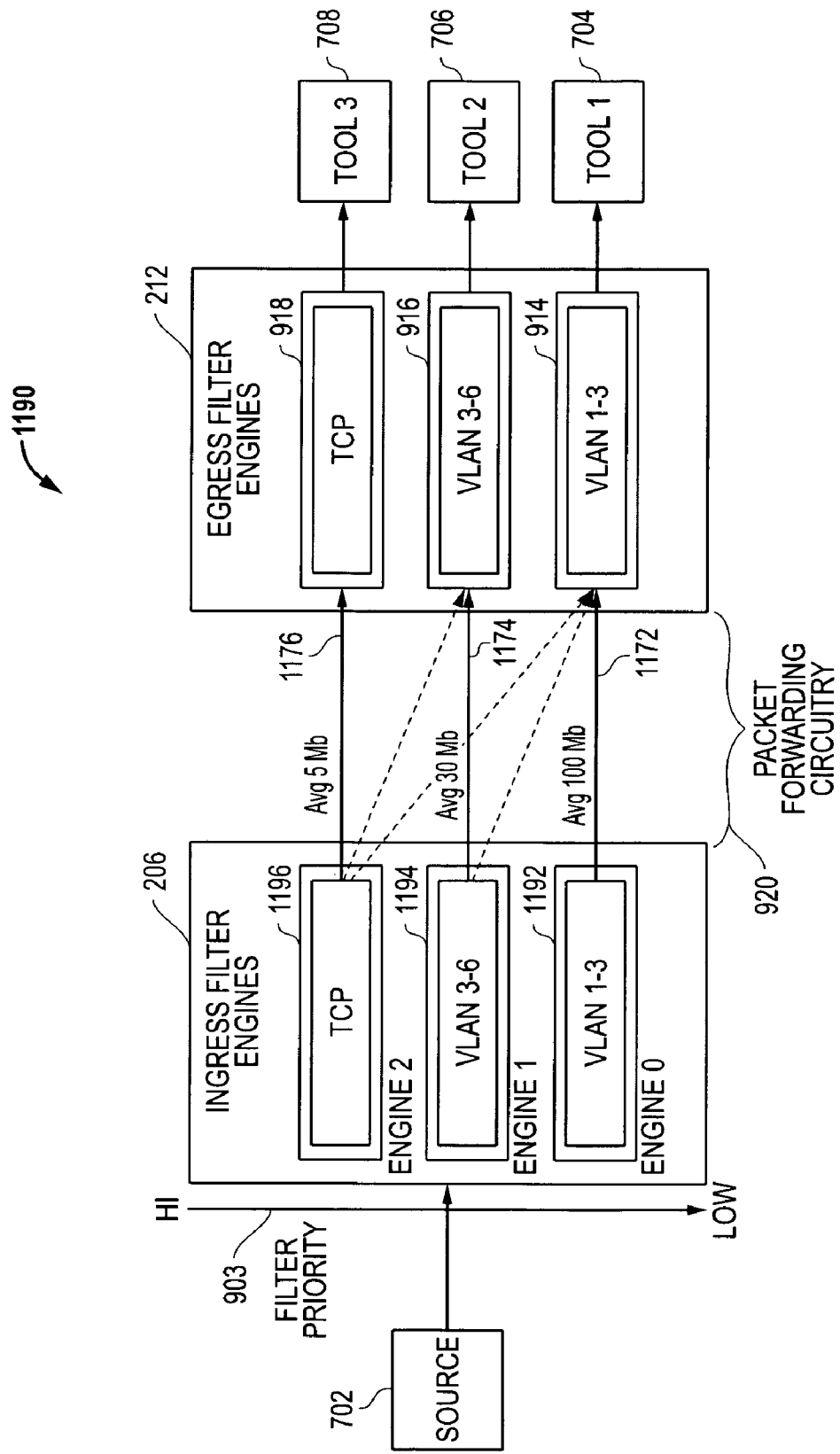
FIG. 11D is a block diagram for minimized overlapping packet match rates based upon priority ordering associated with the embodiment of FIG. 11C.

FIG. 11D is a block diagram for minimized overlapping packet match rates based upon priority ordering associated with the embodiment of FIG. 11C. FIG. 11D shows a best case scenario, namely that the filter rules with the least matching bandwidth are located in descending priority order within the ingress filter engines 206, so the lowest bandwidth matches are being forwarded to the most tool ports and the highest bandwidth match is not forwarded to any additional destination ports other than the directly connected port. By rearranging the overlapping filter rules based on matching bandwidth rates, less available tool port bandwidth is consumed.

More particularly, for the embodiment 1190, the filter rules have been placed in ingress filter engines based upon the expected line match rates for the filter matches. In other words, the lowest expected line match rates are defined in the highest priority ingress filter engines. As compared to FIG. 11C, it is seen that the priority of the rules have been reversed. As such, it is the rule 1196 with the lowest line match rate that is placed in the highest priority engine, ENGINE 2, and as indicated by the dashed lines, forwards its matching packets to two other egress ports for tools 704 and 706 (i.e., associated with filter rules 916 and 914) in addition to the egress port for tool 708 (i.e., associated with rule 918). The rule 1194 with the middle, line rate is placed in the middle priority engine, ENGINE 1, and as indicated by the dashed line, forwards its matching packets to one other egress port for tool 708 (i.e., associated with filter rule 914) in addition to the egress port for tool 706 (i.e., associated with rule 916). And rule 1192 with the highest line rate is placed in the lowest priority engine, ENGINE 0, and as indicated by no dashed lines, does not forward its matching packets to any other egress ports other than the egress port for tool 708 (i.e., associated with filter rule 914). As can be seen from the comparison of FIG. 11D to FIG. 11C, the total rate of superset (dashed line) packets being forwarded has on balance been significantly reduced (i.e., TOOL 3 egress buffer received up to 100+30=130 Mb/sec in FIG. 11C and receives 0 Mb/sec in FIG. 11D; TOOL 2 egress buffer received up to 100 Mb/sec in FIG. 11C and only receives up to 5 Mb/sec in FIG. 11D; TOOL 1 egress buffer received 0 Mb/sec in FIG. 11C and receives up to an additional 5+30=35 Mb/sec in FIG. 11D.) It is noted that the maximum rates assume no actual overlapping packets so actual rates would be less if there were overlaps.

It is noted that the tool optimizer 102 allows for user control of the relative filter engine priority of each overlapping filter. This priority is assigned on a source port basis, so a filter that is connected to multiple source ports can have a relative filter engine priority assigned based on each source port. The user interface displays historical average and peak filter match traffic rates to provide a basis for the user to decide on relative priorities. This level of control is typically not needed except for scenarios where egress buffer overflows are occurring or the user simply wants to configure additional overflow headroom. Manual control allows the user to fine tune these situations to minimize overlap traffic forwarding and maximize usable tool port bandwidth, similar to the optimizations described above. In many cases, establishing this relative location amongst overlapping filters frees enough bandwidth at egress ports that the user no longer needs to be concerned about tool ports dropping packets due to overlap forwarding. It is noted that there may be brief packet loss while re-establishing relative filter locations, depending on the underlying hardware capability. It is further noted that control can be further optimized through the use of wizards that automatically select optimal relative ordering of overlapping filters based on historical average or peak match rates.

ASE Processing—Pass All Optimization

Another solution to help alleviate the buffer overflow issue and potentially increase usable transmit bandwidth of egress ports is to reduce the number of packets that are being forwarded by certain rules. For example, Pass All filters can lead to egress buffer overload conditions. Therefore, by optimizing how rules for Pass All filters are handled, egress buffer overload conditions can be reduced.

Pass All filters overlap with every other filter that is connected to the same source port. As such, the ASE processing architecture described above would normally forward all packets from the Pass All's source port to every destination port connected to this source port through any filter. Thus, Pass All filters are the most egregious type of filter in the ASE processing architecture in terms of overloading egress buffers and potentially causing packet drops. The same effect is potentially there for other filter rules that overlap, but pass-by-criteria filter rules may not overlap with every SP rule and when they do, they only pass their matches to egress ports, as opposed to the Pass All passing every packet. It is Pass All filters, therefore, that potentially cause the most overload risk.

Pass All filter optimization, as described herein, can be provided to enhance the ASE processing so that rules for Pass All filters no longer send their packets to "overlapping rule" egress ports. This optimization can provide a significant improvement by reducing egress buffer overload due to rule overlap and may allow for more fully loaded tool ports without packet drops. For example, sniffers (protocol analyzers) are often initially connected to Pass All filters. As such, Pass All filters are a common use case that can be improved through the Pass All optimization described herein.

Example 3

Pass All Optimization Scenario

The following Pass All optimization scenario compares a situation in which a rule for a Pass All filter is allowed to forward all potentially overlapping packets to destination ports (DPs) and a situation in which Pass All optimization has been applied. It is noted that much less traffic gets sent to the DP6 and DP7 egress buffers below when Pass All optimization is applied.

When Pass All optimization is applied by the ASE processing, one of the lowest priority entries within the lowest priority ingress engine (e.g., ingress TCAM engine 0) is reserved for each port in the tool optimizer. For instance, if the system supports 28 ports then the lowest 28 TCAM entries in the lowest priority ingress engine are reserved for 28 source port rules. Each of these source port rules is provisioned by default to Drop All, ensuring that any source port packet that does not match another filter rule will be dropped. However, when a user-defined Pass All filter is connected to a source port, then that port's entry is changed from a Drop All to a Pass All rule that redirects its matches to the destination ports (DPs) connected to the Pass All filter. This deviates from standard ASE processing above in that the ASE processing does not implement a rule that directs packets from the source port (SP) connected to the Pass All rule to every DP that is connected to overlapping filters. As such, with Pass All optimization, potential filter overlaps are ignored for the Pass All rule.

All other filters connected to the source port can be processed using the standard ASE processing described above. Packets that match ingress filter rules for these other filters are forwarded to every destination port (DP) that is directly connected to the filter and to every DP that is connected to an overlapping filter, including the Pass All filter's destination ports. The Pass All filter optimization is handled as a special case in TCAM, taking advantage of the fact that the packets forwarded from the higher priority overlapping Pass-by-Criteria filter rules are already contained in the Pass All filter matches, so there is no need to forward them to the Pass All filter's directly connected destination port. This Pass All optimization is not utilized for other types of overlapping filters rules.

In the following example, all three filter connections overlap. Using the Pass All optimization, the Pass All filter rule does not send its matches to DP6 and DP7 egress filter rules. The following tables show how the Pass All optimization works. More particularly, for this example, the user has set up the following desired packet forwarding:

Connection 1—PASS ALL SP1 packets to DP5
Connection 2—SP1 packets matching TCP 80 to DP6
Connection 3—SP1 packets matching VLAN 100 passed to DP7

It is noted that the second two filter connections overlap the first PASS ALL filter connection, which passes all packets from SP1. Also, the third filter and the second filter connections overlap.

The following represents an example of rules that can be set up to handle this third example scenario. The first table provides example ingress filter engine settings for no optimization. The second table provides example ingress filter settings with Pass All optimization.

Example 3 - Ingress Filter Engines - No Optimization

| Engine | Rule | Forwarding Action |
| --- | --- | --- |
| Engine 2 | SP1, VLAN 100 | DP5-7 |
| Engine 1 | SP1, TCP 80 | DP5-7 |
| Engine 0 | SP1, PASS ALL | DP5-7 |
| Engine 0 | * | DROP ALL |

Example 3 - Ingress Filter Engines - Pass All Optimization

| Engine | Rule | Forwarding Action |
| --- | --- | --- |
| Engine 2 | SP1, VLAN 100 | DP5-7 |
| Engine 1 | SP1, TCP 80 | DP5-7 |
| Engine 0 | SP1, PASS ALL | DP 5 |
| Engine 0 | SP2-(n) | DROP ALL |

For Pass All optimization, it is noted that rather than a DROP ALL rule that applies to all source ports ("*") as set up in the first table (no optimization), a DROP ALL rule is set up in Engine 0 for each source port in the second table (Pass All optimization). As such, SP1, SP2, SP3 . . . SP(n) are all initially set up with a DROP ALL rule in the lowest ingress engine. Because the user has selected a PASS ALL rule for SP1, this DROP ALL rule for SP1 in Engine 0 has been changed to a PASS ALL rule to the selected destination port DP5. For the others (SP2–(n)), the DROP ALL rules are left in place.

As can be seen from comparing the two ingress tables above for Example 3, the optimization prevents all SP1 packets matching the PASS ALL filter rule from being directed to DP6 and DP7 in addition to DP5. Rather, only SP1 packets matching TCP 80 and VLAN 100, which potentially overlap, are directed to DP5, DP6 and DP7. It is further noted that accurate ingress filter statistics are provided by placing overlapping rules within separate ingress engines, as described above.

FIG. 12A is block diagram for an embodiment 1200 including a Pass All filter rule and superset forwarding that matches the first Example 3 table above. As shown, filter rule 1202 is a Pass All filter rule that provides packets to the egress port for destination tool 704 associated with egress filter rule 1212. However, packets are also provided due to overlapping filter rules to the egress ports for destination tools 706 and 708 associated with filter rules 1214 and 1216, respectively. Thus, this superset packet forwarding for the Pass All filter rule 1202 leads to a large number of additional packets being forwarded to the egress ports for tools 706 and 708. Additional ingress filter rules 1204 and 1206 are also depicted for TCP 80 and VLAN 100 matching criteria, respectively. Because filter rules 1204 and 1206 are overlapping with each other and rule 1203, they each forward packets to all three egress ports for tools 704, 706 and 708.

FIG. 12B is block diagram for an embodiment 1250 for Pass All filter optimization associated with the superset forwarding set forth in FIG. 12A. This embodiment 1250 matches the second Example 3 table above that includes Pass All optimization. As shown in FIG. 12B, the Pass All filter rule 1252 is now defined in the lowest priority ingress filter engine, ENGINE 0, and the packets from filter rule 1252 are not directed to the egress ports for tools 706 and 708. Only egress filter rule 1212 further filters the packets from filter rule 1252. Ingress filter rules 1254 and 1256 are now defined in higher priority ingress filter engines, ENGINE 1 and ENGINE 2, respectively. As can be seen by comparing FIG. 12A to FIG. 12B, Pass All optimization significantly reduces superset packet forwarding. It is also noted that the Pass All optimization is a type of priority and match rate optimization, as described with respect to FIGS. 11A-D, where rules for the Pass All filter are defined in a lowest priority ingress filter engine to keep from forwarding packets to destination ports associated with overlapping filter rules defined in higher priority ingress filter engines because the Pass All filter rules are expected to have the potentially highest match rate.

FIG. 12C is a block diagram of an embodiment 1270 for priority optimization of other filter rules 1276 and 1274 in addition to the Pass All optimization. For the embodiment 1270, priority optimization has also been applied to filter rules 1274 and 1276 so that superset packets are only directed to egress ports associated with overlapping filters having filter rules defined in lower priority ingress filter engines. As such, the filter rule 1274 for filtering criteria that matches TCP 80 does not forward packets to the egress port for tool 708 associated with egress filter rule 1216.

Packet Switch IC Optimization Techniques

Some of the limitations inherent in the ASE processing, as described above, can be overcome by additional circuitry or processing provided within packet switch ICs, for example, to pre-process packets before they enter the packet forwarding circuitry and/or to post-process packets after they leave the packet forwarding circuitry.

One packet switch IC optimization technique is to pre-process data packets to remove the payload in the data packet prior to forwarding the data packet. Because many network performance monitoring and security applications only look at packet headers, the payload of the packet is not required. An intelligent pre-processing circuit can be configured to take advantage of this by removing the payload from some (or all) of the packets before these packets enter the packet forwarding circuitry. Of course, in addition to removing the payload, the pre-processing circuitry can also be configured to recalculate error correction features such as the CRC-32 Ethernet frame checksum included in Ethernet data packets. Because the packet headers usually represent a small fraction of the overall data in the packet, this payload removal technique provides the significant advantage of greatly reducing the bandwidth of data that the packet forwarding circuitry and downstream tools must process. One disadvantage of this technique is that it removes the payload, so that some monitoring tools (such as intrusion detection systems and virus scanners) could not be used once the payload is removed. As such, payload removal could be done selectively based on the criteria selected within the pre-processing circuit. Any payload reduction, however, would direct less traffic to the egress buffer thereby reducing loading at the egress buffer. Further, if the length of the original packet is important but the payload is not, the payload can be removed, and the original packet length can be added to the packet. For example, the original packet length can be appended just before the CRC-32 checksum so that an egress post-processing step could pad the egress packets back up the proper size. This would allow a downstream monitoring tool to see the correct number of bytes, while still reducing the processing load.

Another packet switch optimization technique is to provide post-processing rate adaptation. Because the instrument or tool port is often configured to operate at a lower rate than the maximum possible rate, the tool optimizer may drop packets that would not be dropped if the tool port were configured to operate at a higher rate. To alleviate this problem, rate-adaptation can be included in a post-processing stage whereby the ports on the packet switch always operate at the highest configurable data rate after forwarding by the packet switch. This adaptation of the data rate to its highest level helps to ensures that egress port congestion caused by the processing algorithm, such as the ASE processing described above, is minimized. For example, additional circuitry could be provided to receive the higher data rate packets and to remove the idle time between packets. This additional circuitry could also provide a larger egress buffer than is available in commercially available packet switching integrated circuits today. If desired, this additional circuitry could take the form of external circuitry connected to the tool port of the tool optimizer and also to the destination tool. In other words, this external circuitry provides an adapter that can receive data at a higher rate from the tool optimizer, buffer this data, and then provide it to the tool optimizer at a lower rate. This rate adaptation circuitry thereby allows the tool optimizer ports to operate at a higher rate, when needed, to reduce the chance of buffer overflow in the egress buffers of the packet switch integrated circuit.

A further packet switch optimization technique to help alleviate the egress buffer overflow issue is to allow the user to assign CoS (Class of Service) to each ingress filter engine's forwarded packets. This CoS labeling would allow a prioritization of which packets should be discarded first should an egress buffer experience overflow. Currently available packet switch integrated circuits include the capability to assign all packets forwarded by an ingress filter engine (i.e., all filter matches) to a particular CoS. Commercial packet switch circuits, however, do not currently have the capability to assign a unique CoS to filter matches based on the destination port to which they are being forwarded. This latter capability would be very useful within the ASE processing above because filter rules forwarding to directly connected destination ports could then assign those packets to a high priority CoS to ensure they were dropped only when the sum of all directly attached filter matches exceeded the port's line rate. Similarly, overlapping filter matches forwarded to destination ports that were not directly connected could be assigned a user defined CoS priority to ensure those packets were dropped first in case the egress buffer overflowed.

Further modifications and alternative embodiments of this invention will be apparent to those skilled in the art in view of this description. It will be recognized, therefore, that the present invention is not limited by these example arrangements. Accordingly, this description is to be construed as illustrative only and is for the purpose of teaching those skilled in the art the manner of carrying out the invention. It is to be understood that the forms of the invention herein shown and described are to be taken as the presently preferred embodiments. Various changes may be made in the implementations and architectures. For example, equivalent elements may be substituted for those illustrated and described herein, and certain features of the invention may be utilized independently of the use of other features, all as would be apparent to one skilled in the art after having the benefit of this description of the invention.

What is claimed is:

1. A network packet forwarding device having automatic filter overlap processing, comprising:

one or more input ports configured to receive packets from one or more source devices;

a plurality of output ports configured to send packets to two or more destination devices;

packet forwarding circuitry coupled between the input ports and the output ports and configured to forward packets from the input ports to the output ports;

at least one filter engine coupled to the packet forwarding circuitry and configured to use filter rules to control at least in part how packets are forwarded by the packet forwarding circuitry from the input ports to the output ports;

a filter interface configured to allow a user to define a plurality of filters representing how packets are desired to be forwarded from input ports to output ports; and a dynamic filter processor configured to analyze the user-defined filters, to automatically identify filters having different forwarding actions for packets from a single input port as overlapping filters, to automatically generate filter rules for the filter engine to provide for the different forwarding actions, and to automatically apply the filter rules to the filter engine so that the filter engine is configured to cause packets from the single input port to be forwarded according to the different forwarding actions provided by the overlapping filters;

wherein the at least one filter engine comprises:
  at least one ingress filter engine configured to provide a single forwarding action per packet and to use ingress filter rules to determine at least in part how packets are forwarded from input ports to output ports; and
  at least one egress filter engine configured to use egress filter rules to determine at least in part which packets received by the output ports are actually sent out by the output ports to destination devices;
  wherein the dynamic filter processor is configured to generate ingress and egress filters rules for the ingress and egress filter engines and to apply the ingress and egress filter rules to the ingress and egress filter engines so that the ingress and egress filter engines are configured to cause packets from the single input port to be forwarded according to the different forwarding actions provided by the overlapping filters.

2. The network packet forwarding device of claim 1, wherein the dynamic filter processor is configured to automatically generate the filter rules regardless of an order in which a user defines the overlapping filters.

3. The network packet forwarding device of claim 1, wherein the filter interface is configured to allow a user to define the filters using filter parameters and desired connection paths to input ports and output ports.

4. The network packet forwarding device of claim 1, wherein the dynamic filter processor is configured to treat a filter connected to N input ports as a set of N filters for purposes of generating the filter rules.

5. The network packet forwarding device of claim 1, wherein the interface is configured to be accessed through one or more management platforms by a plurality of users at the same time.

6. The network packet forwarding device of claim 1, wherein the packets comprise a plurality of fields, each field having one or more values, and wherein the interface is configured to allow the user to define filters using filter parameters associated with the fields and values.

7. The network packet forwarding device of claim 1, wherein the interface is configured to allow the user to manually adjust filter rules automatically generated for the filter engine.

8. The network packet forwarding device of claim 1, wherein the source devices comprise network monitoring sources and the destination devices comprise network monitoring tools.

9. A network packet forwarding device having automatic filter overlap processing, comprising:
  one or more input ports configured to receive packets from one or more source devices;
  a plurality of output ports configured to send packets to two or more destination devices;
  packet forwarding circuitry coupled between the input ports and the output ports and configured to forward packets from the input ports to the output ports;
  at least one filter engine coupled to the packet forwarding circuitry and configured to use filter rules to control at least in part how packets are forwarded by the packet forwarding circuitry from the input ports to the output ports;
  a filter interface configured to allow a user to define a plurality of filters representing how packets are desired to be forwarded from input ports to output ports; and
  a dynamic filter processor configured to analyze the user-defined filters, to automatically identify filters having different forwarding actions for packets from a single input port as overlapping filters, to automatically generate filter rules for the filter engine to provide for the different forwarding actions, and to automatically apply the filter rules to the filter engine so that the filter engine is configured to cause packets from the single input port to be forwarded according to the different forwarding actions provided by the overlapping filters;
  wherein the packets comprise a plurality of fields, each field having one or more values, and wherein the interface is configured to allow the user to define filters using filter parameters associated with the fields and values; and
  wherein the dynamic filter processor is further configured to identify overlapping filters by determining if two filters have common fields selected by their respective filter parameters and then by determining if values selected by their respective filter parameters are overlapping.

10. The network packet forwarding device of claim 9, wherein the at least one filter engine comprises a multi-action filter engine configured to directly cause packets from the single input port to be forwarded according to the different forwarding actions provided by the overlapping filters.

11. The network packet forwarding device of claim 10, wherein the multi-action filter engine comprises a plurality of individual filter match engines, each configured to provide a least one forwarding action per packet, and a combiner coupled to receive and combine the forwarding actions from the plurality of individual filter match engines so that the multi-action filter engine is configured to directly cause packets from the single input port to be forwarded according to the different forwarding actions provided by the overlapping filters.

12. The network packet forwarding device of claim 11, wherein the combiner is configured to combine the forwarding actions received from the individual filter match engines using a Boolean OR operation.

13. A network packet forwarding device having automatic filter overlap processing, comprising:
  one or more input ports configured to receive packets from one or more source devices;
  a plurality of output ports configured to send packets to two or more destination devices;
  packet forwarding circuitry coupled between the input ports and the output ports and configured to forward packets from the input ports to the output ports;
  at least one filter engine coupled to the packet forwarding circuitry and configured to use filter rules to control at least in part how packets are forwarded by the packet forwarding circuitry from the input ports to the output ports;
  a filter interface configured to allow a user to define a plurality of filters representing how packets are desired to be forwarded from input ports to output ports; and
  a dynamic filter processor configured to analyze the user-defined filters, to automatically identify filters having different forwarding actions for packets from a single input port as overlapping filters, to automatically generate filter rules for the filter engine to provide for the different forwarding actions, and to automatically apply the filter rules to the filter engine so that the filter engine is configured to cause packets from the single input port to be forwarded according to the different forwarding actions provided by the overlapping filters;
  wherein the dynamic filter processor is configured to implement filter rules for a first overlapping filter without affecting operation of filter rules for a second overlapping filter.

14. A method for automatic filter overlap processing, comprising:
- providing one or more input ports configured to receive packets from one or more source devices;
- providing a plurality of output ports configured to send packets to two or more destination devices;
- forwarding packets between the input ports and the output ports using packet forwarding circuitry;
- controlling the packet forwarding using at least one filter engine configured to use filter rules to control at least in part how packets are forwarded by the packet forwarding circuitry from the input ports to the output ports;
- allowing a user to define through an interface a plurality of filters representing how packets are desired to be forwarded from input ports to output ports;
- analyzing the user-defined filters;
- automatically identifying filters having different forwarding actions for packets from a single input port as overlapping filters;
- automatically generating filter rules for the filter engine to provide for the different forwarding actions;
- automatically applying the filter rules to the filter engine so that the filter engine is configured to cause packets from the single input port to be forwarded according to the different forwarding actions provided by the overlapping filters; and
- forwarding packets according to the user-defined filters;
- wherein the controlling step comprises:
  - using at least one ingress filter engine to provide a single forwarding action per packet and to determine at least in part how packets are forwarded from input ports to output ports;
  - using at least one egress filter engine to determine at least in part which packets received by the output ports are actually sent out by the output ports to destination devices;
  - automatically generating ingress and egress filters rules for the ingress and egress filter engines; and
  - automatically applying the ingress and egress filter rules to the ingress and egress filter engines so that the ingress and egress filter engines are configured to cause packets from the single input port to be forwarded according to the different forwarding actions provided by the overlapping filters.

15. The method of claim 14, wherein the automatically generating step is configured to automatically generate the filter rules regardless of an order in which a user defines the overlapping filters.

16. The method of claim 14, further comprising treating a filter connected to N source ports as a set of N filters for purposes of generating the filter rules.

17. The method of claim 14, wherein the allowing step comprises allowing a plurality of users to access the interface through one or more management platforms at the same time.

18. The method of claim 14, wherein the packets comprise a plurality of fields, each field having one or more values, and wherein the allowing step comprising allowing the user to define filters using filter parameters associated with the fields and values.

19. A method for automatic filter overlap processing, comprising:
- providing one or more input ports configured to receive packets from one or more source devices;
- providing a plurality of output ports configured to send packets to two or more destination devices;
- forwarding packets between the input ports and the output ports using packet forwarding circuitry;
- controlling the packet forwarding using at least one filter engine configured to use filter rules to control at least in part how packets are forwarded by the packet forwarding circuitry from the input ports to the output ports;
- allowing a user to define through an interface a plurality of filters representing how packets are desired to be forwarded from input ports to output ports;
- analyzing the user-defined filters;
- automatically identifying filters having different forwarding actions for packets from a single input port as overlapping filters;
- automatically generating filter rules for the filter engine to provide for the different forwarding actions;
- automatically applying the filter rules to the filter engine so that the filter engine is configured to cause packets from the single input port to be forwarded according to the different forwarding actions provided by the overlapping filters; and
- forwarding packets according to the user-defined filters;
- wherein the packets comprise a plurality of fields, each field having one or more values, and wherein the allowing step comprising allowing the user to define filters using filter parameters associated with the fields and values; and
- wherein automatically identifying step comprises identifying overlapping filters by determining if two filters have common fields selected by their respective filter parameters and then by determining if values selected by their respective filter parameters are overlapping.

20. The method of claim 19, wherein the controlling step comprises using a multi-action filter engine to directly cause packets from the single input port to be forwarded according to the different forwarding actions provided by the overlapping filters.

21. The method of claim 20, further comprising providing a plurality of individual filter match engines for the multi-action filter engine, each configured to provide a least one forwarding action per packet, and combining the forwarding actions from the plurality of individual filter match engines so that the multi-action filter engine is configured to directly cause packets from the single input port to be forwarded according to the different forwarding actions provided by the overlapping filters.

22. The method of claim 21, further comprising combining the forwarding actions received from the individual filter match engines using a Boolean OR operation.

23. A method for automatic filter overlap processing, comprising:
- providing one or more input ports configured to receive packets from one or more source devices;
- providing a plurality of output ports configured to send packets to two or more destination devices;
- forwarding packets between the input ports and the output ports using packet forwarding circuitry;
- controlling the packet forwarding using at least one filter engine configured to use filter rules to control at least in part how packets are forwarded by the packet forwarding circuitry from the input ports to the output ports;
- allowing a user to define through an interface a plurality of filters representing how packets are desired to be forwarded from input ports to output ports;
- analyzing the user-defined filters;
- automatically identifying filters having different forwarding actions for packets from a single input port as overlapping filters;

automatically generating filter rules for the filter engine to provide for the different forwarding actions;

automatically applying the filter rules to the filter engine so that the filter engine is configured to cause packets from the single input port to be forwarded according to the different forwarding actions provided by the overlapping filters; and forwarding packets according to the user-defined filters;

further comprising generating and applying filter rules for a first overlapping filter without affecting operation of filter rules for a second overlapping filter.

* * * * *

UNITED STATES PATENT AND TRADEMARK OFFICE
CERTIFICATE OF CORRECTION

| | | |
|---|---|---|
| PATENT NO. | : 8,018,943 B1 | Page 1 of 1 |
| APPLICATION NO. | : 12/462221 | |
| DATED | : September 13, 2011 | |
| INVENTOR(S) | : Pleshek et al. | |

It is certified that error appears in the above-identified patent and that said Letters Patent is hereby corrected as shown below:

In claim 11, column 52, line 25, delete "a" and insert --at--.

Signed and Sealed this
Twenty-second Day of November, 2011

David J. Kappos
*Director of the United States Patent and Trademark Office*